United States Patent

Genov et al.

[11] Patent Number: 6,121,743
[45] Date of Patent: Sep. 19, 2000

[54] DUAL ROBOTIC ARM END EFFECTORS HAVING INDEPENDENT YAW MOTION

[75] Inventors: Genco Genov, deceased, late of San Jose, by Mila Genov, legal representative; Alexander Todorov, Sunnyvale; Lubo Kostov, Sunnyvale; Peter Petkov, Sunnyvale; Valentin Totev, Sunnyvale; Eugene Bonev, Santa Clara; Zlatko Sotirov, Sunnyvale, all of Calif.

[73] Assignee: Genmark Automation, Inc., Sunnyvale, Calif.

[21] Appl. No.: 09/129,110

[22] Filed: Aug. 4, 1998

Related U.S. Application Data

[63] Continuation-in-part of application No. 08/788,898, Jan. 23, 1997, Pat. No. 5,789,890.
[60] Provisional application No. 60/013,862, Mar. 22, 1996, provisional application No. 60/021,546, Jul. 11, 1996, and provisional application No. 60/024,242, Aug. 20, 1996.

[51] Int. Cl.[7] ........................................................ B25J 9/16
[52] U.S. Cl. .............................. 318/568.11; 318/568.21; 700/245; 901/27; 901/32; 414/743; 414/937
[58] Field of Search ........................ 318/568.11, 568.21; 395/80–83; 901/27–29, 30–35, 38; 414/728–730, 732–736, 743, 744.1–744.8, 935–937, 940, 941; 700/245, 247, 248

[56] References Cited

U.S. PATENT DOCUMENTS

| | | |
|---|---|---|
| Re. 32,794 | 12/1988 | Engleberger et al. . |
| 3,240,513 | 3/1966 | Turzillo . |
| 3,805,629 | 4/1974 | Martin et al. . |
| 3,920,972 | 11/1975 | Corwin, Jr. et al. . |
| 3,968,885 | 7/1976 | Hassan et al. . |
| 4,166,543 | 9/1979 | Dahlstrom . |
| 4,181,465 | 1/1980 | Ridderström . |
| 4,196,049 | 4/1980 | Burns et al. . |
| 4,260,941 | 4/1981 | Engelberger et al. . |
| 4,299,533 | 11/1981 | Ohnaka . |
| 4,433,382 | 2/1984 | Cunningham, et al. . |
| 4,457,664 | 7/1984 | Judell et al. . |
| 4,465,424 | 8/1984 | Inaba et al. . |
| 4,466,307 | 8/1984 | Kouno . |
| 4,488,242 | 12/1984 | Tabata et al. .............................. 395/94 |
| 4,501,527 | 2/1985 | Jacoby et al. . |
| 4,502,830 | 3/1985 | Inaba et al. . |
| 4,511,985 | 4/1985 | Inaba et al. . |
| 4,566,847 | 1/1986 | Maeda et al. . |
| 4,579,380 | 4/1986 | Zaremsky et al. ................... 294/119.1 |
| 4,664,587 | 5/1987 | Case, Jr. et al. . |
| 4,680,802 | 7/1987 | Nishida et al. . |
| 4,686,866 | 8/1987 | Rosheim . |
| 4,693,629 | 9/1987 | Bruinsma . |
| 4,706,000 | 11/1987 | Kishi et al. . |
| 4,732,525 | 3/1988 | Neumann . |

(List continued on next page.)

FOREIGN PATENT DOCUMENTS

| | | |
|---|---|---|
| 132 538 | 5/1984 | European Pat. Off. . |
| 410 823 | 5/1990 | European Pat. Off. . |
| 61-273441 | 12/1986 | Japan . |
| 62-130938 | 6/1987 | Japan . |
| 64-69487 | 3/1989 | Japan . |
| 1-316184 | 12/1989 | Japan . |
| 1668784 | 4/1989 | U.S.S.R. . |
| 2 120 202 | 4/1983 | United Kingdom . |

*Primary Examiner*—Brian Sircus
*Attorney, Agent, or Firm*—Burns Doane Swecker & Mathis L.L.P.

[57] ABSTRACT

An improvement is set forth in a robotic arm structure which includes at least two links. θ motion is provided about a primary axis at the proximal end portion of the proximal-most of the links. R motion proceeds radially from the primary axis whereby the distal end portion of the distalmost of the links can be moved in a radially extending straight line. At least two independent end effectors are pivotally mounted for rotation relative to the distal end portion of the distalmost link about an end effector axis which is parallel to the primary axis. The structure is improved by adding independent yaw motors for rotating the end effectors independently.

16 Claims, 53 Drawing Sheets

U.S. PATENT DOCUMENTS

| | | |
|---|---|---|
| 4,735,539 | 4/1988 | Häkkinen et al. . |
| 4,746,256 | 5/1988 | Boyle et al. . |
| 4,762,459 | 8/1988 | Morita et al. . |
| 4,766,322 | 8/1988 | Hashimoto . |
| 4,770,590 | 9/1988 | Hugues et al. . |
| 4,782,713 | 11/1988 | Torii et al. . |
| 4,794,513 | 12/1988 | Müller . |
| 4,795,957 | 1/1989 | MacNeal, Jr. et al. . |
| 4,808,059 | 2/1989 | Eddy . |
| 4,808,064 | 2/1989 | Bartholet . |
| 4,846,626 | 7/1989 | Engelbrecht . |
| 4,897,014 | 1/1990 | Tietze ................... 414/729 |
| 4,897,015 | 1/1990 | Abbe et al. . |
| 4,907,035 | 3/1990 | Galburt et al. . |
| 4,921,395 | 5/1990 | Sahlin . |
| 4,928,245 | 5/1990 | Moy et al. . |
| 4,951,601 | 8/1990 | Maydan et al. ........... 118/719 |
| 4,961,267 | 10/1990 | Herzog ................... 33/503 |
| 5,007,784 | 4/1991 | Genov et al. ............ 414/225 |
| 5,017,075 | 5/1991 | Block . |
| 5,053,687 | 10/1991 | Merlet . |
| 5,064,160 | 11/1991 | Brumby . |
| 5,064,340 | 11/1991 | Genov et al. ........... 414/744.5 |
| 5,099,707 | 3/1992 | Tori et al. . |
| 5,102,280 | 4/1992 | Poduje et al. . |
| 5,107,716 | 4/1992 | Torii et al. . |
| 5,109,724 | 5/1992 | Delarue et al. . |
| 5,116,190 | 5/1992 | Silke . |
| 5,135,349 | 8/1992 | Lorenz et al. ........... 414/744.6 |
| 5,157,315 | 10/1992 | Miyake et al. . |
| 5,178,512 | 1/1993 | Skrobak . |
| 5,202,716 | 4/1993 | Tateyama et al. ........ 396/624 |
| 5,220,849 | 6/1993 | Lande et al. . |
| 5,234,303 | 8/1993 | Koyano . |
| 5,278,494 | 1/1994 | Obigane . |
| 5,280,981 | 1/1994 | Schulz ................... 294/106 |
| 5,438,647 | 8/1995 | Nagamatsu et al. ....... 395/82 |
| 5,445,491 | 8/1995 | Nakagawa et al. ....... 414/786 |
| 5,456,561 | 10/1995 | Poduje et al. ........... 414/225 |
| 5,535,306 | 7/1996 | Stevens ................... 395/89 |
| 5,537,311 | 7/1996 | Stevens ................... 364/167.03 |
| 5,571,325 | 11/1996 | Ueyama et al. .......... 118/320 |
| 5,582,617 | 12/1996 | Klieman et al. ......... 606/170 |
| 5,604,443 | 2/1997 | Kitamura et al. . |
| 5,604,677 | 2/1997 | Brien . |
| 5,624,398 | 4/1997 | Smith et al. ............ 604/95 |
| 5,671,962 | 9/1997 | Otsuka et al. ........... 294/119.1 |
| 5,762,458 | 6/1998 | Wang et al. ............. 414/1 |
| 5,765,444 | 6/1998 | Bacchi et al. .......... 74/490.03 |
| 5,775,170 | 7/1998 | Genov et al. . |
| 5,789,890 | 8/1998 | Genov et al. ........... 318/567 |
| 5,794,487 | 8/1998 | Solomon et al. ........ 74/490.03 |
| 5,810,549 | 9/1998 | Wytman .................. 414/726 |
| 5,876,325 | 3/1999 | Mizuno et al. .......... 600/102 |

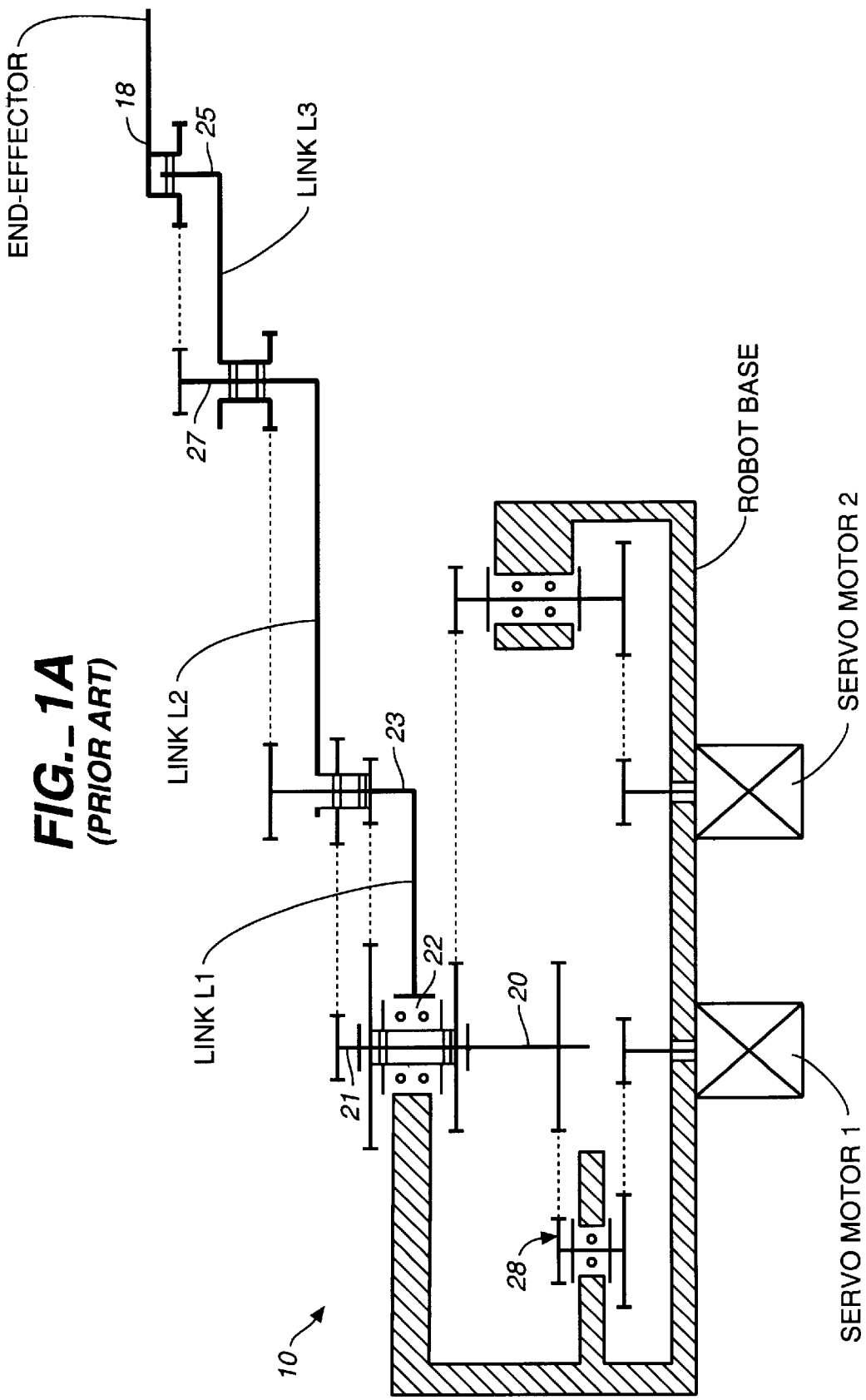
FIG._1A
(PRIOR ART)

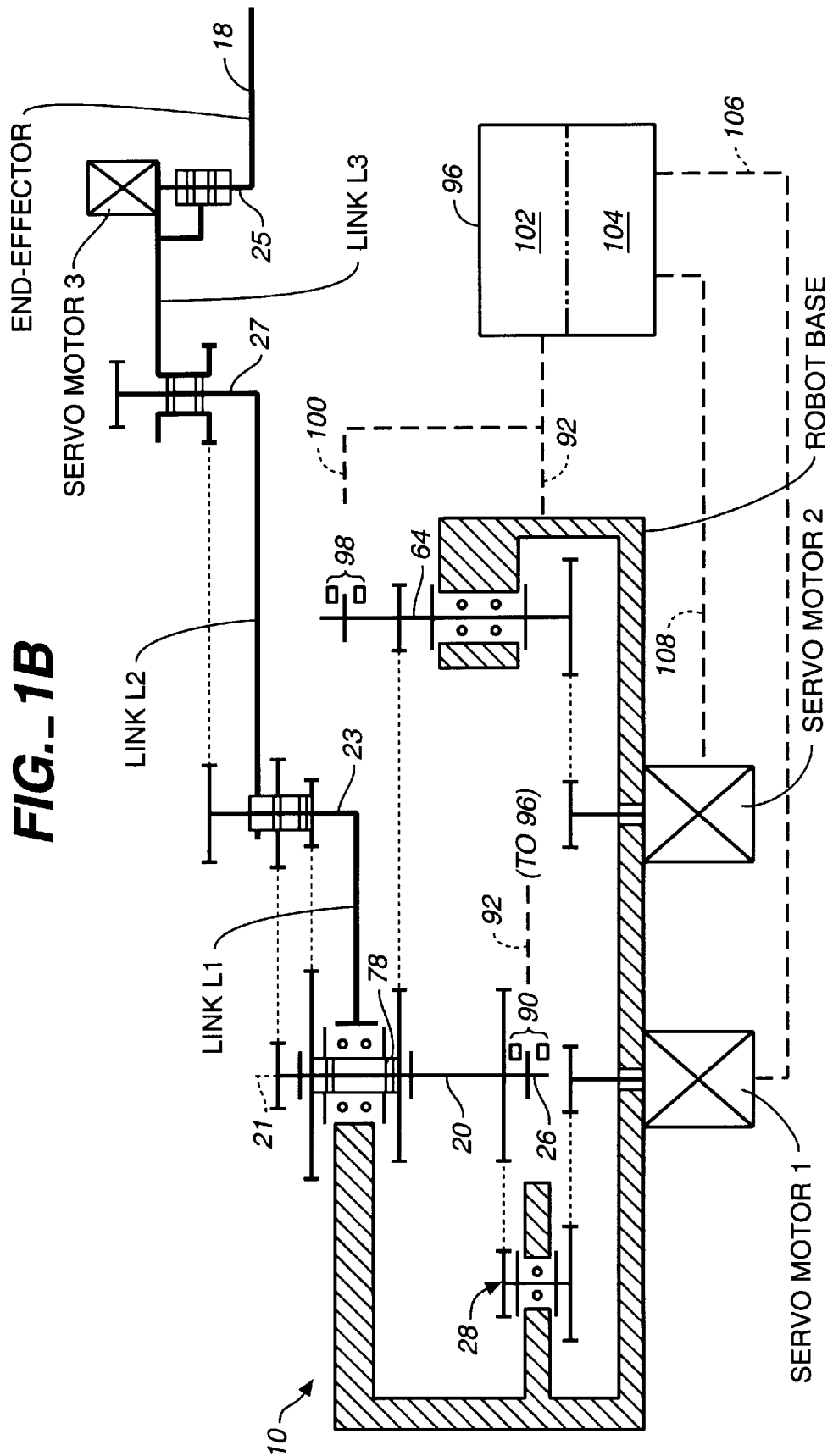
FIG._1B

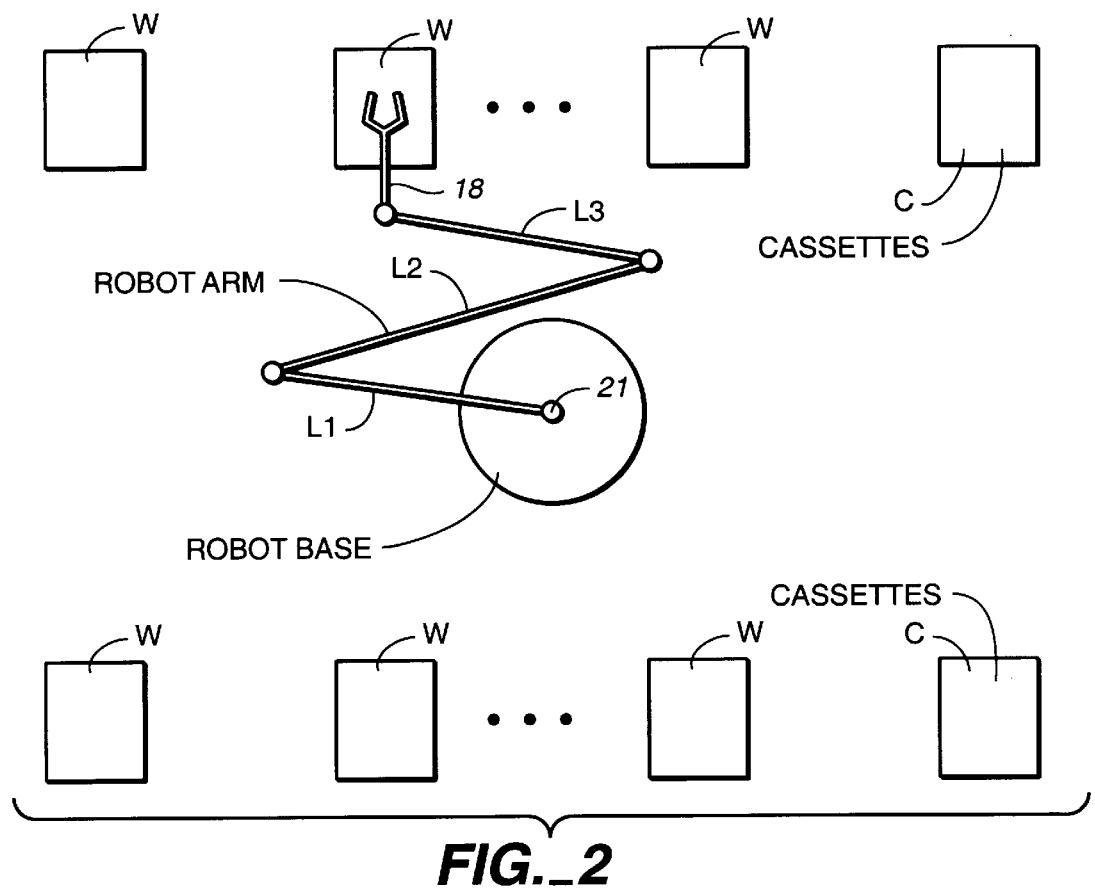
FIG._2
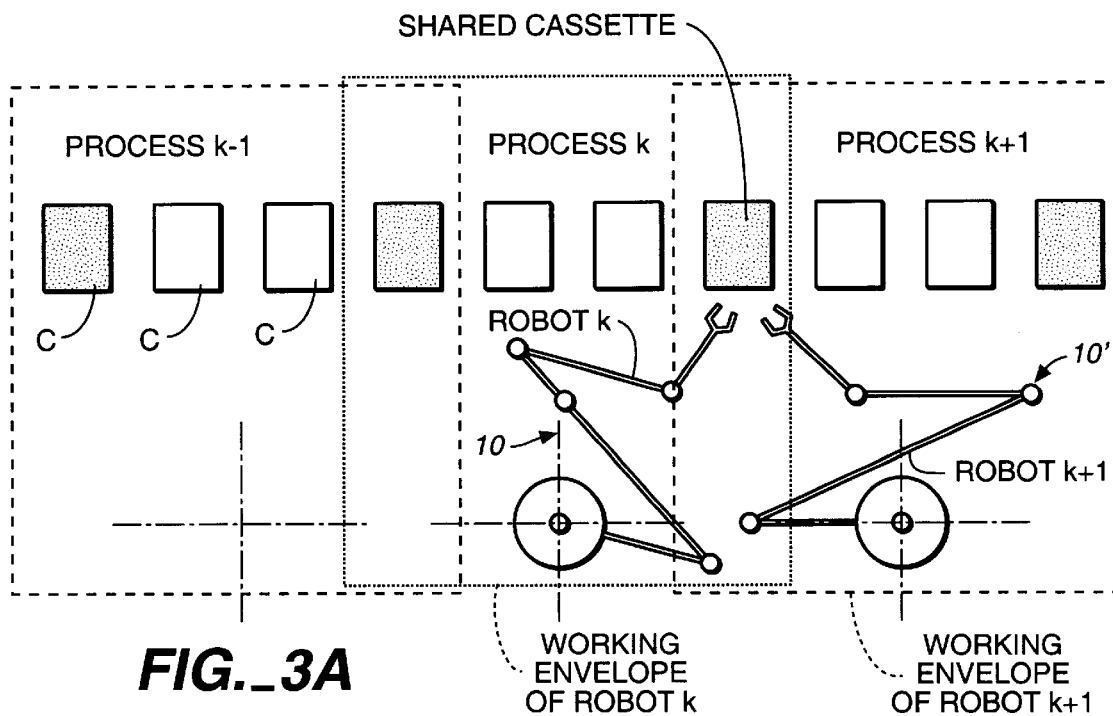
FIG._3A

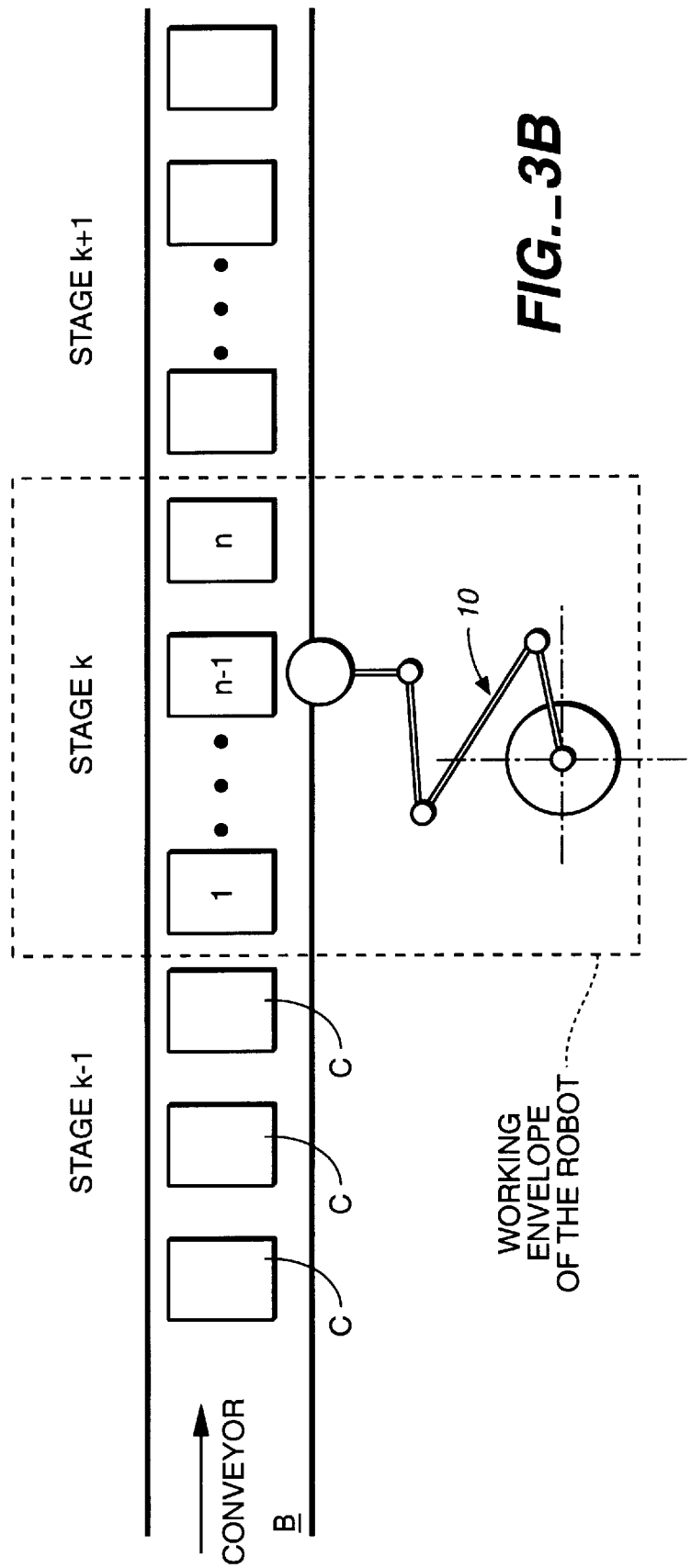
FIG._3B

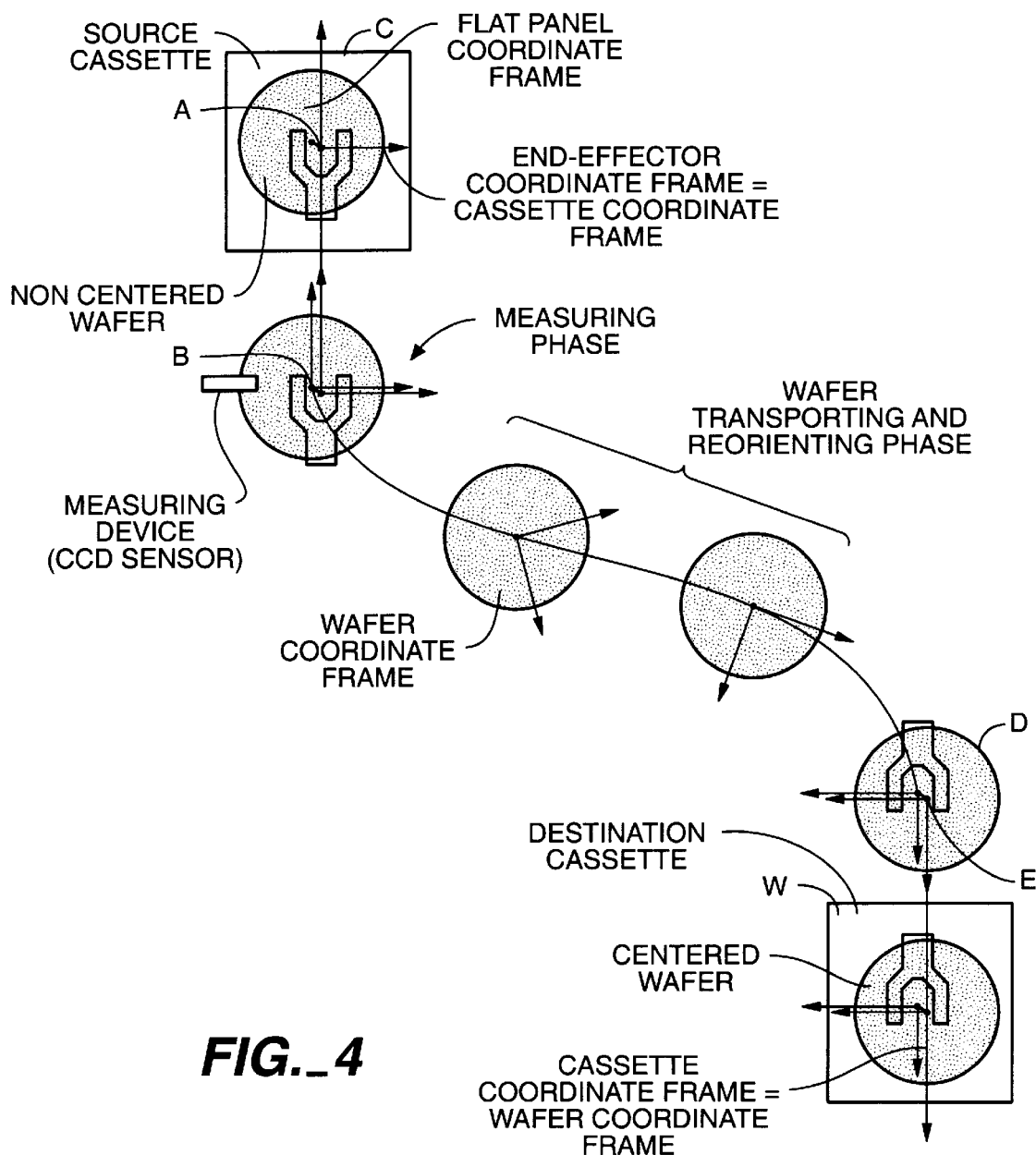
FIG._4

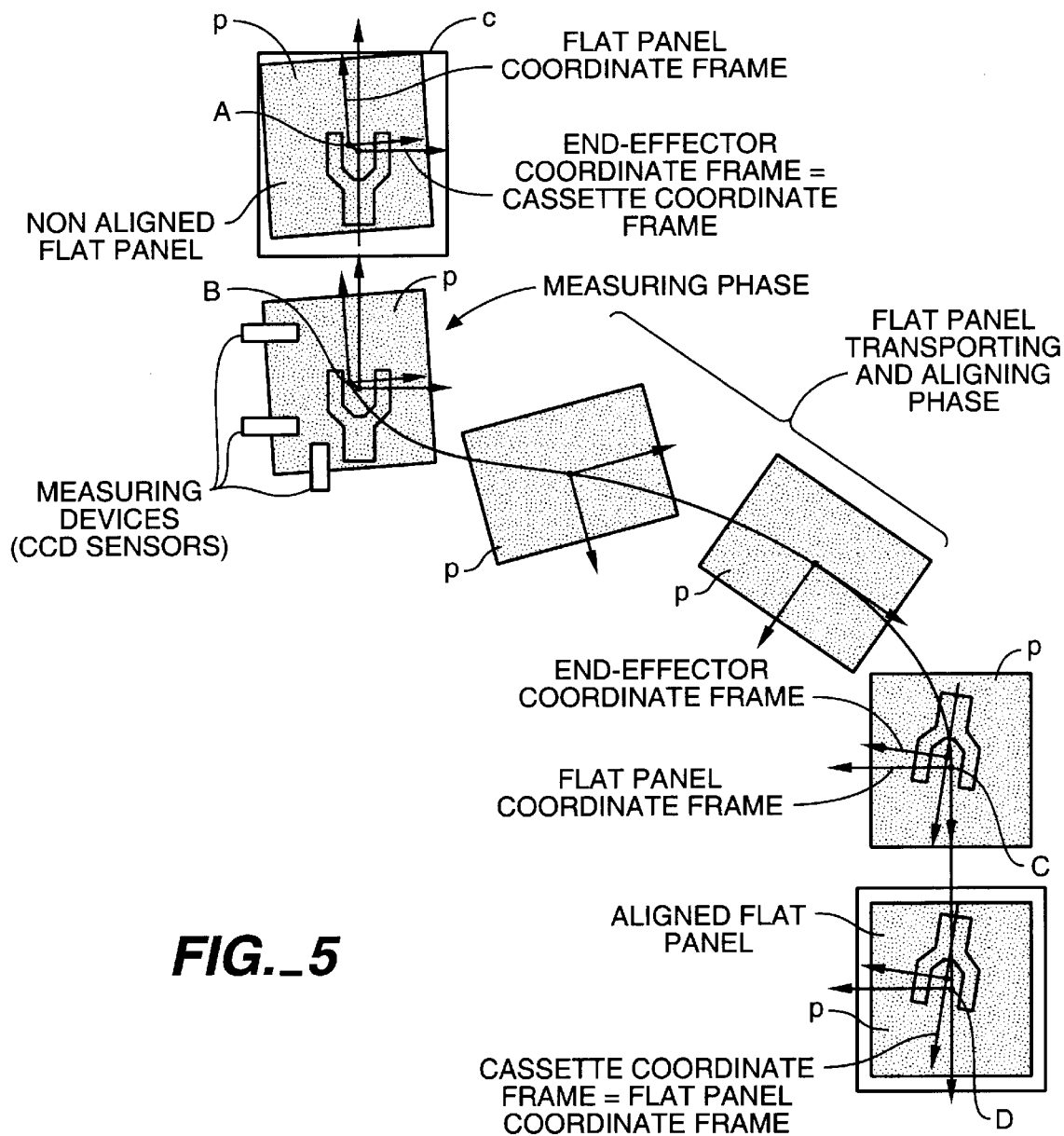
FIG._5

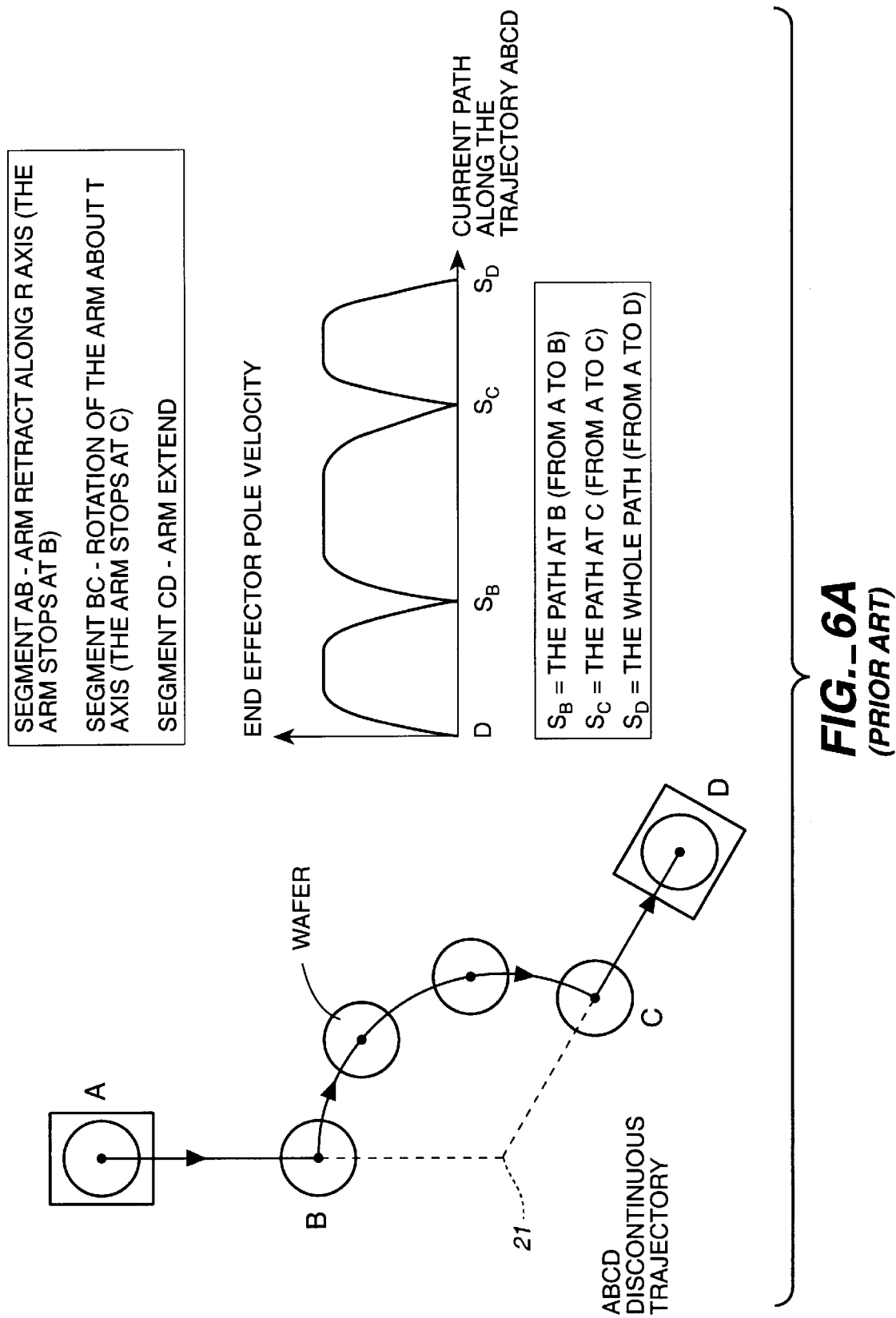
FIG._6A (PRIOR ART)

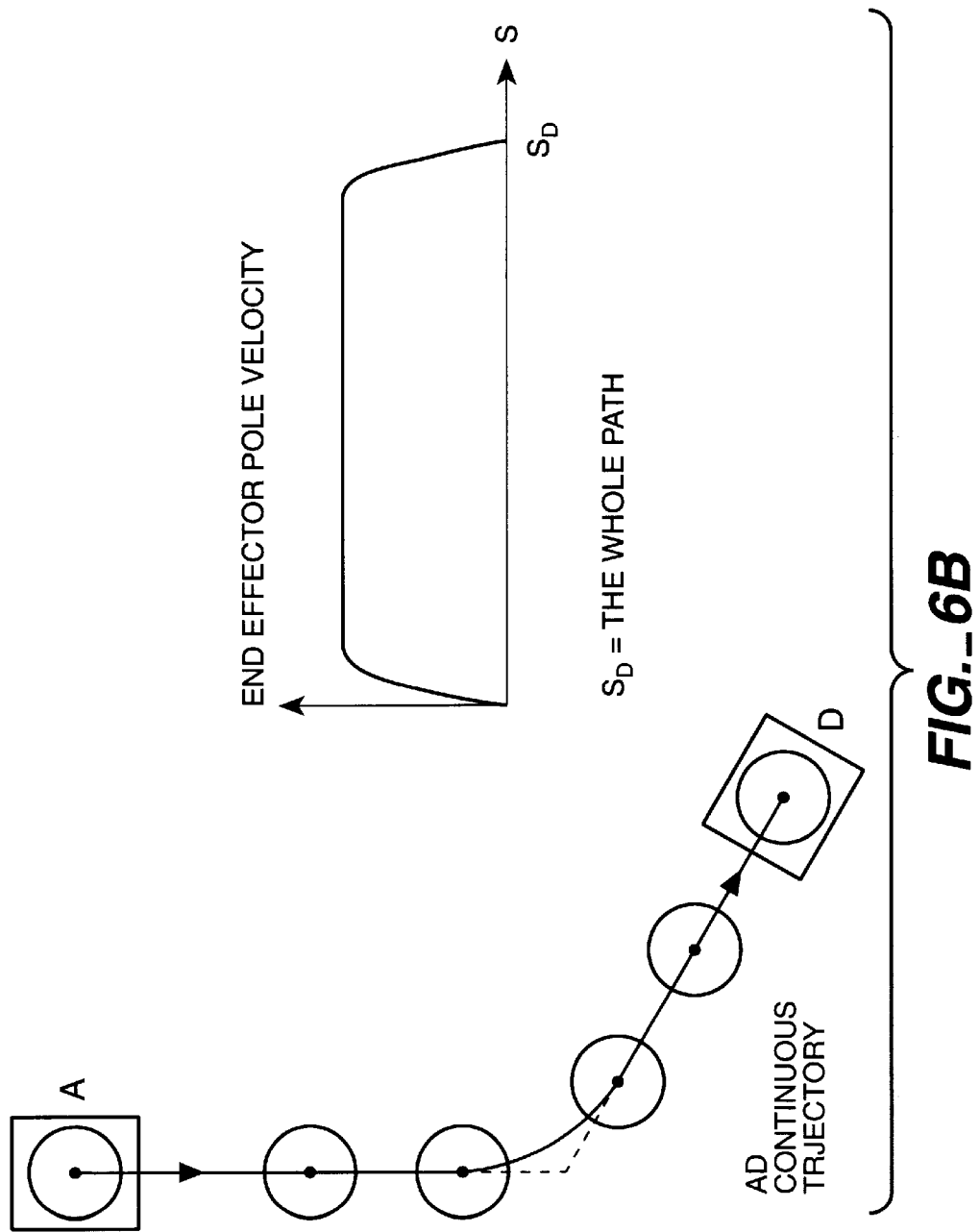
FIG._6B

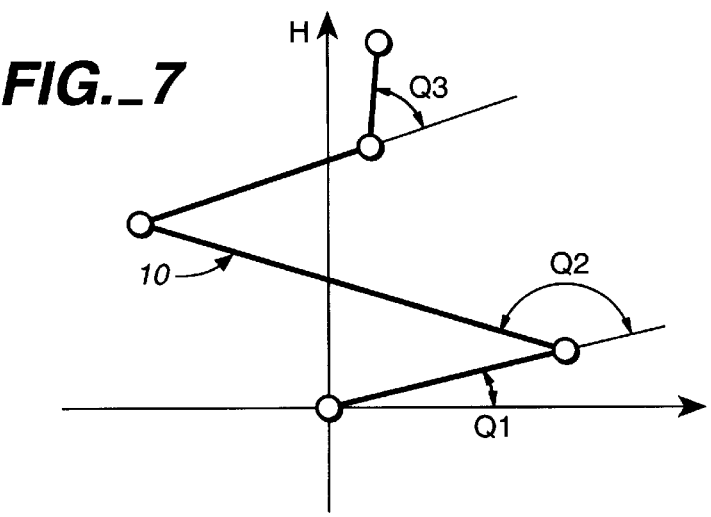
FIG._7
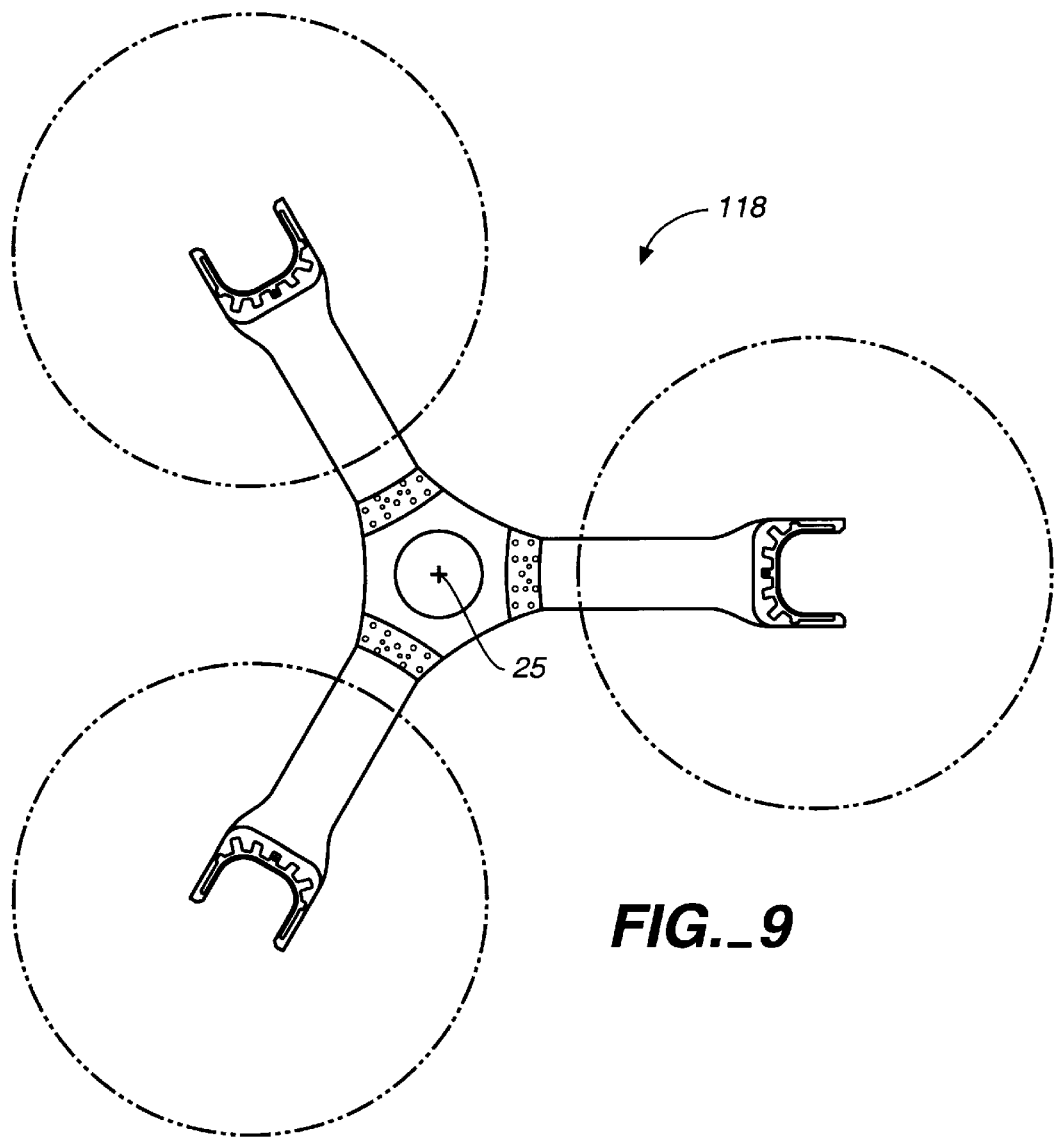
FIG._9

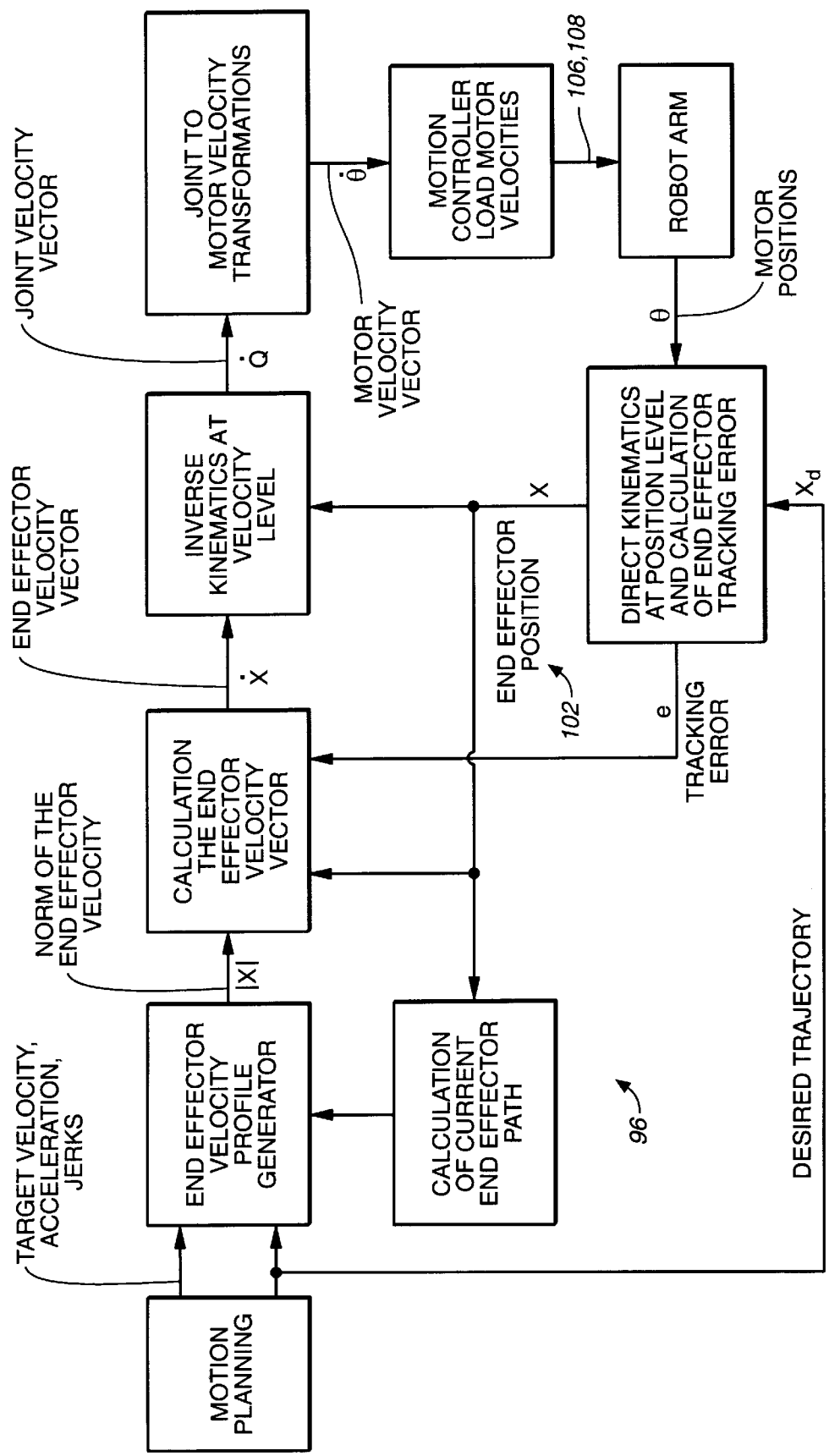
FIG._8

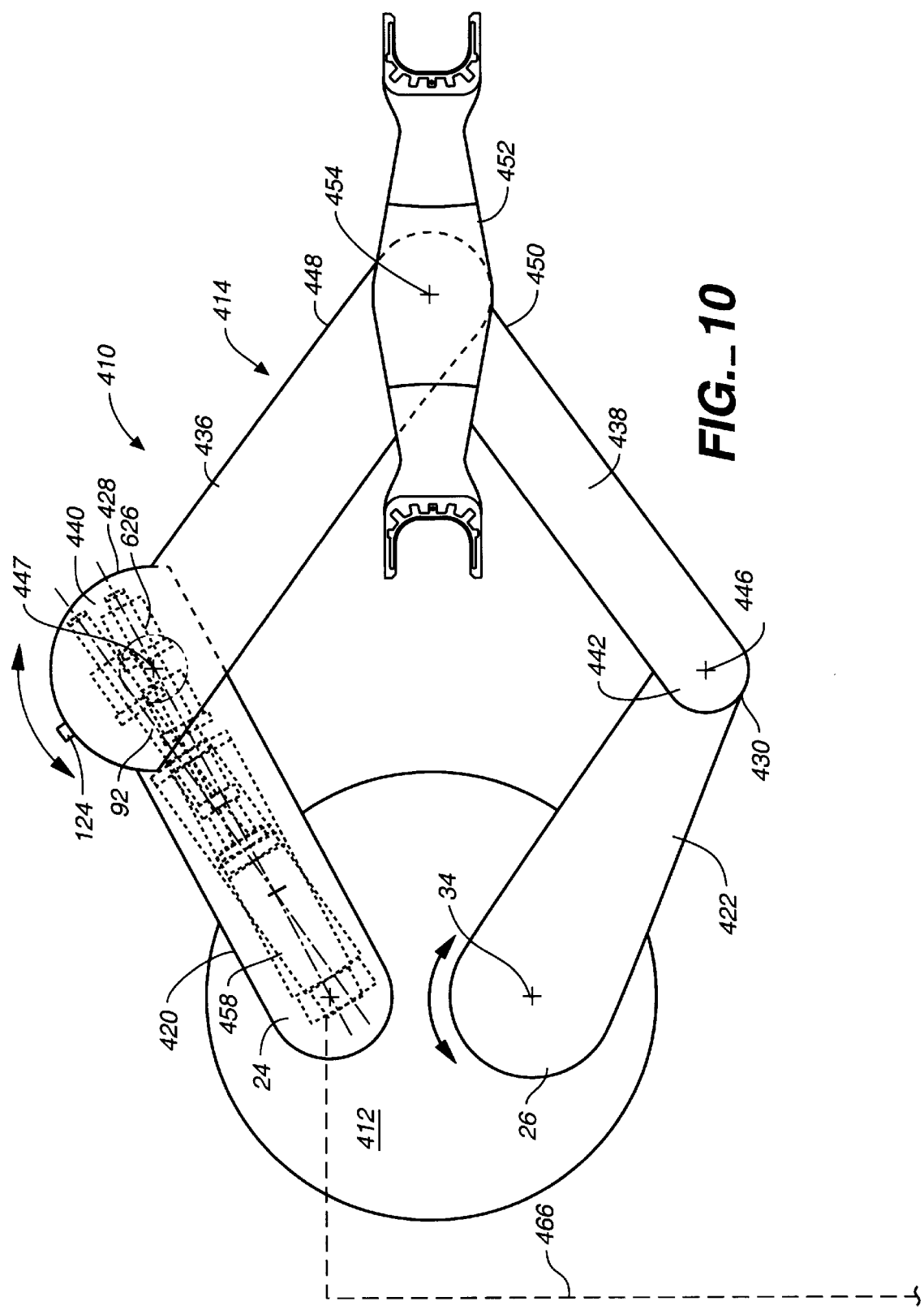
FIG._10

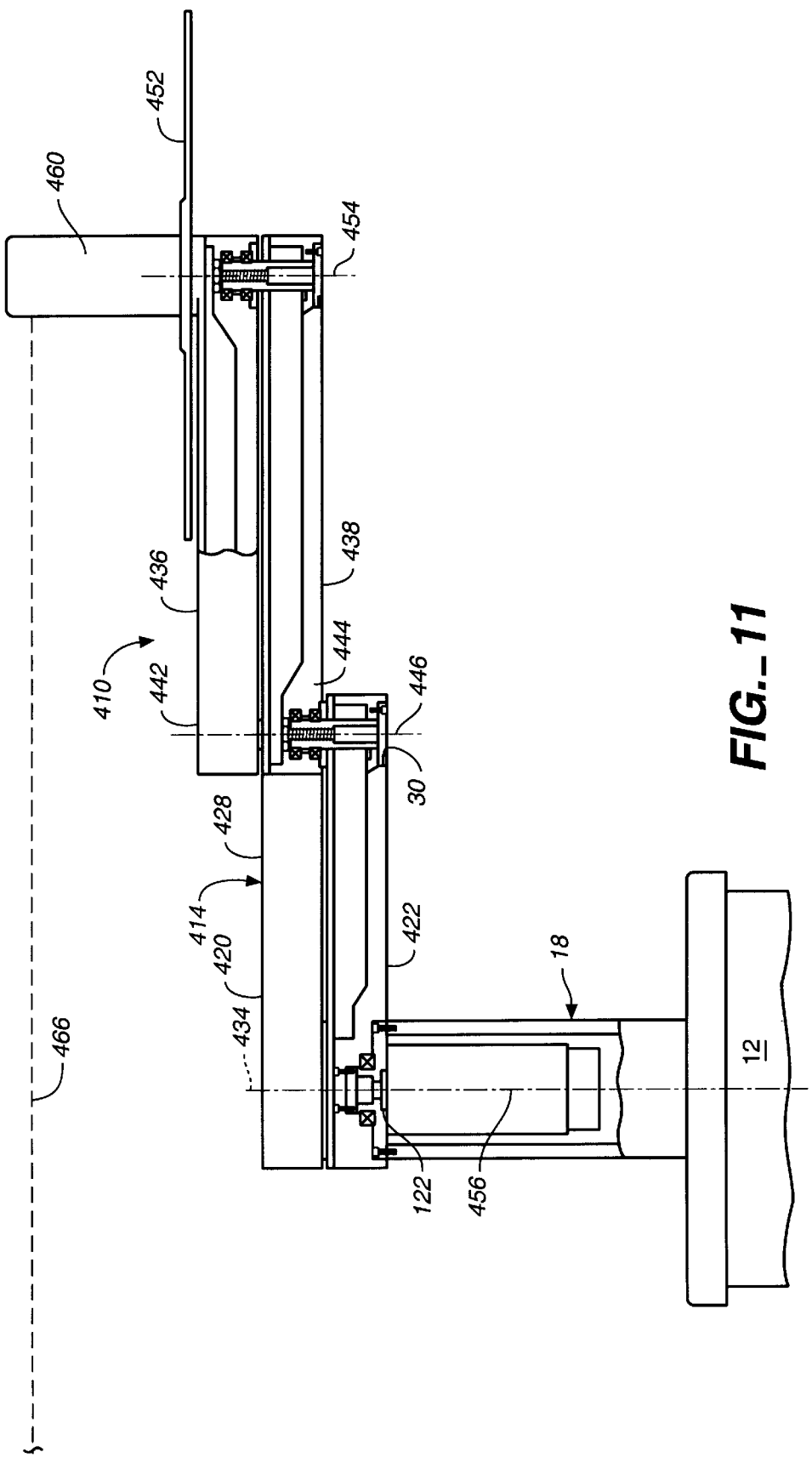
FIG._11

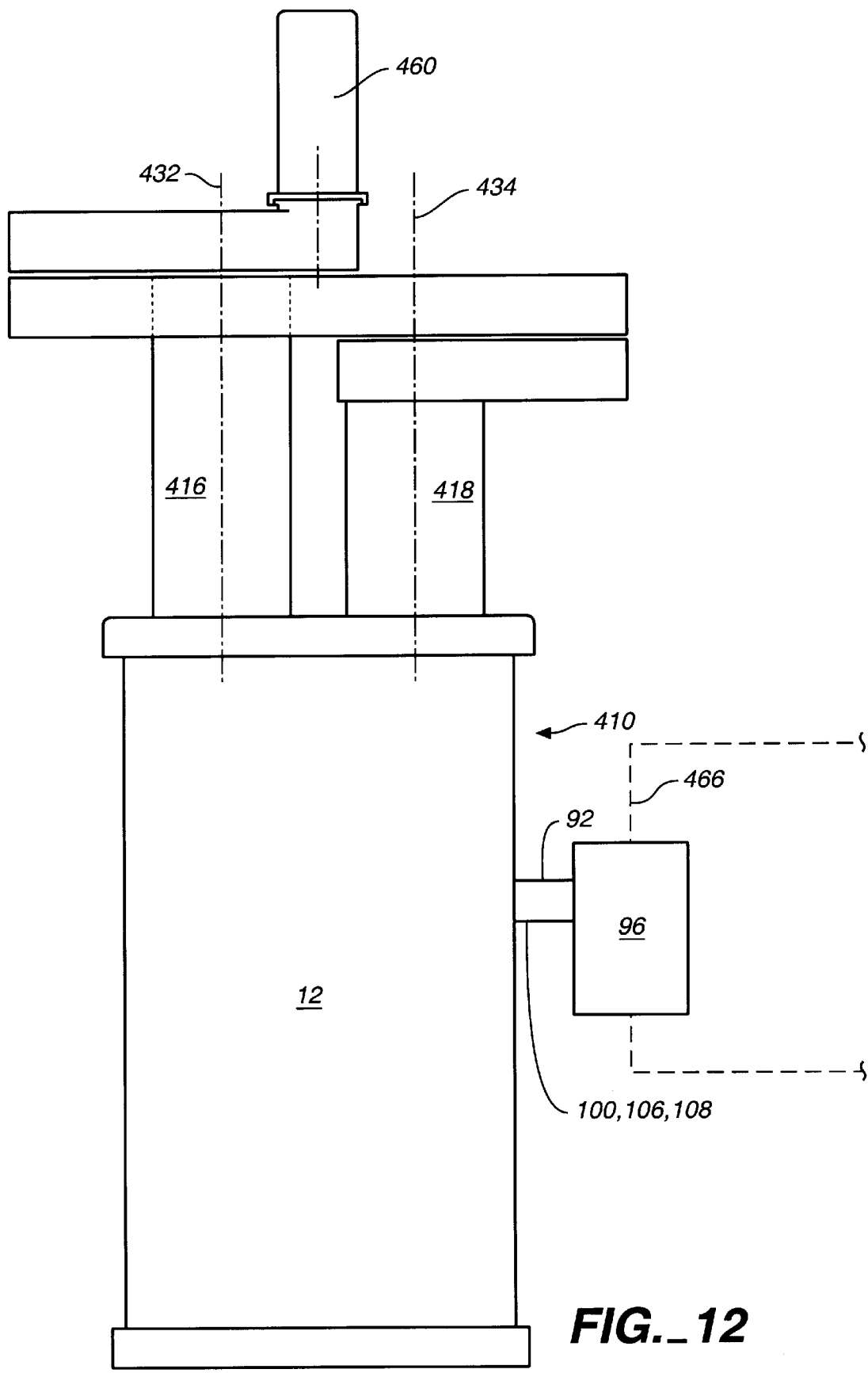
FIG._12

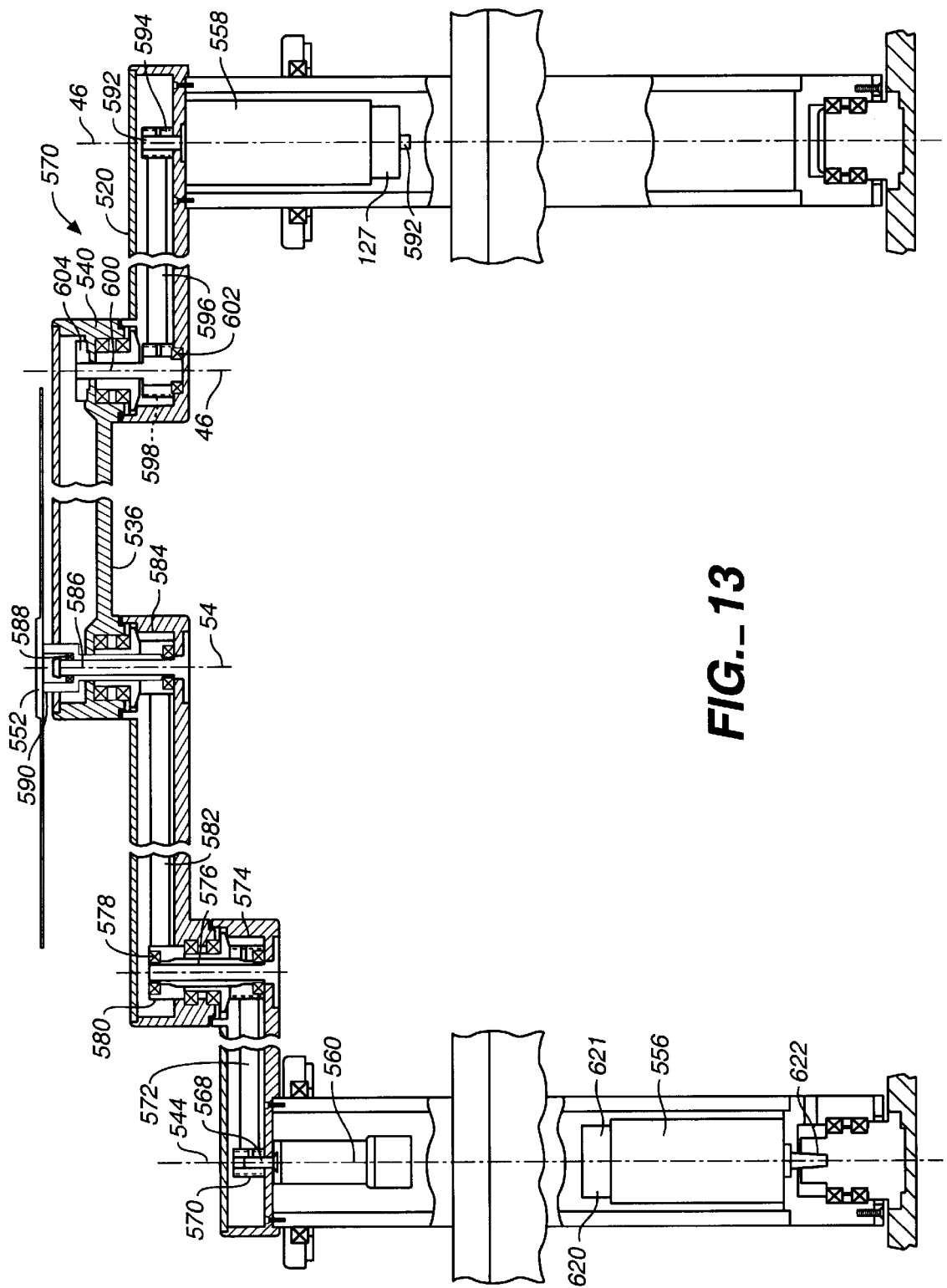
FIG._13

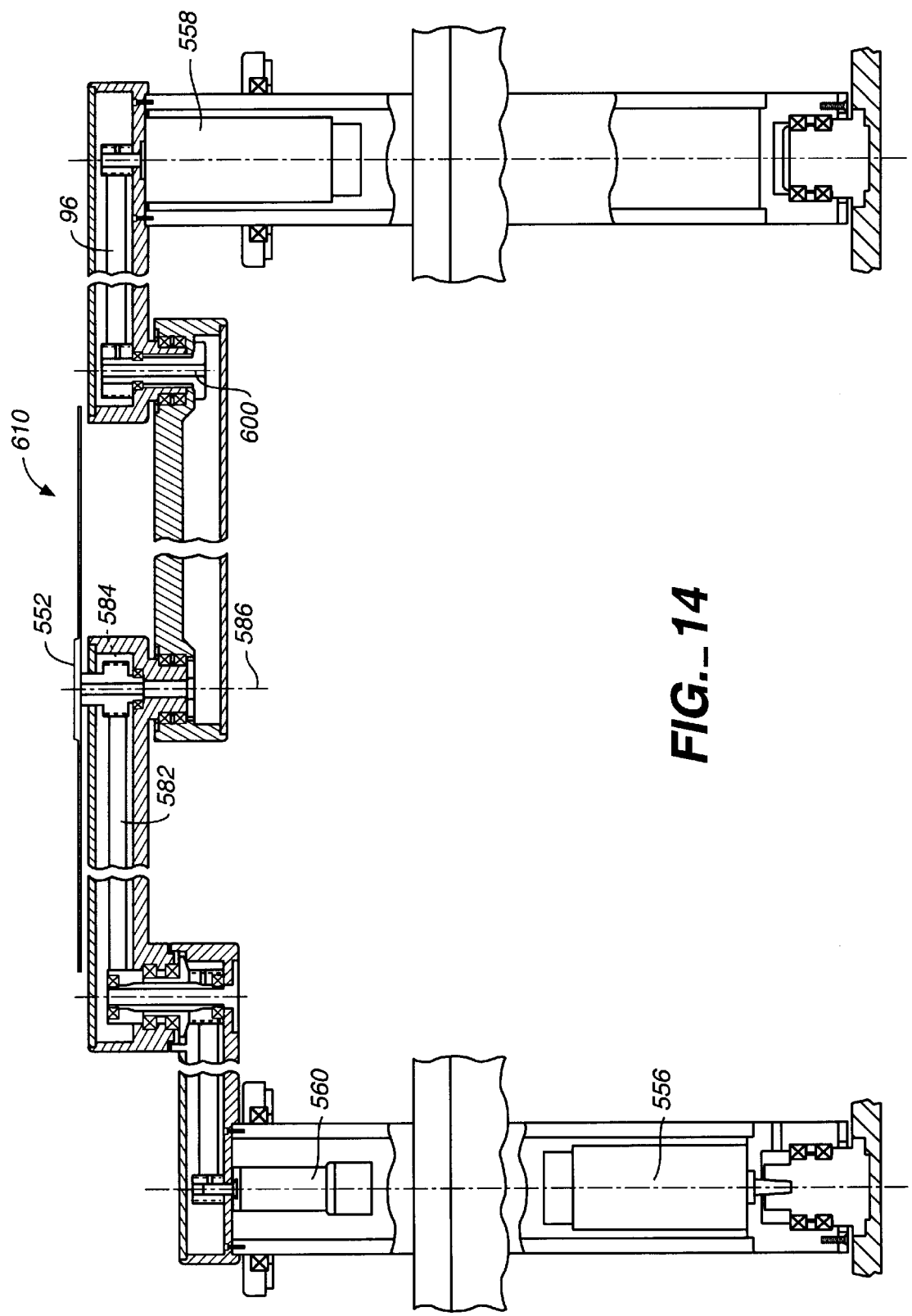
FIG._14

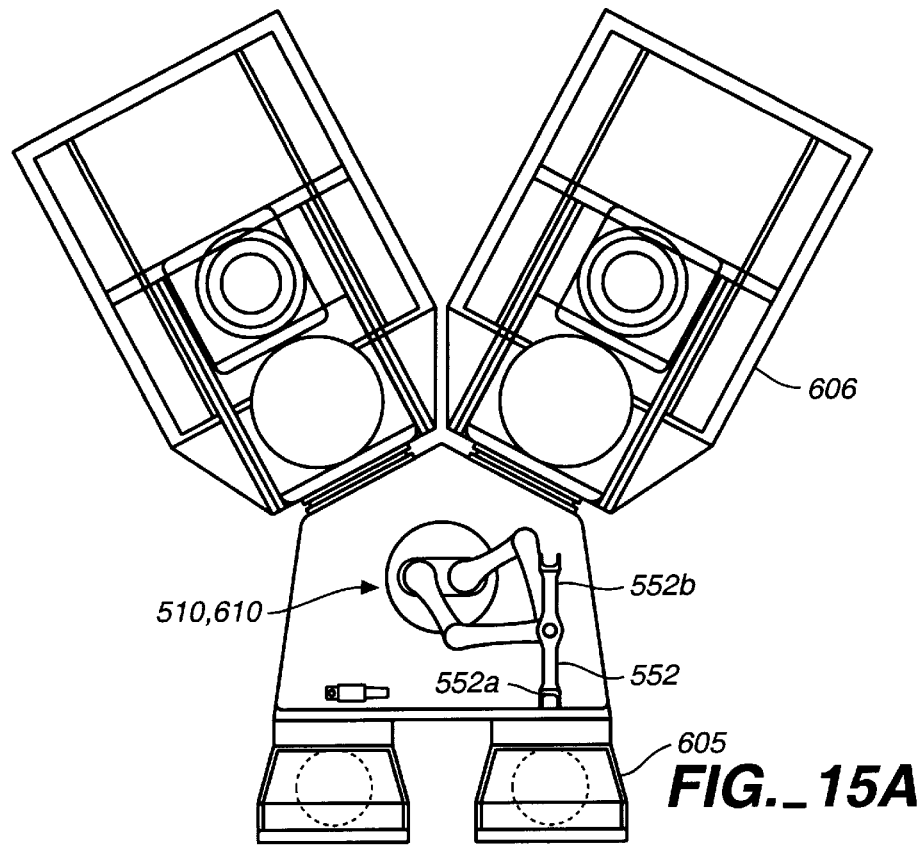
FIG._15A
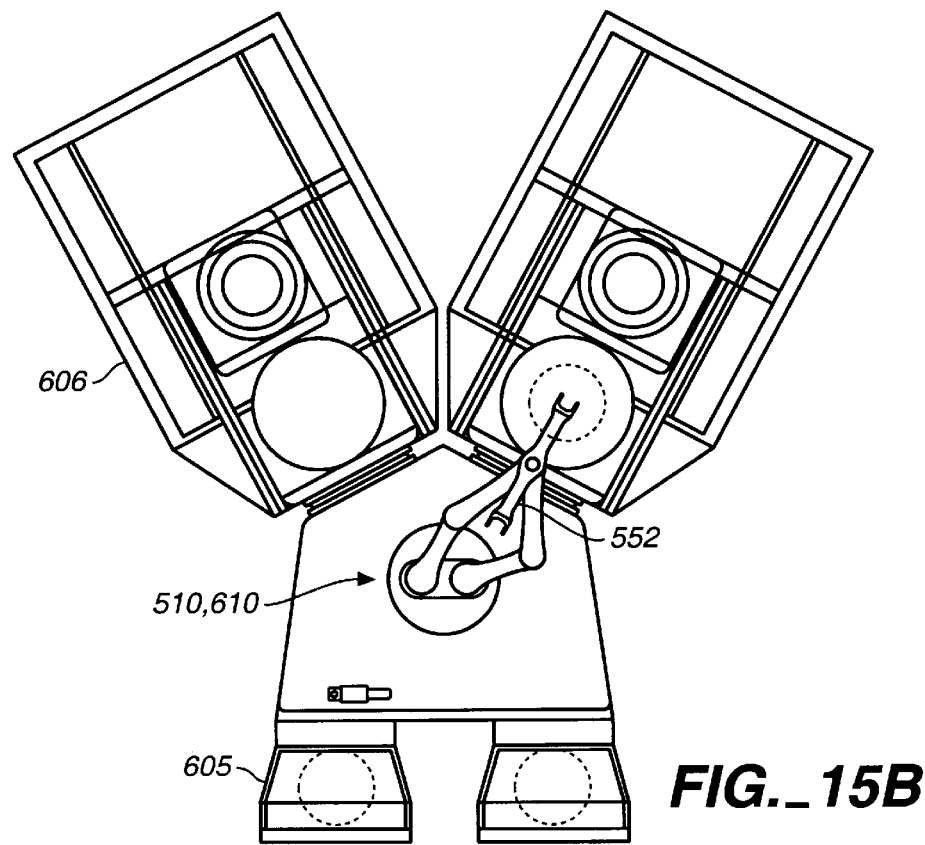
FIG._15B

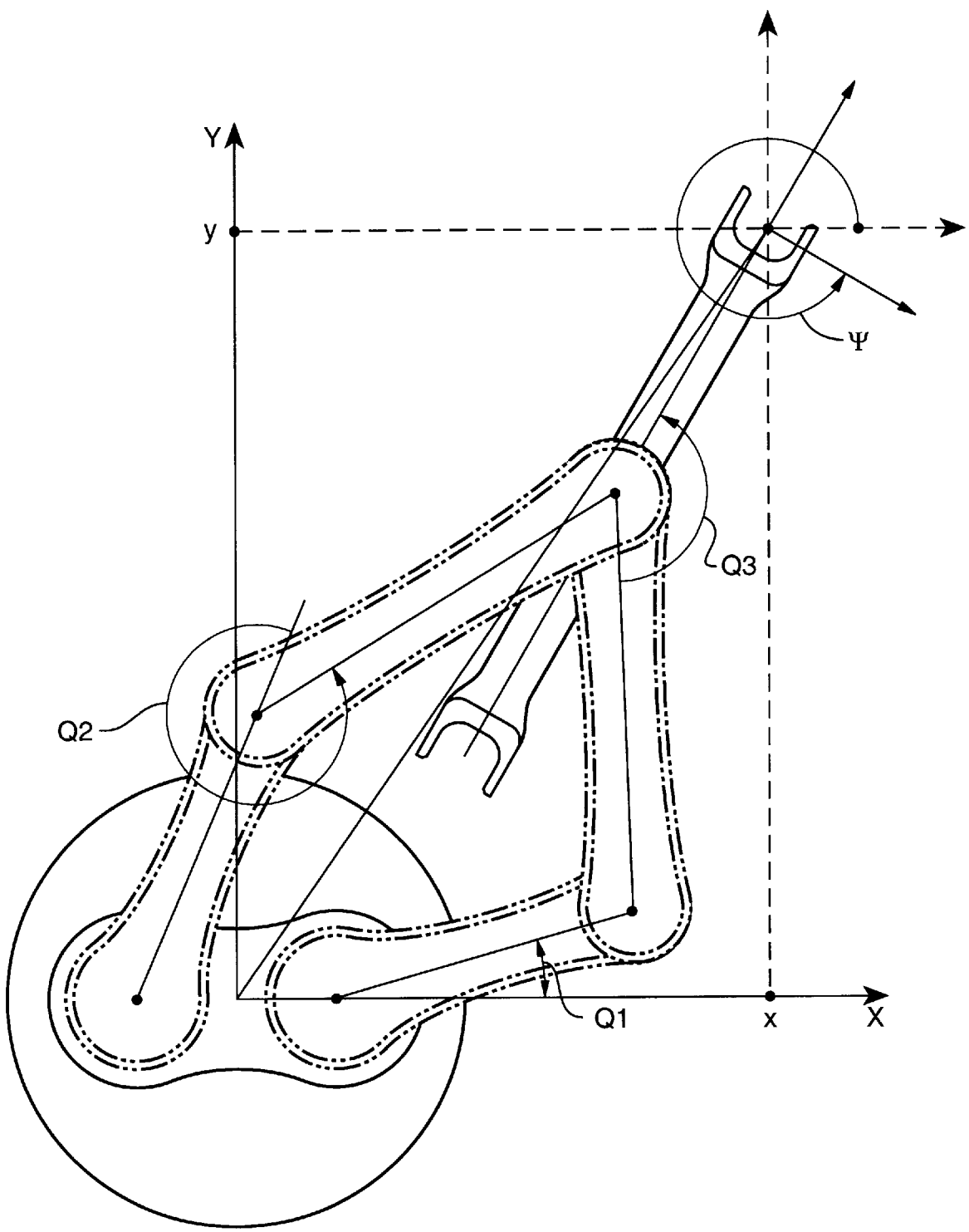
FIG._16

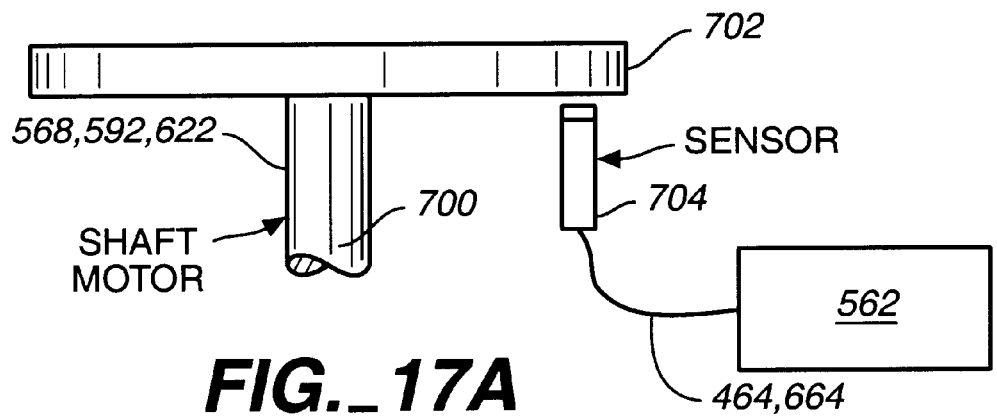
FIG._17A
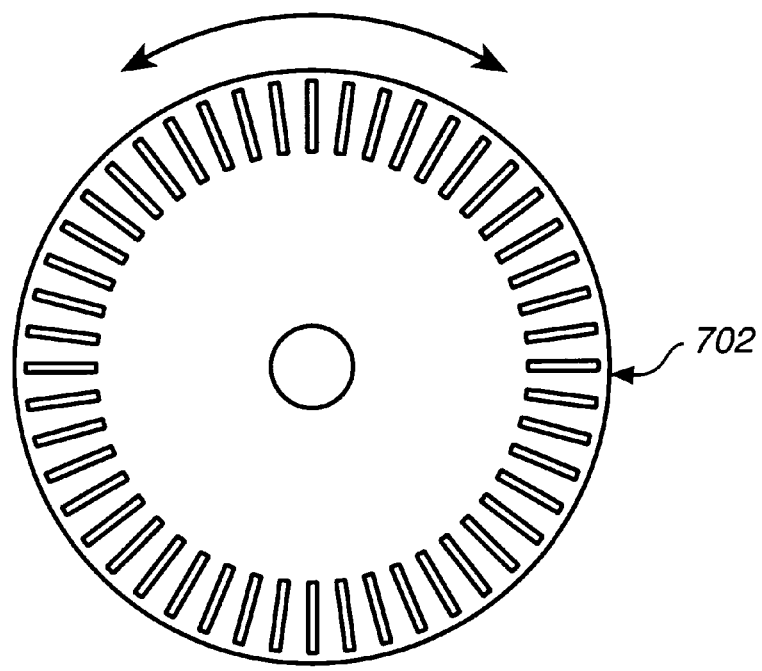
FIG._17B

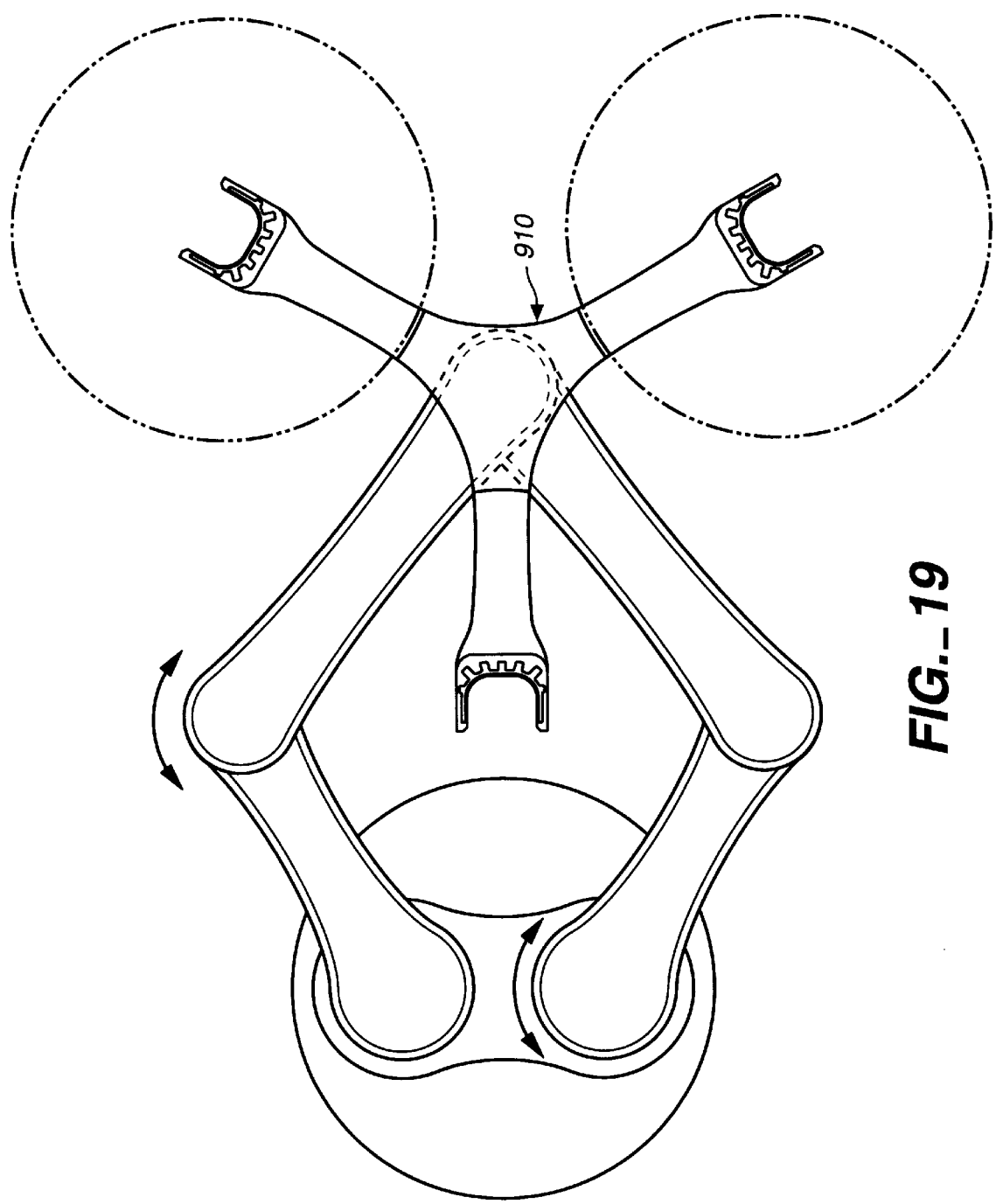

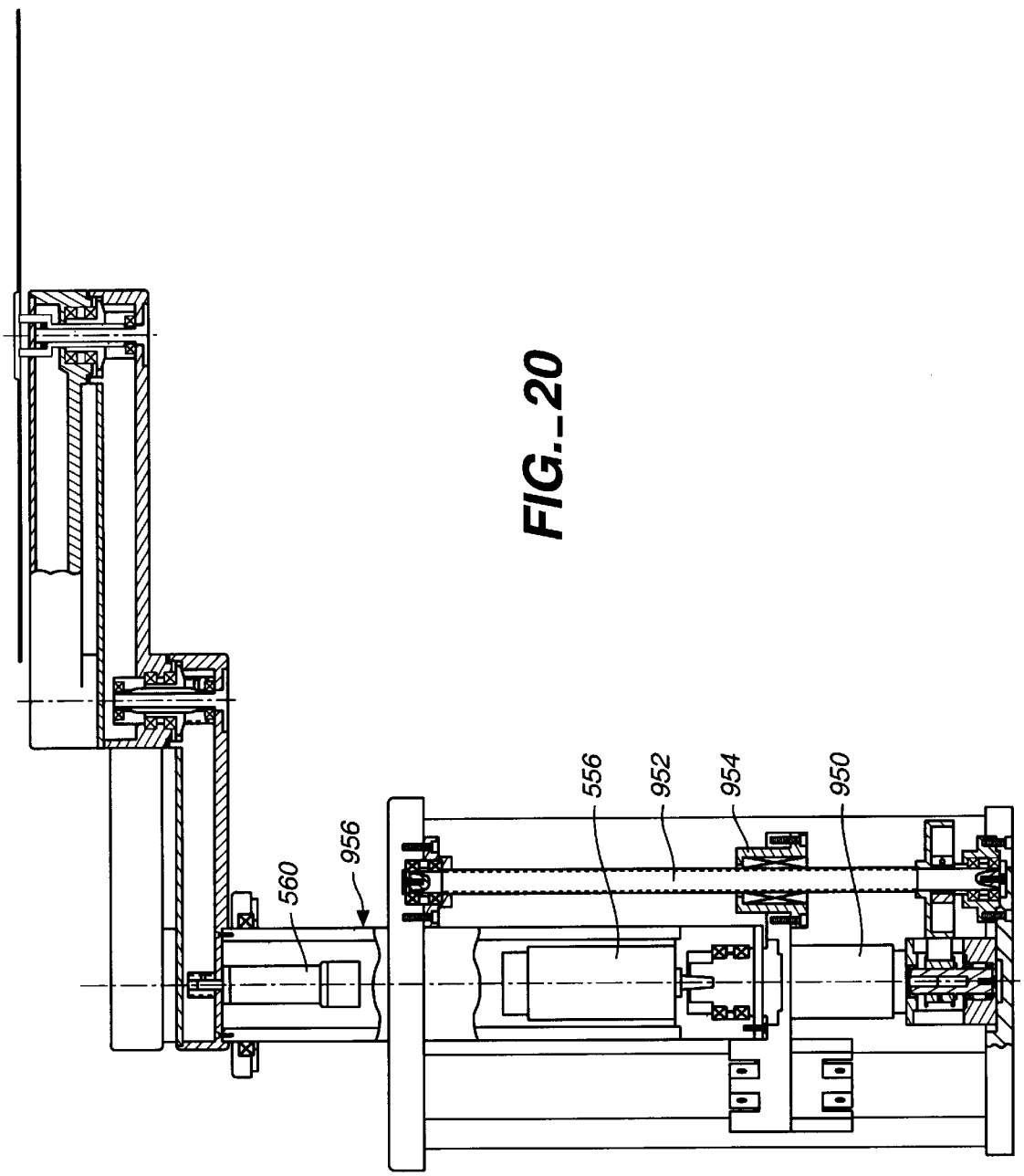
FIG._20

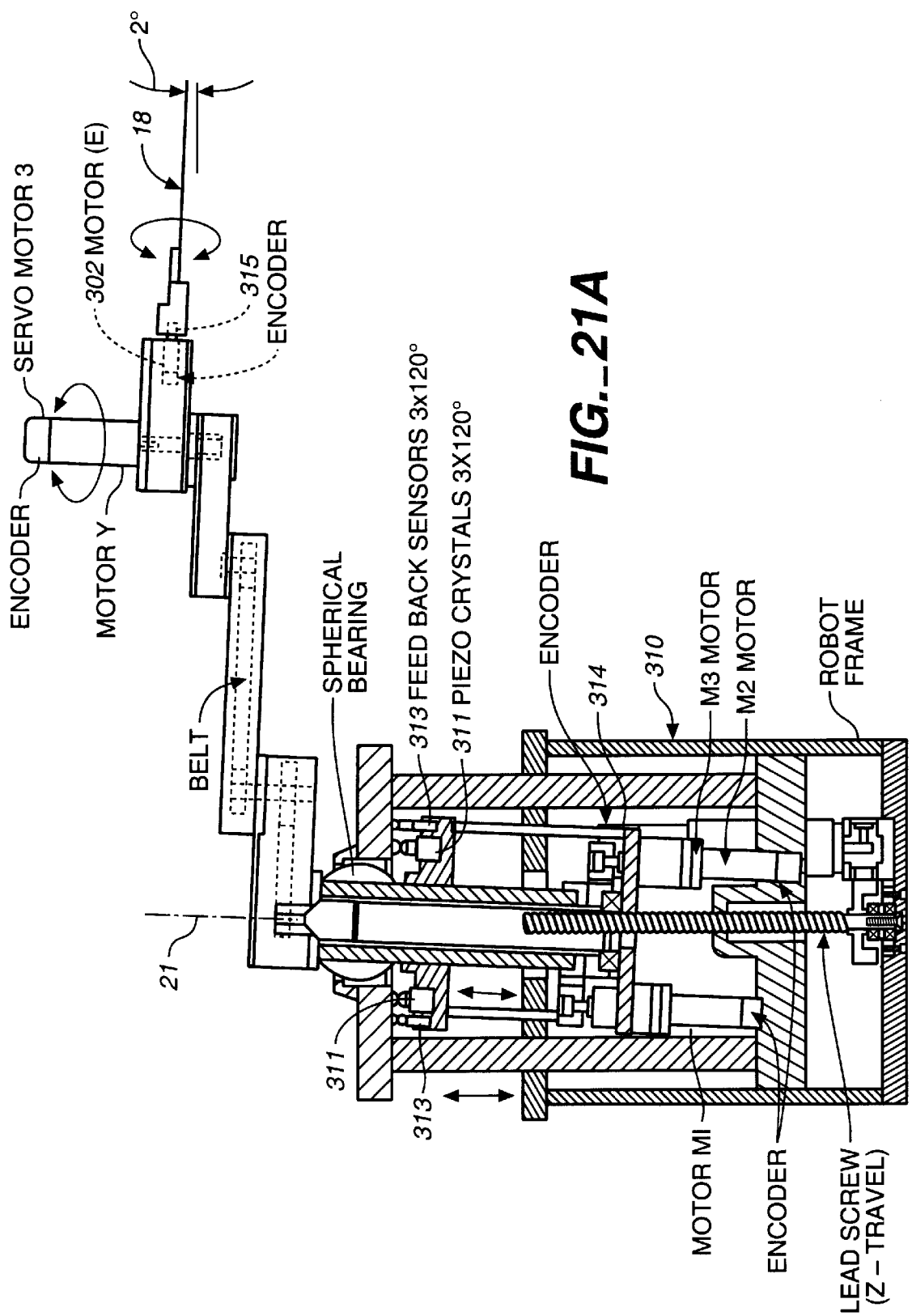

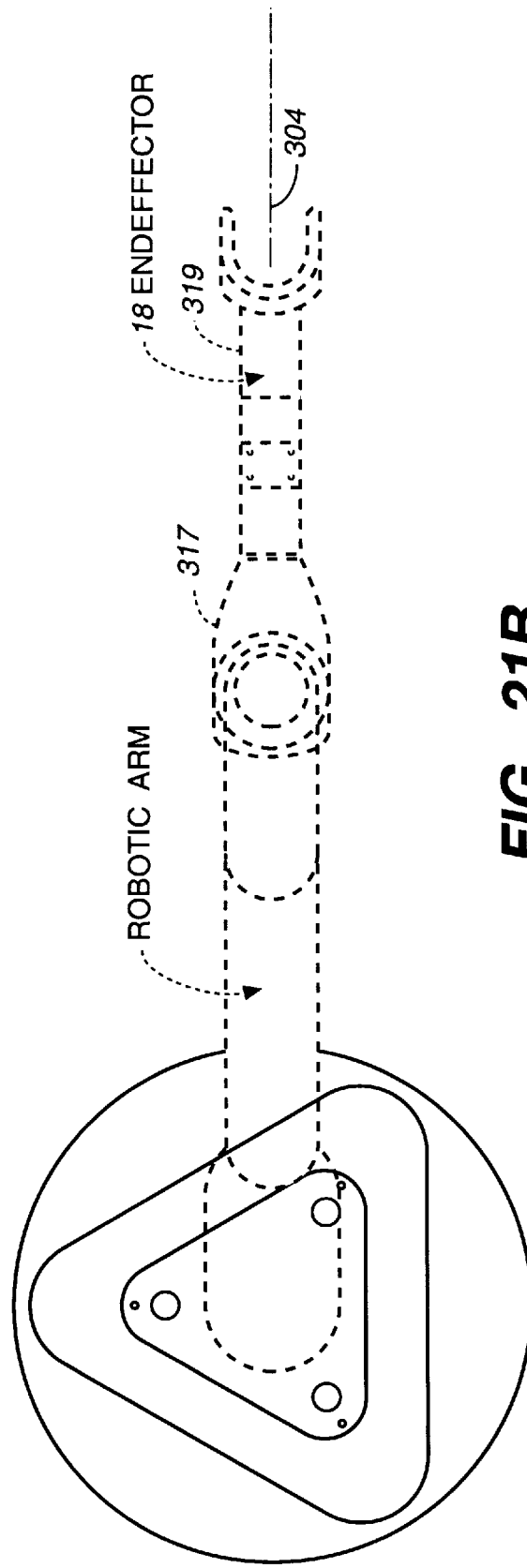
FIG._21B

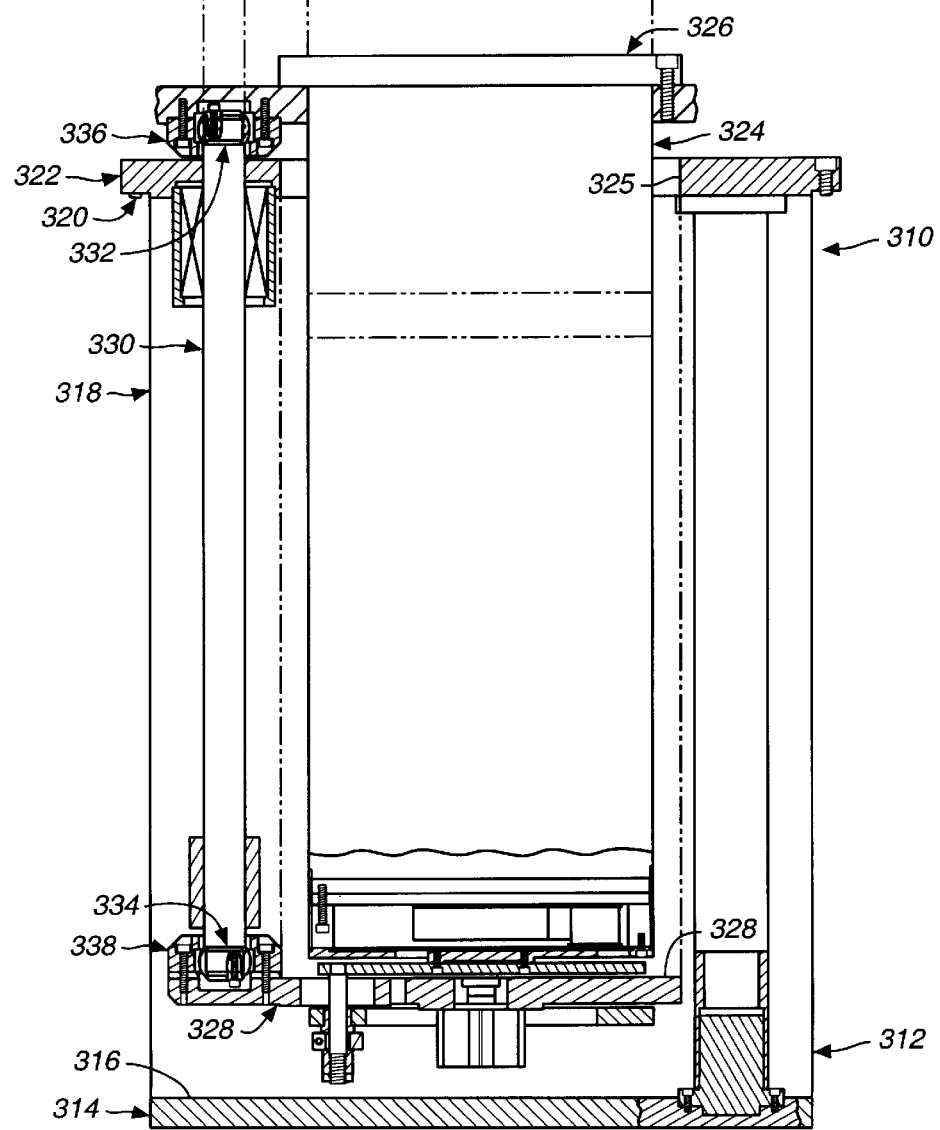
FIG._22

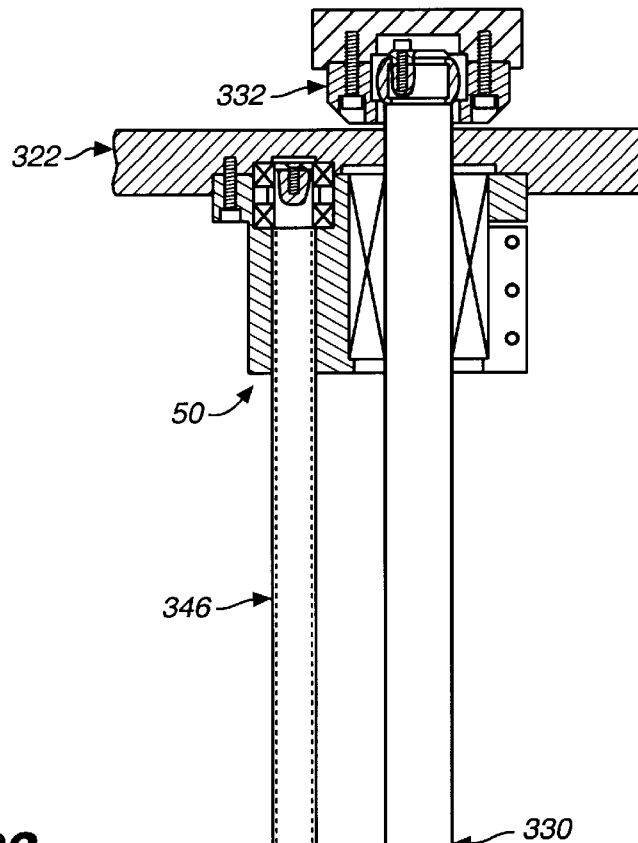
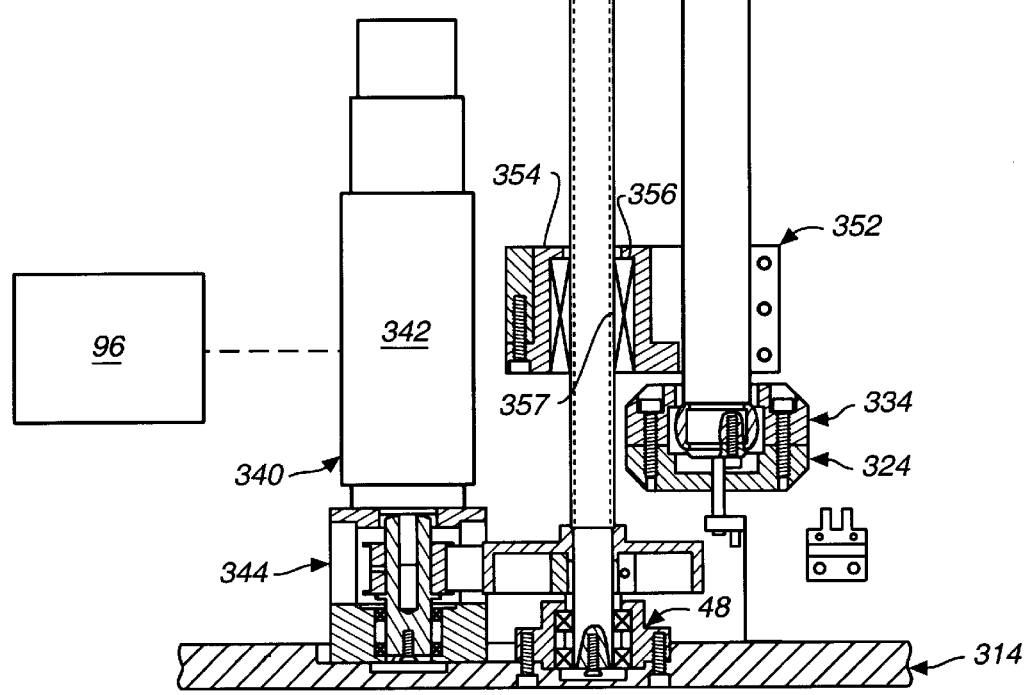
FIG._23

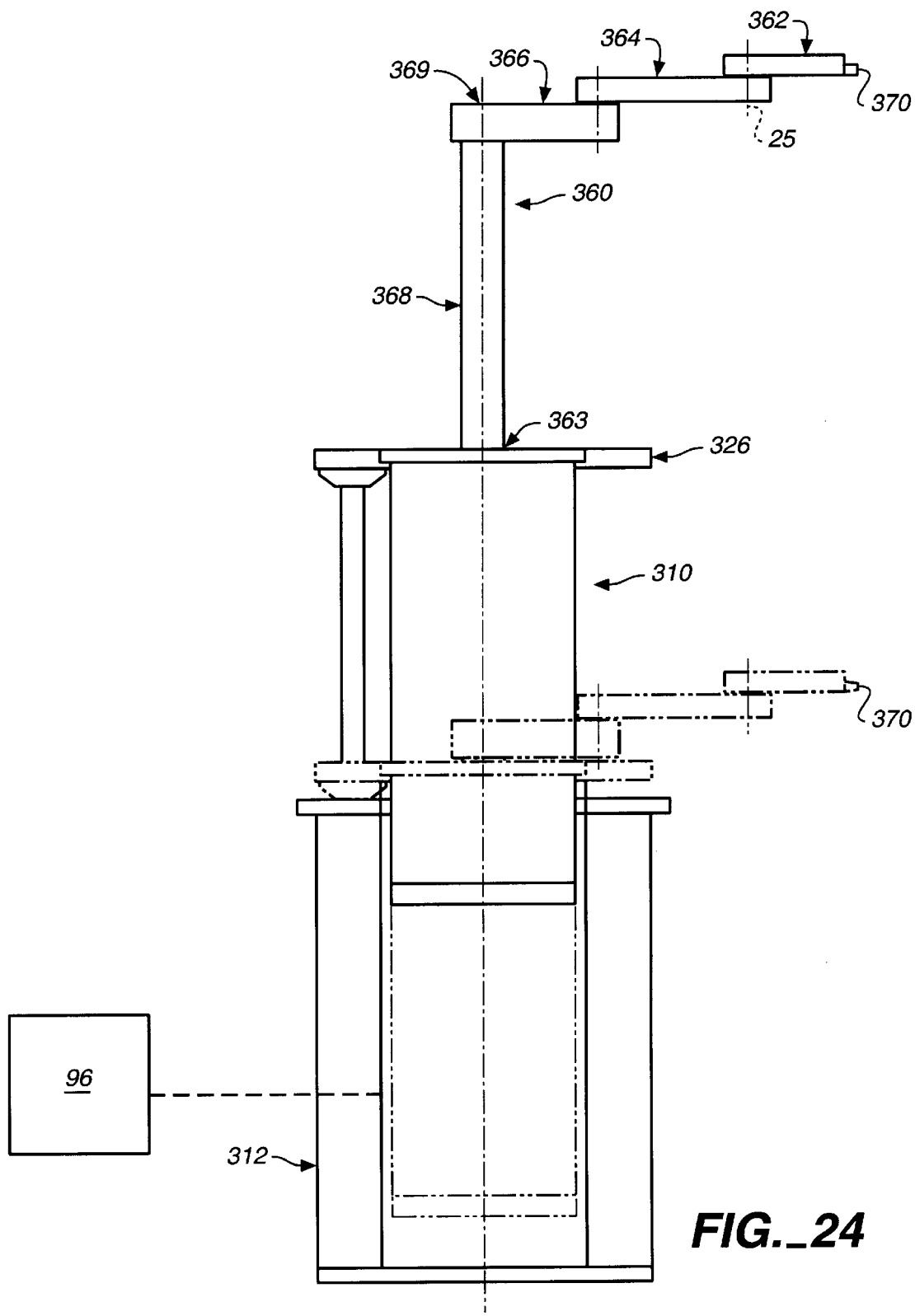
FIG._24

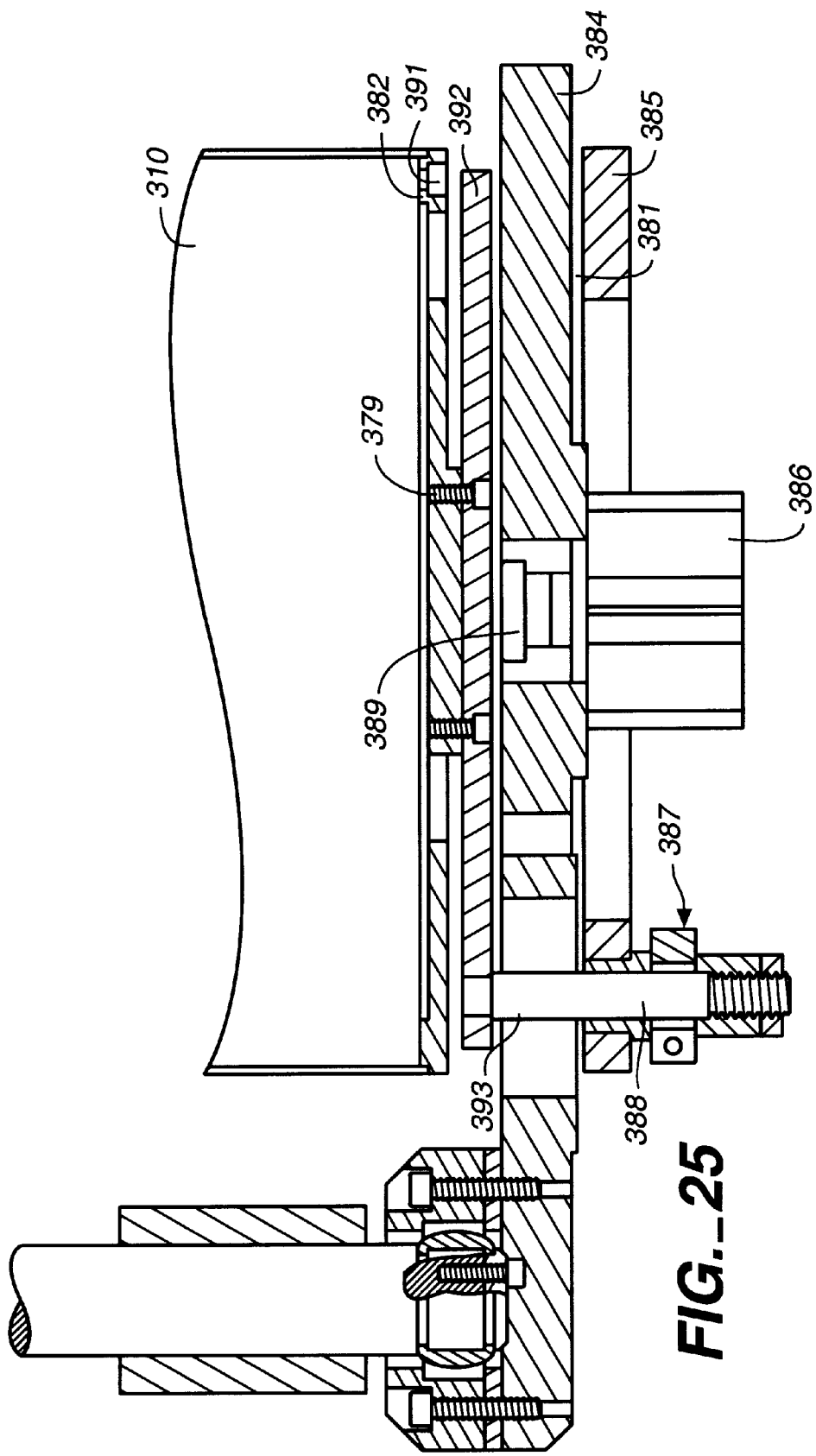
FIG._25

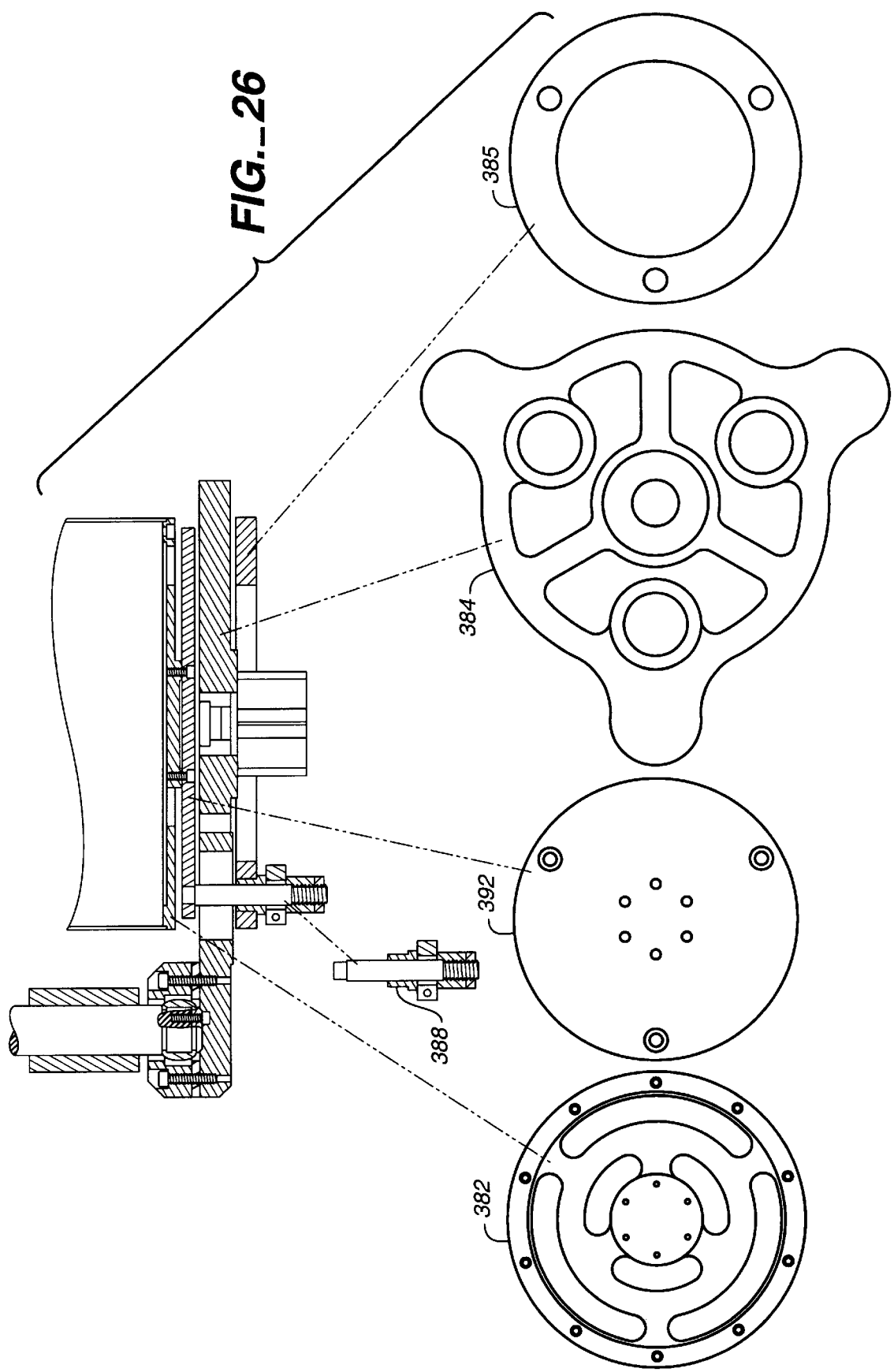

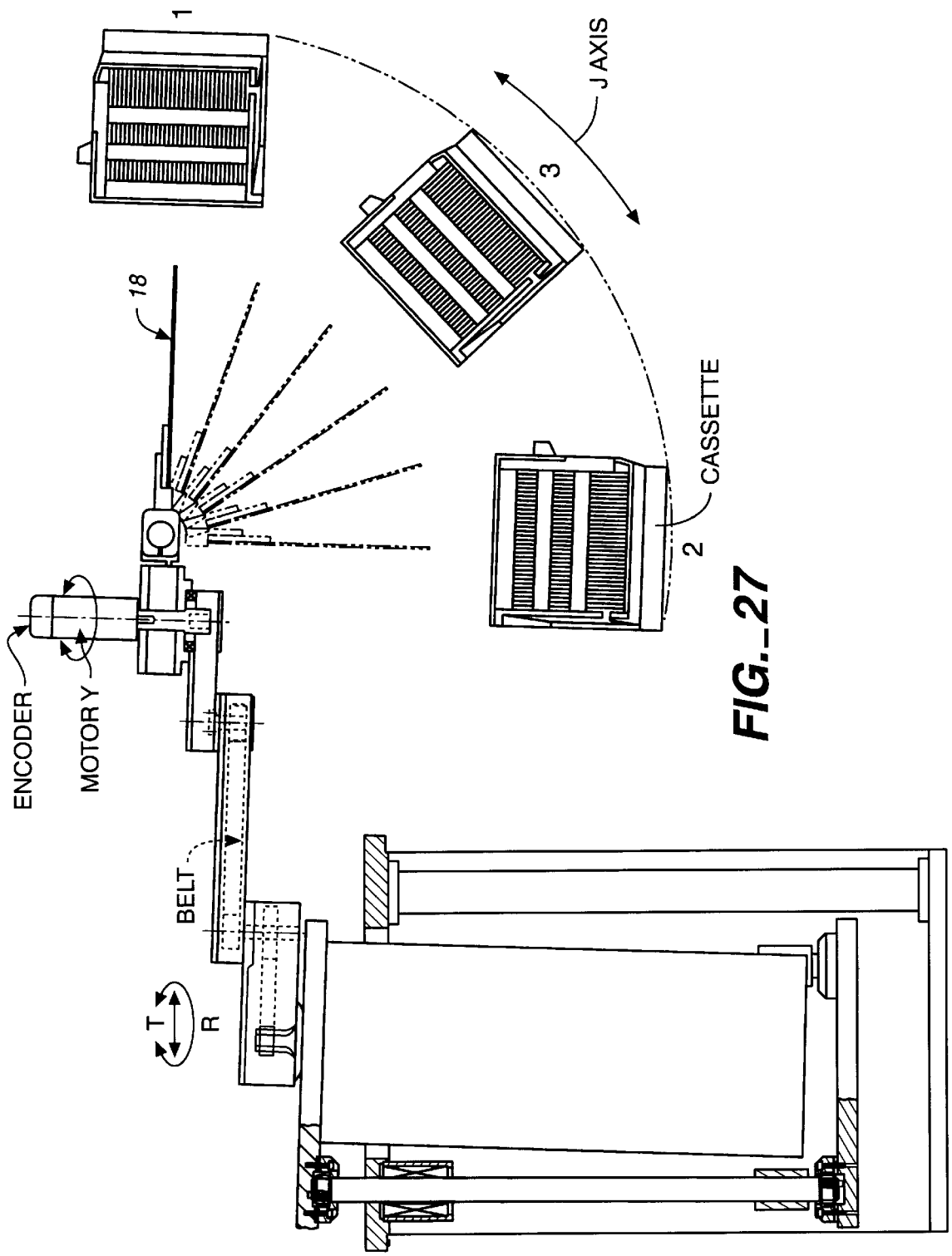
FIG._27

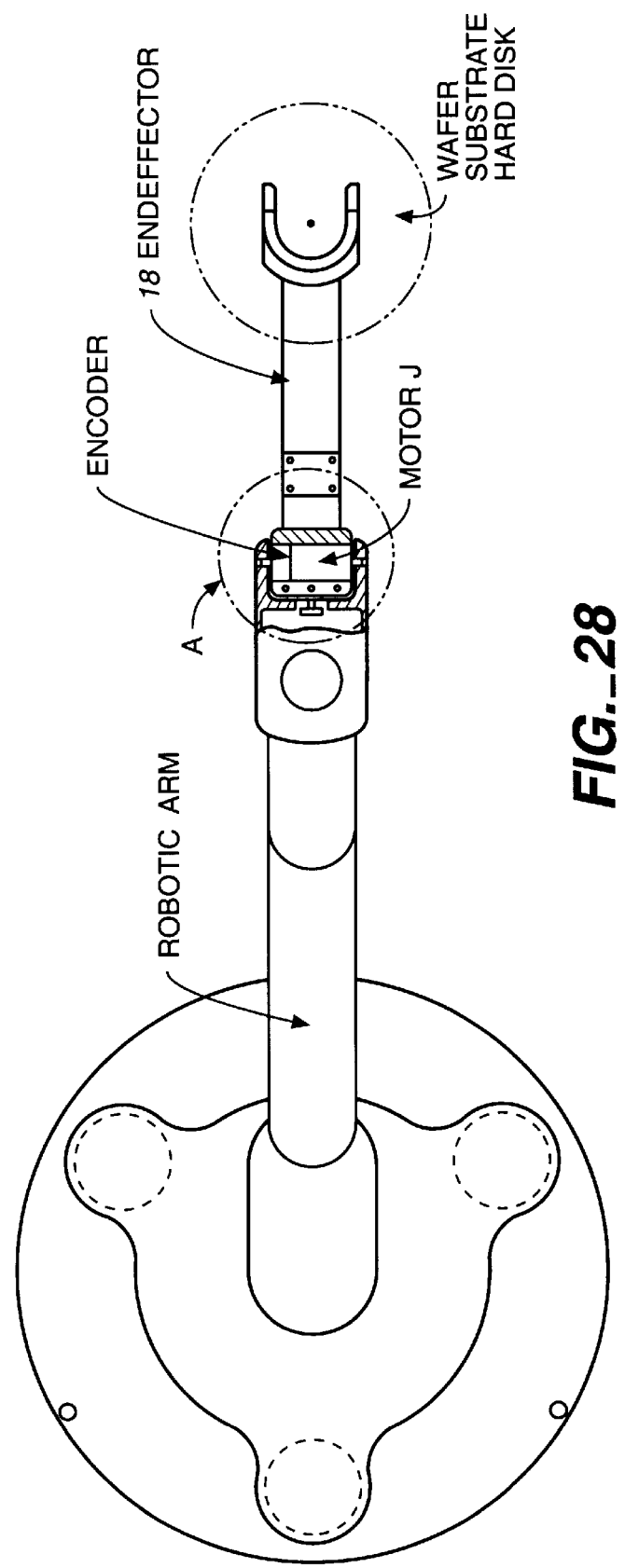
FIG._28

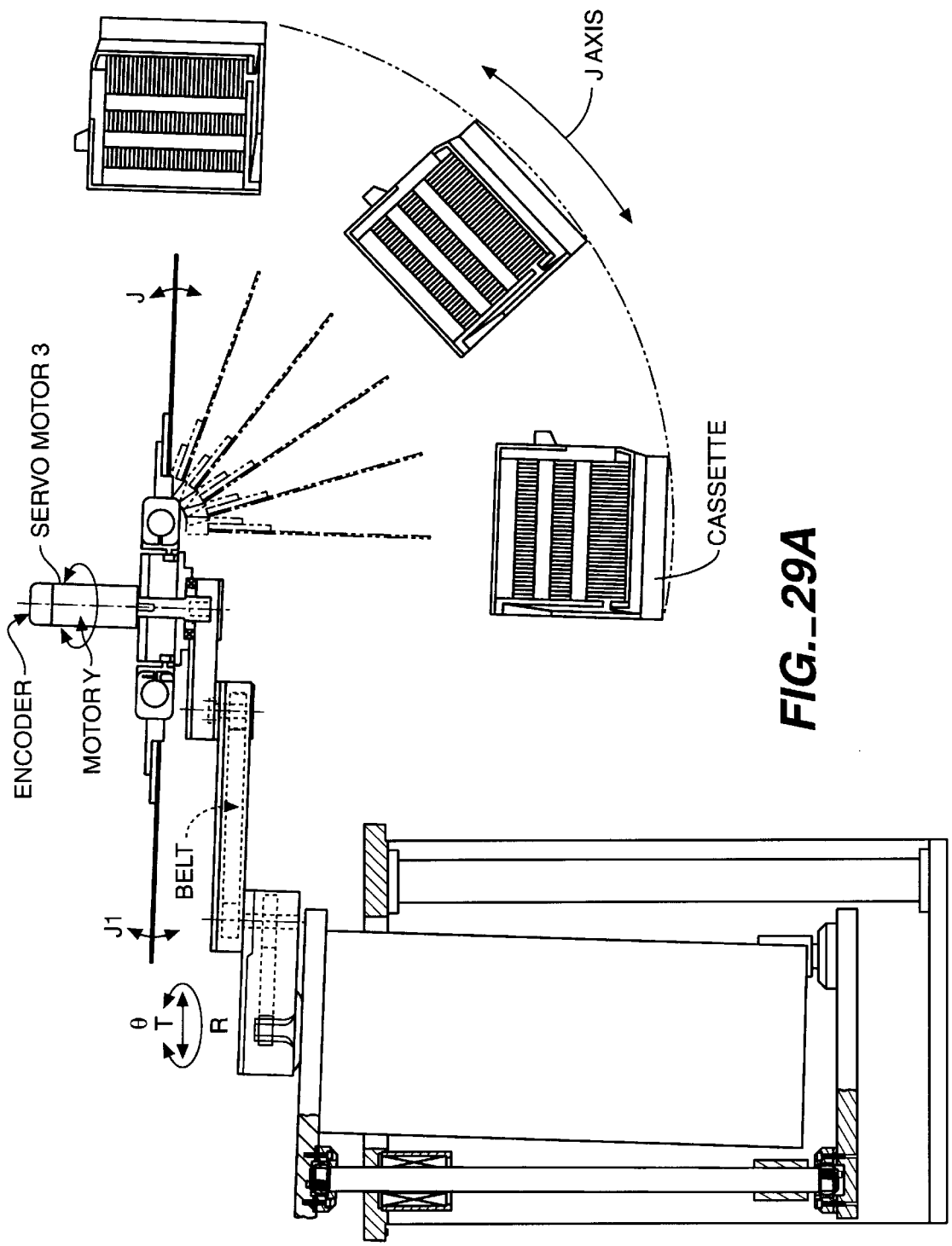
FIG._29A

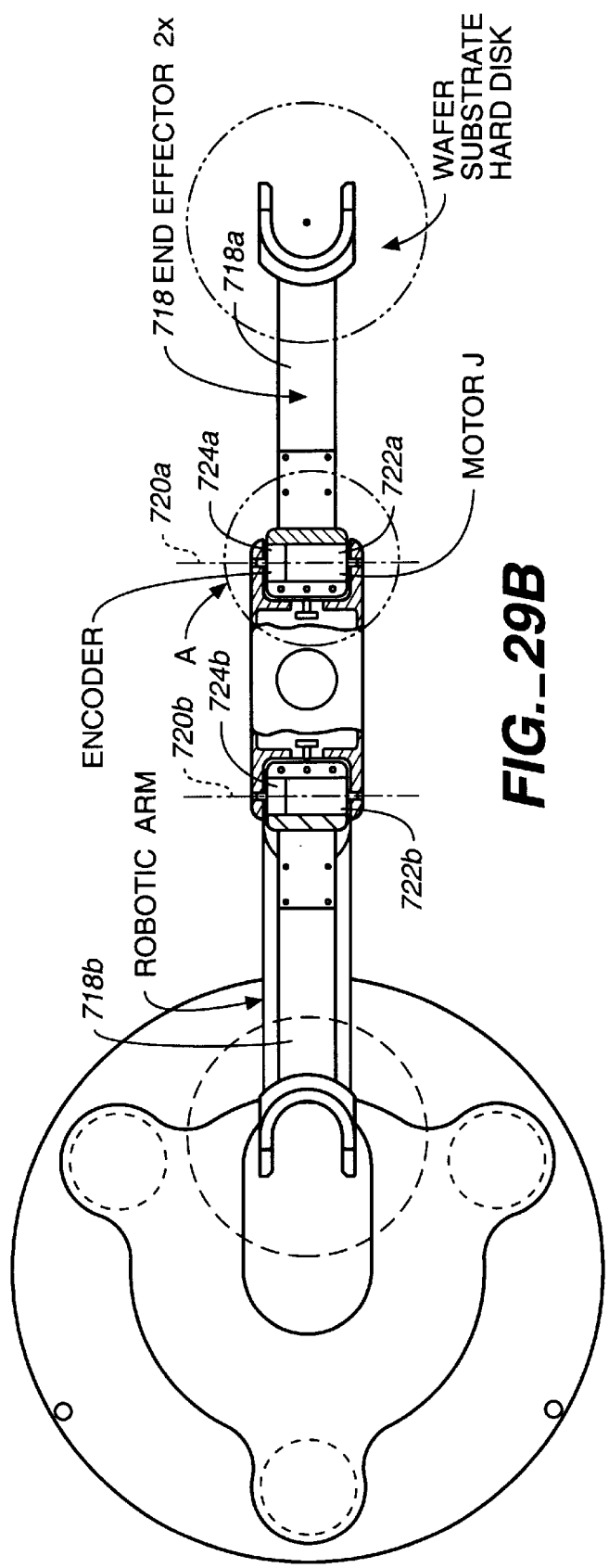
FIG._29B

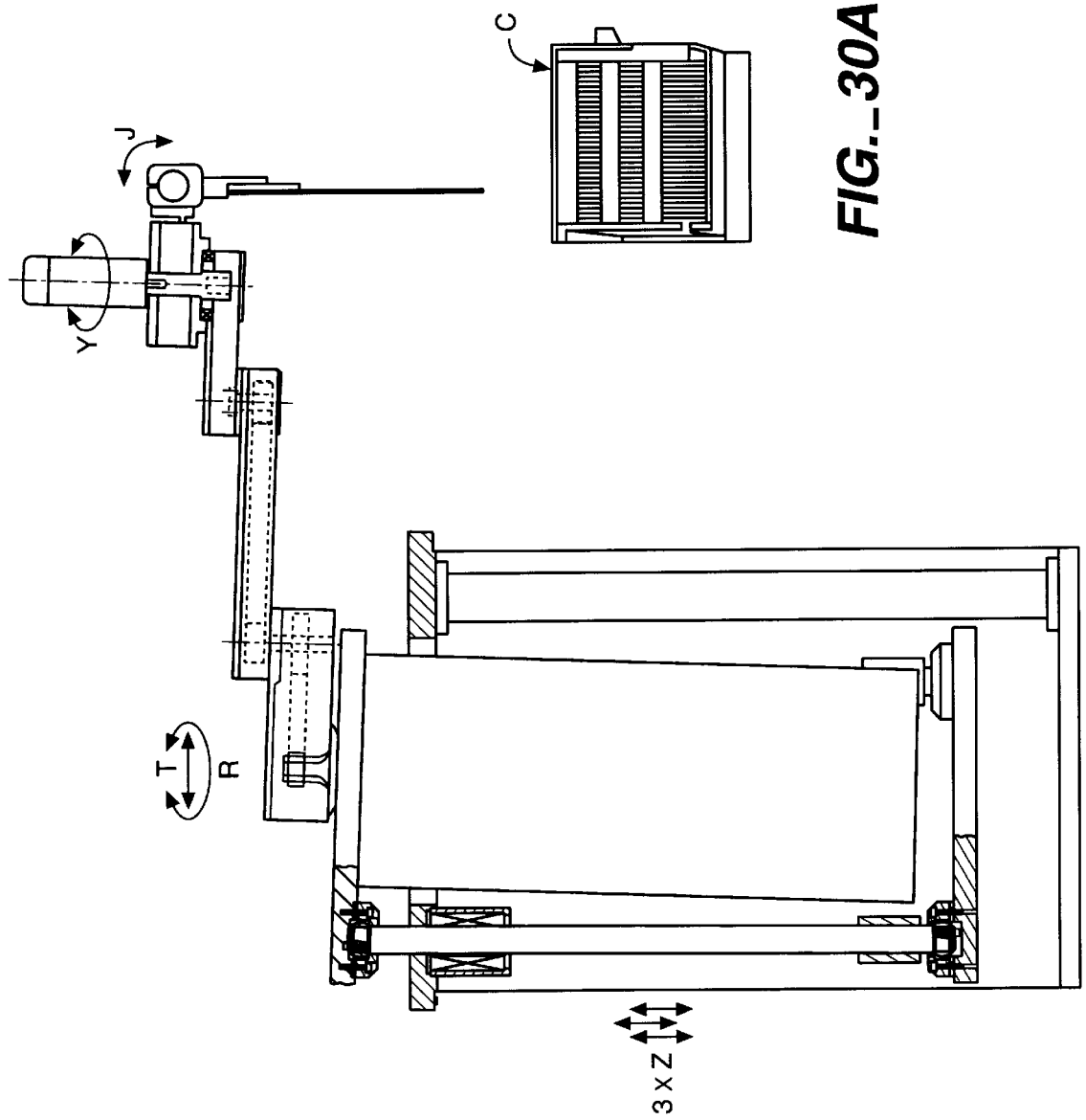
FIG._30A

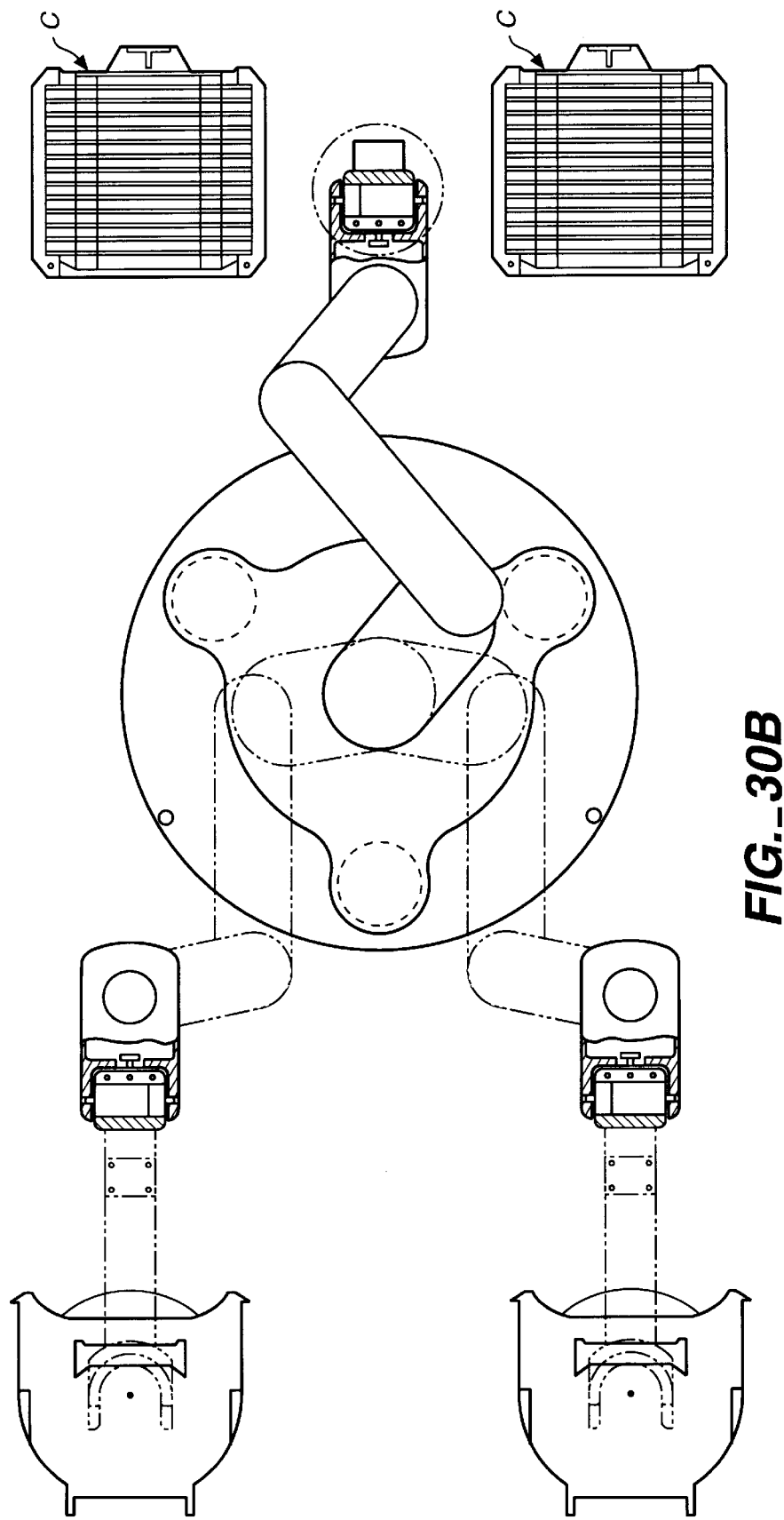

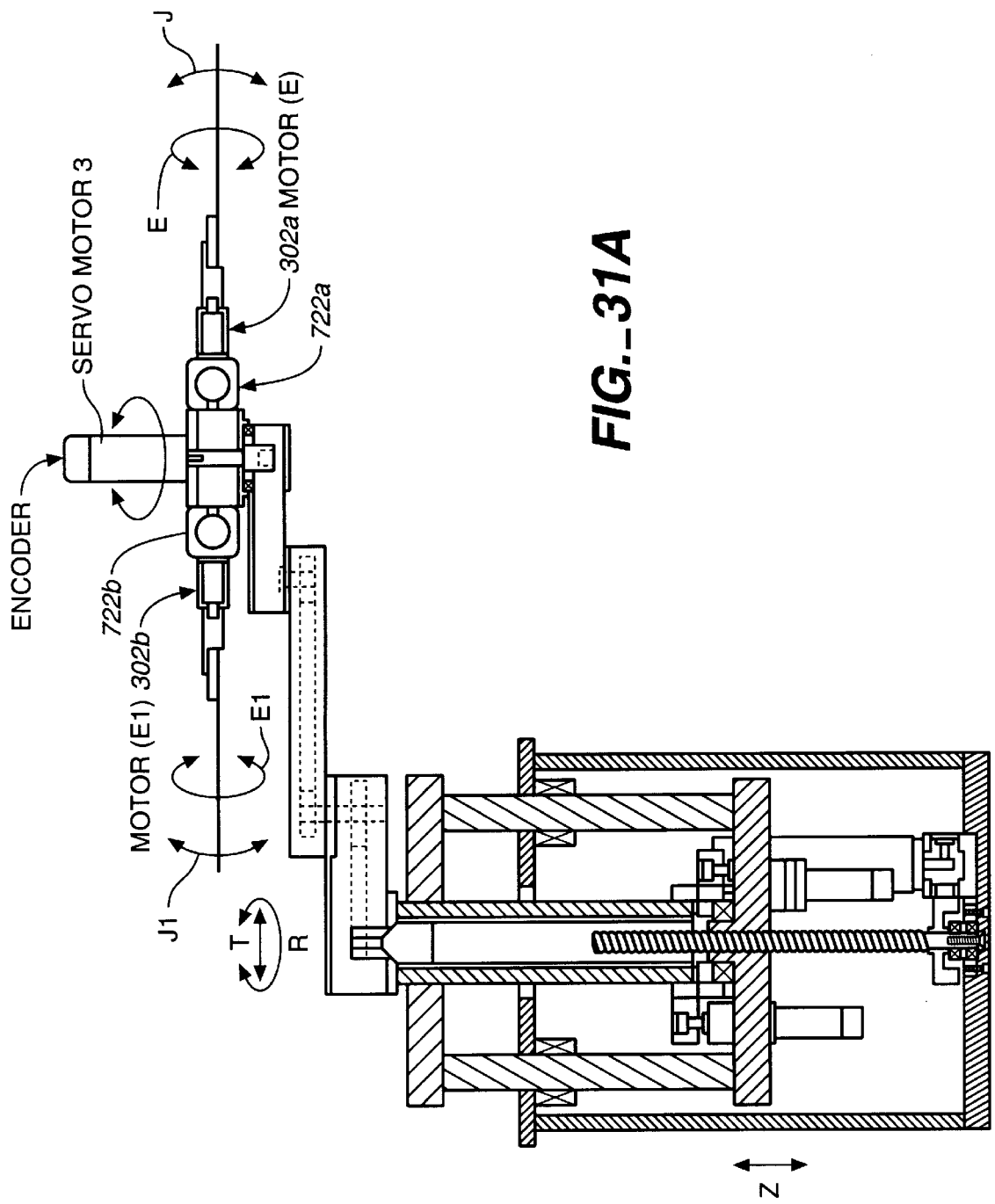
FIG._31A

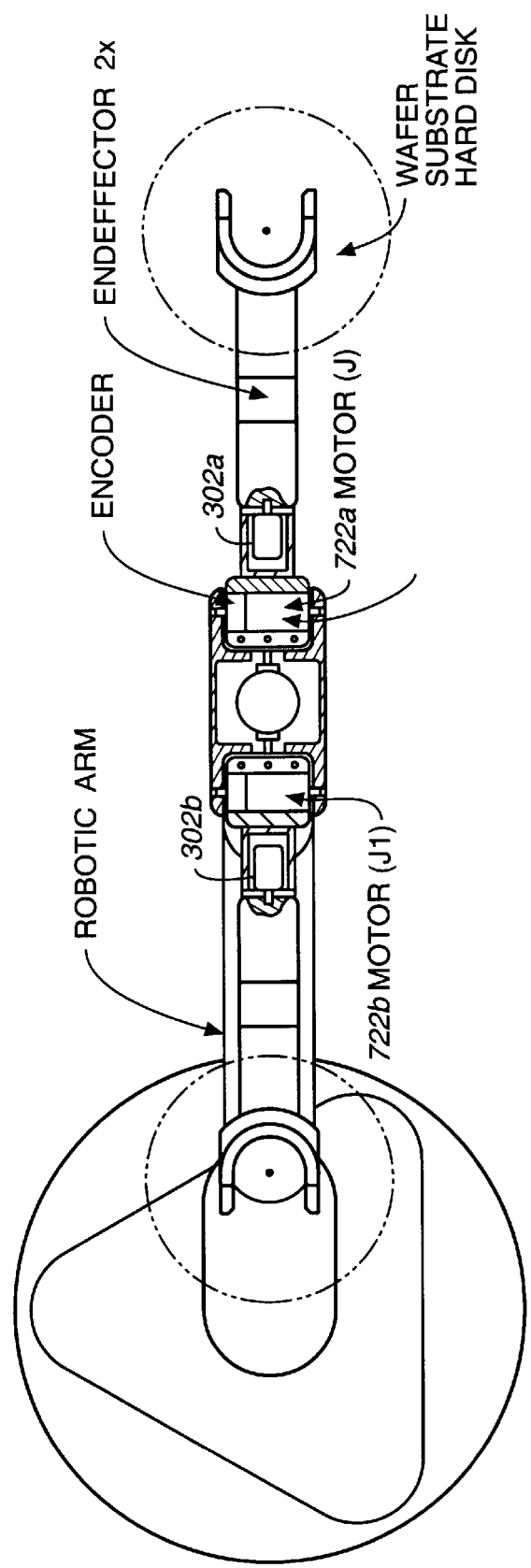
FIG._31B

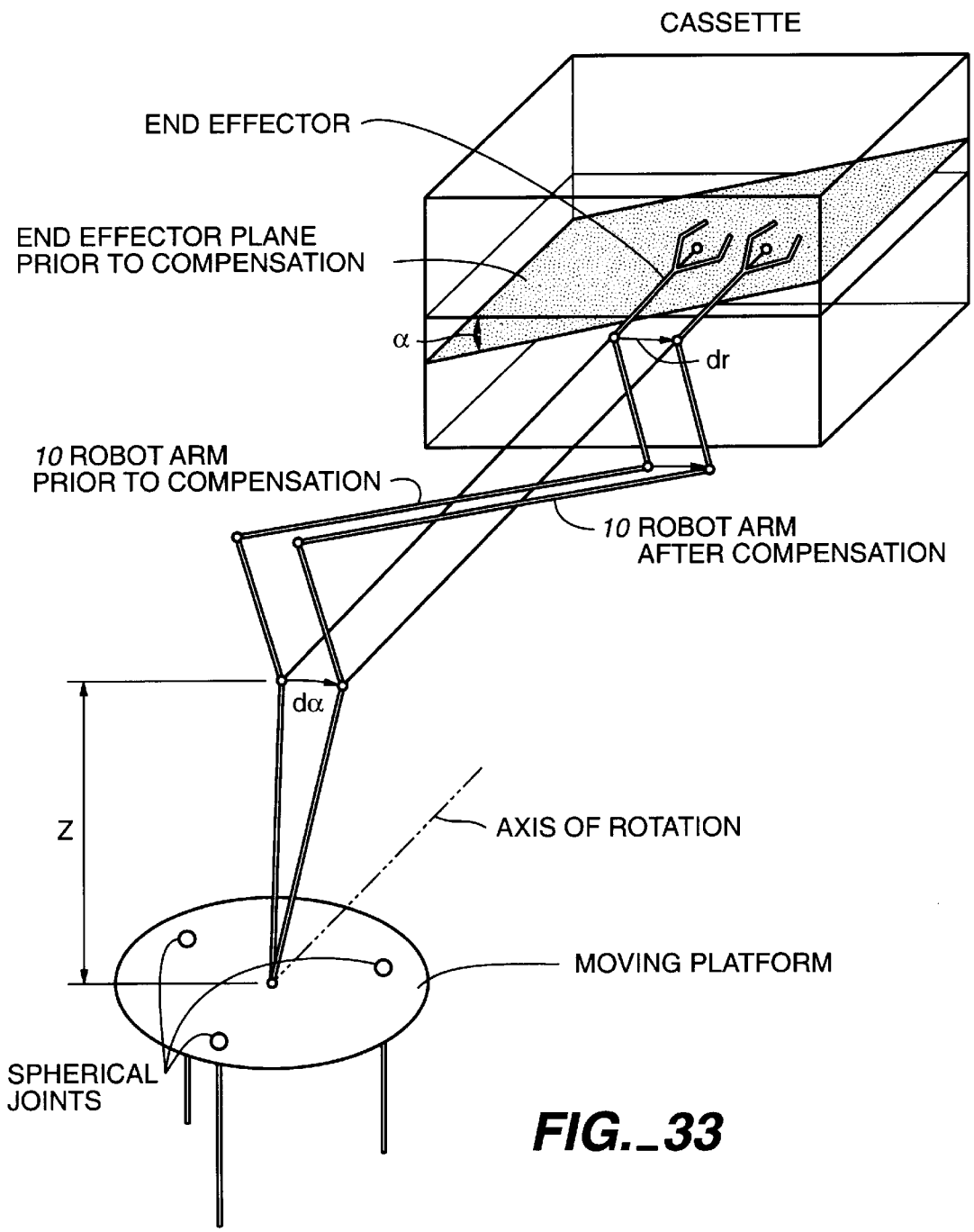
FIG._33

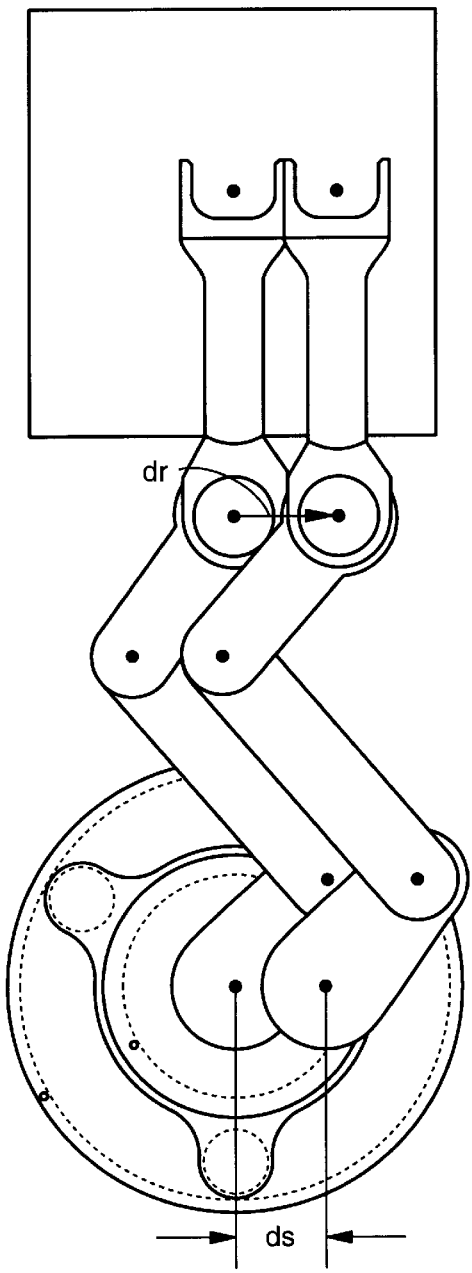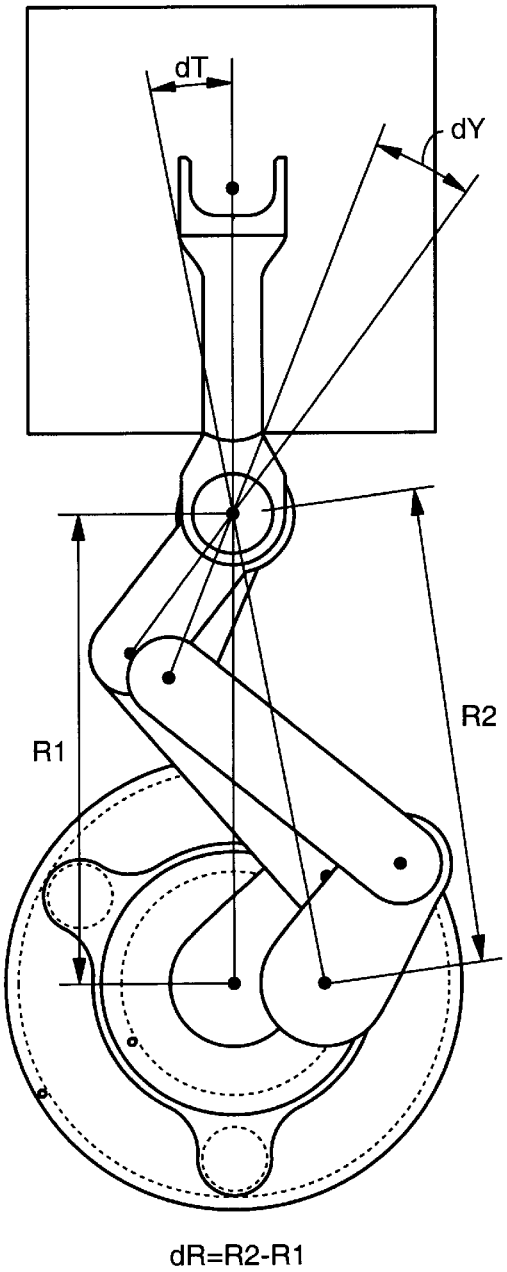
FIG._34A   FIG._34B

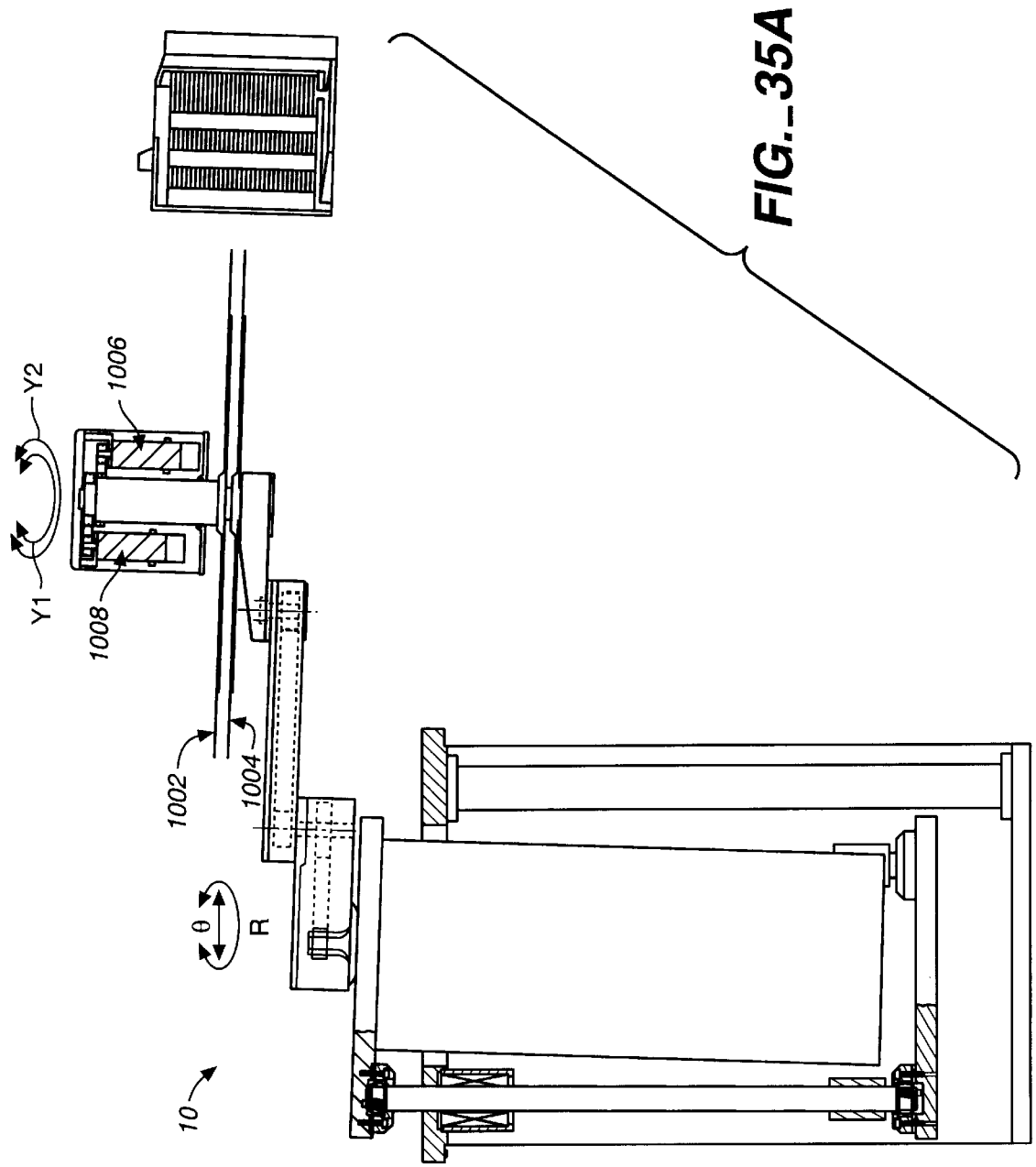
FIG._35A

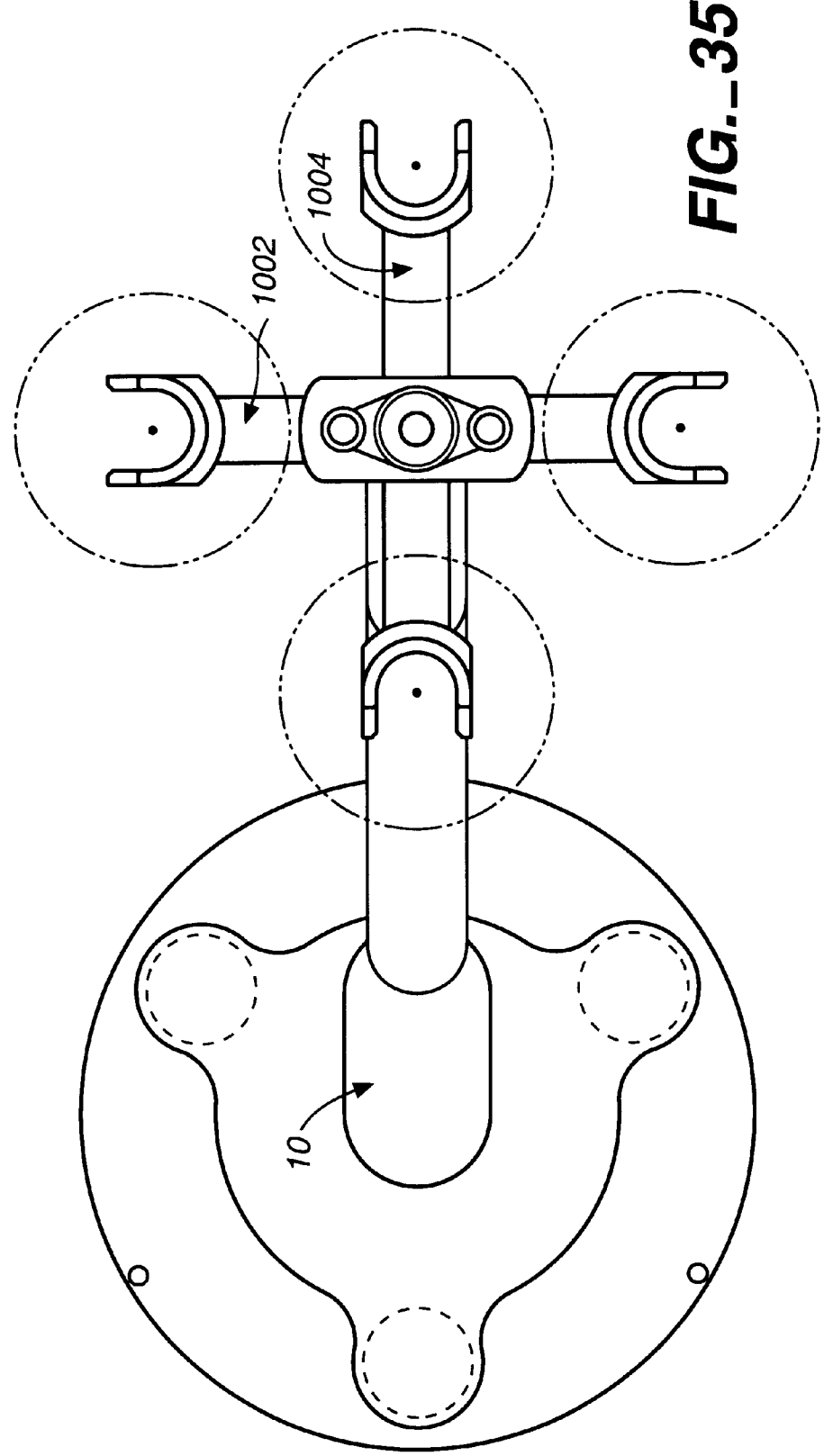
FIG._35B

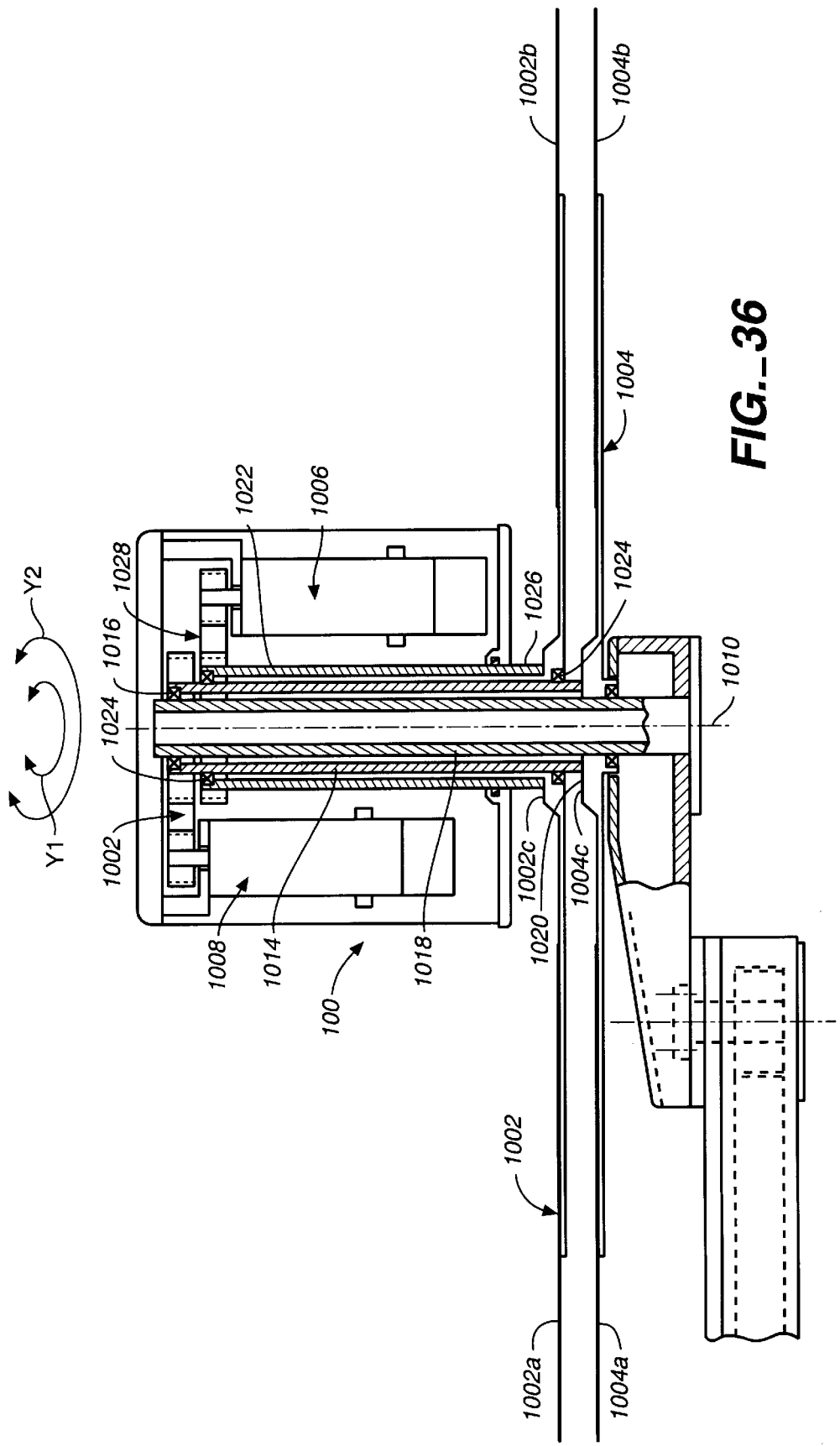
FIG._36

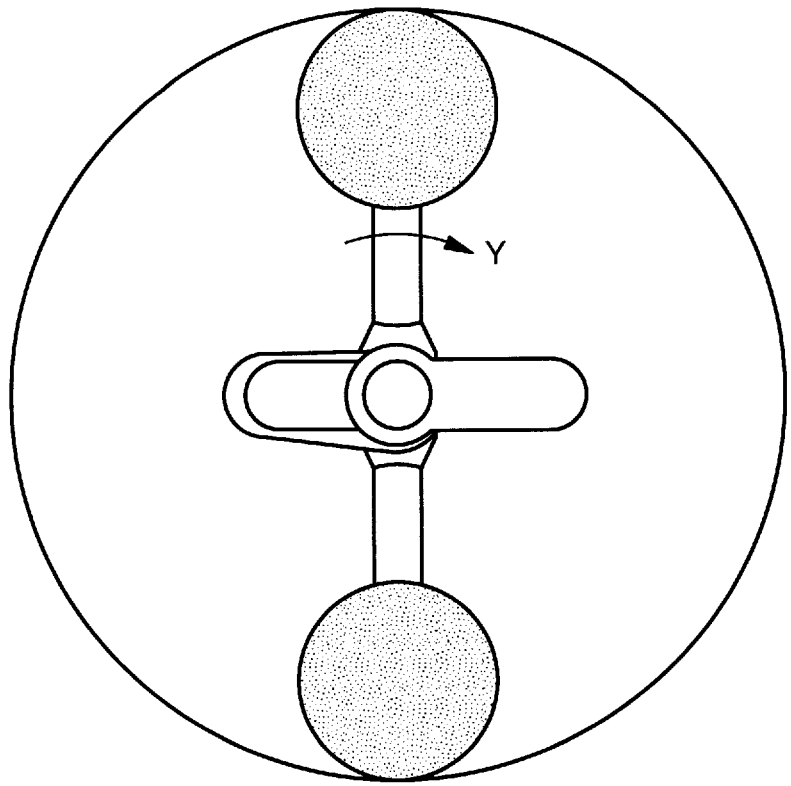
FIG._37
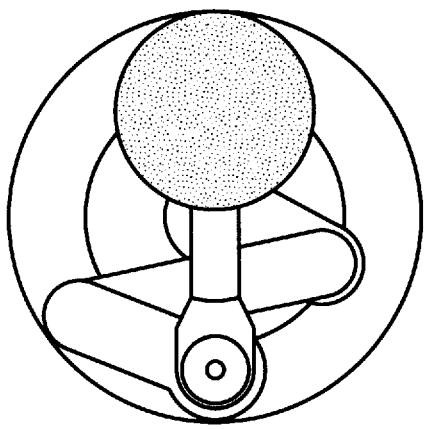
FIG._38

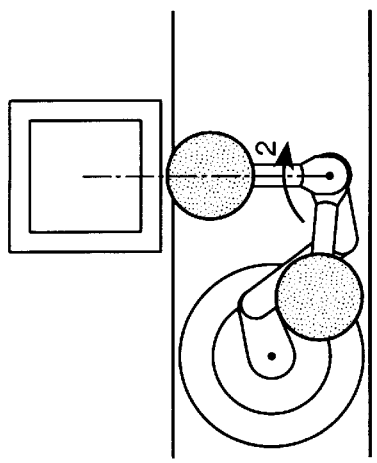
FIG._39C
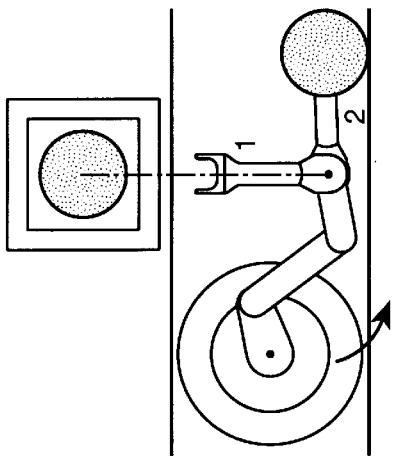
FIG._39F
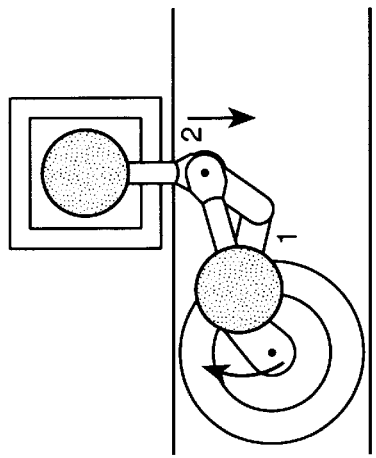
FIG._39B
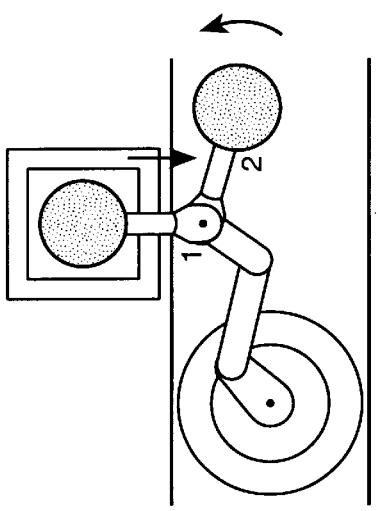
FIG._39E
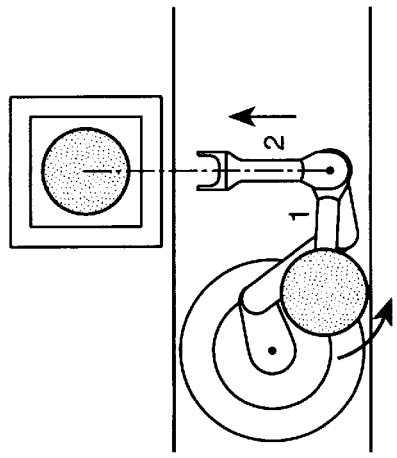
FIG._39A
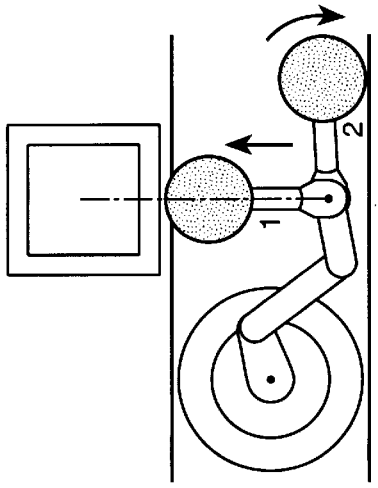
FIG._39D

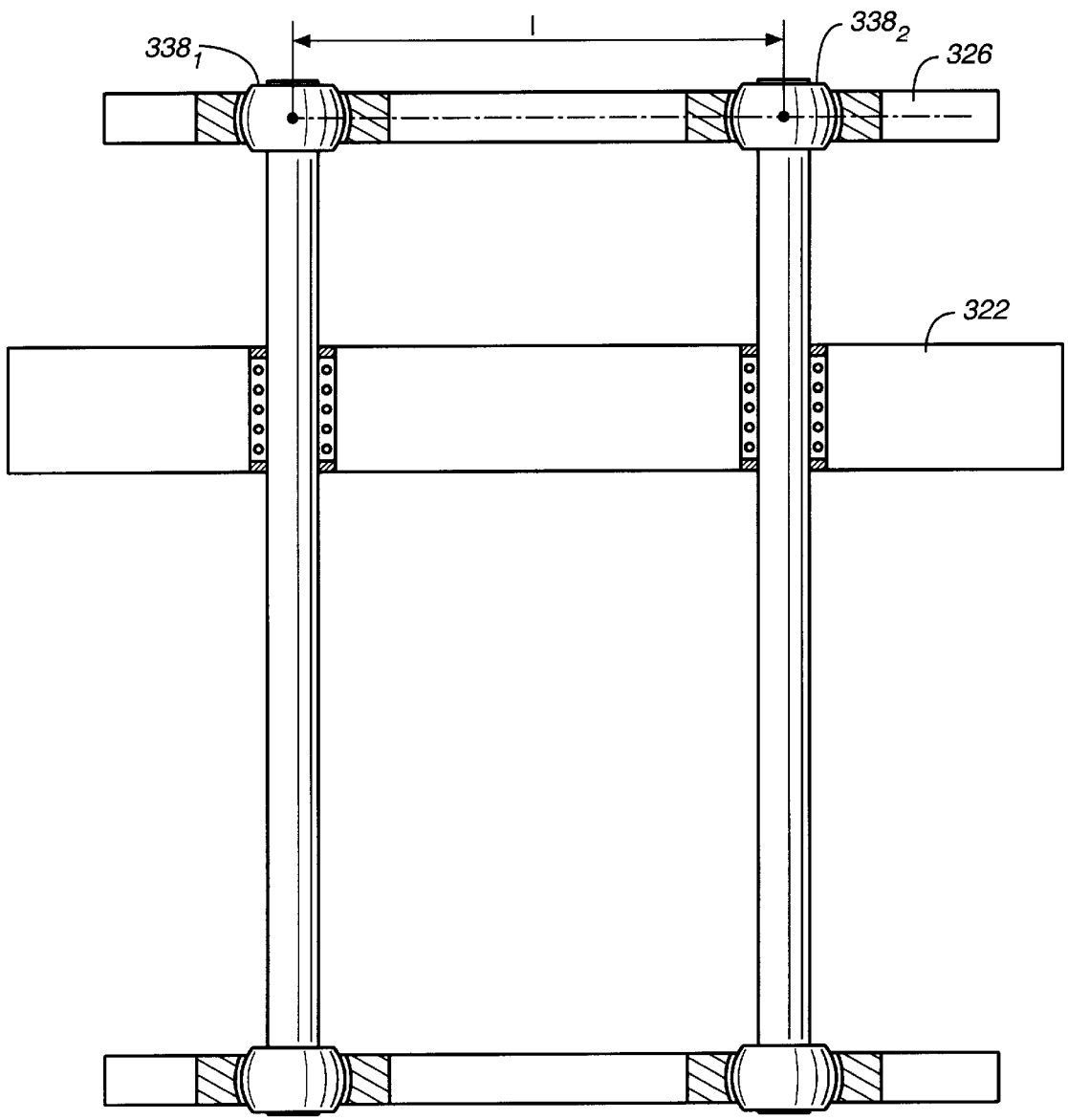
FIG._40

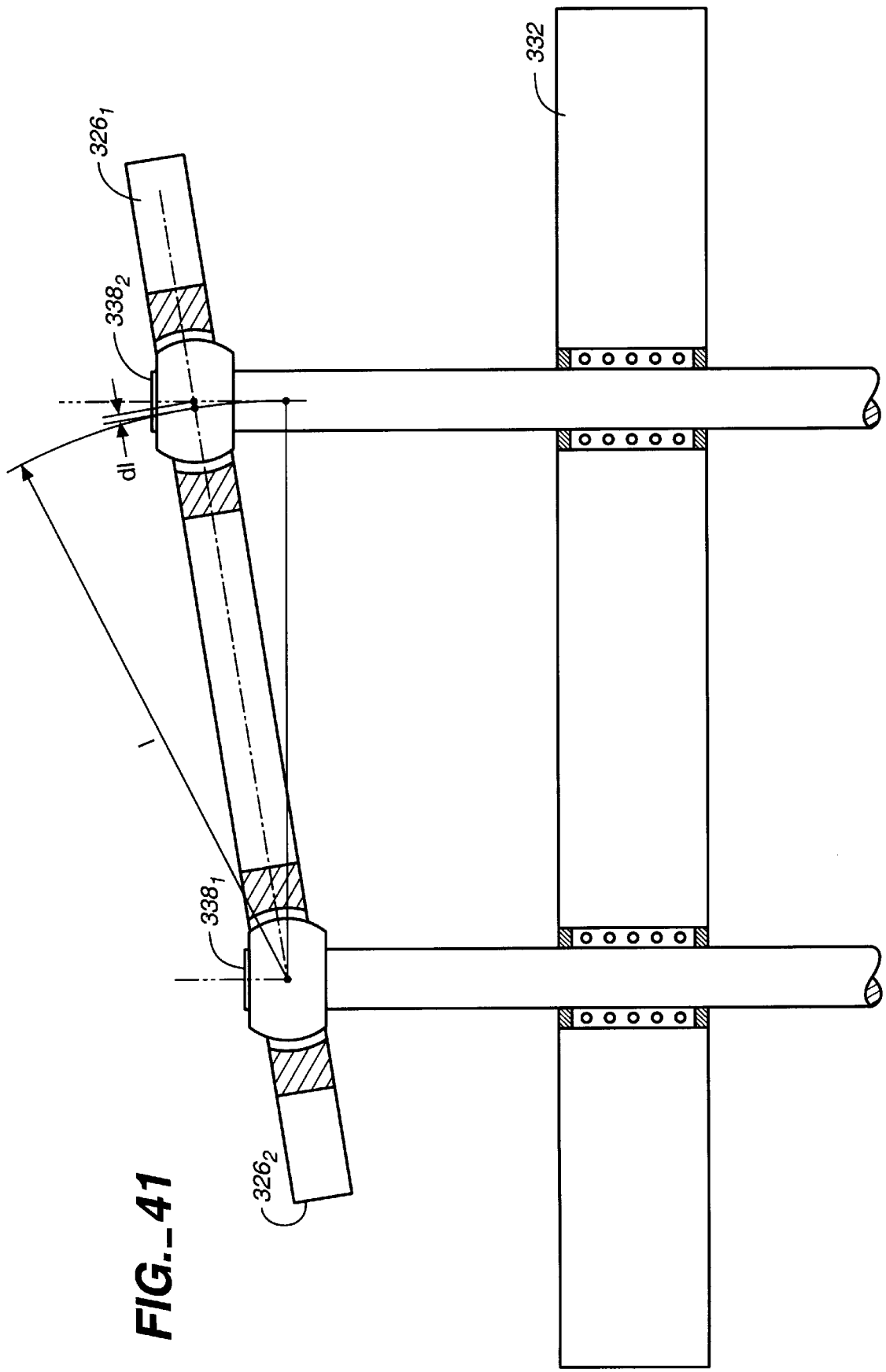
FIG._41

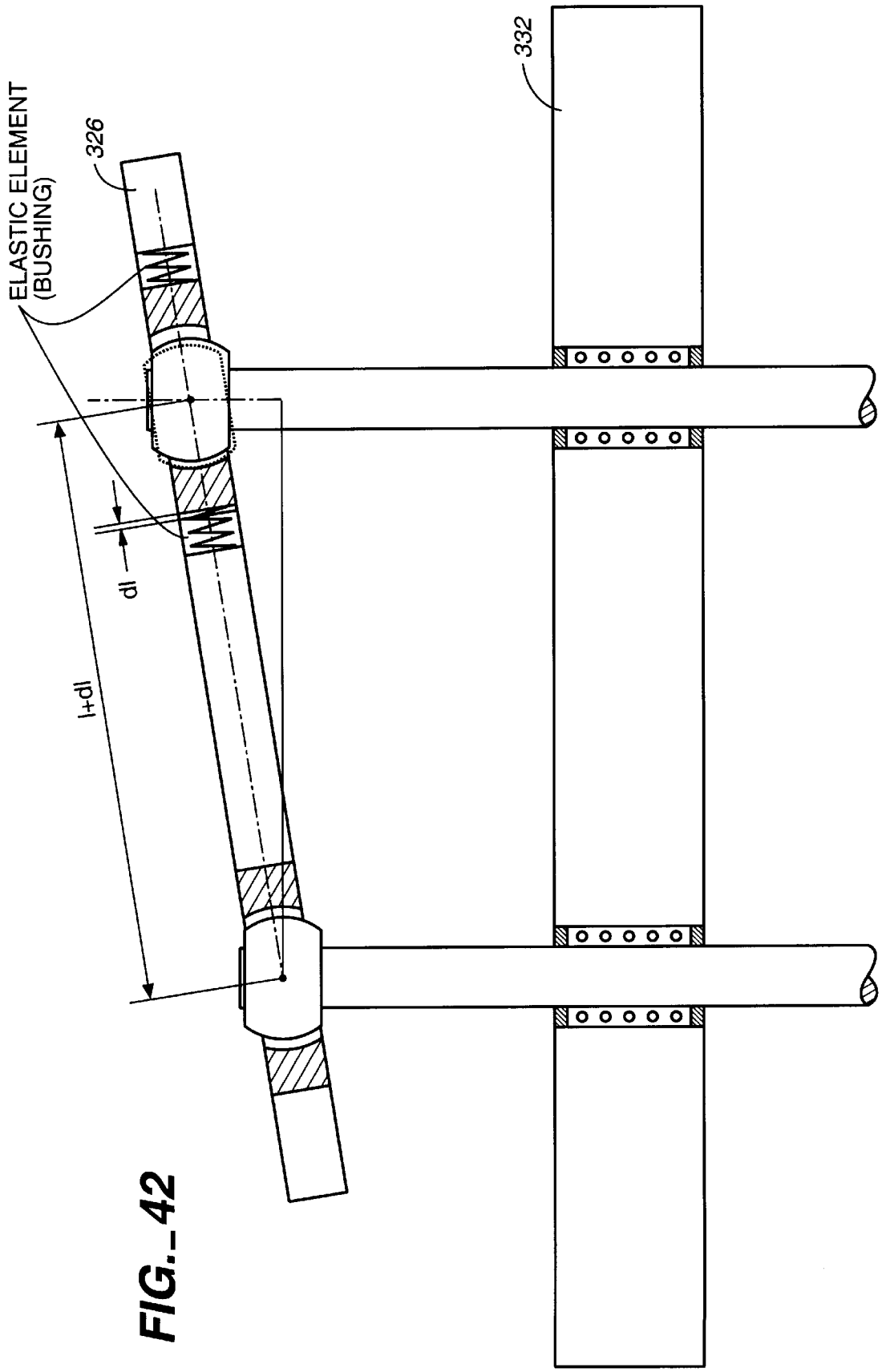
FIG._42

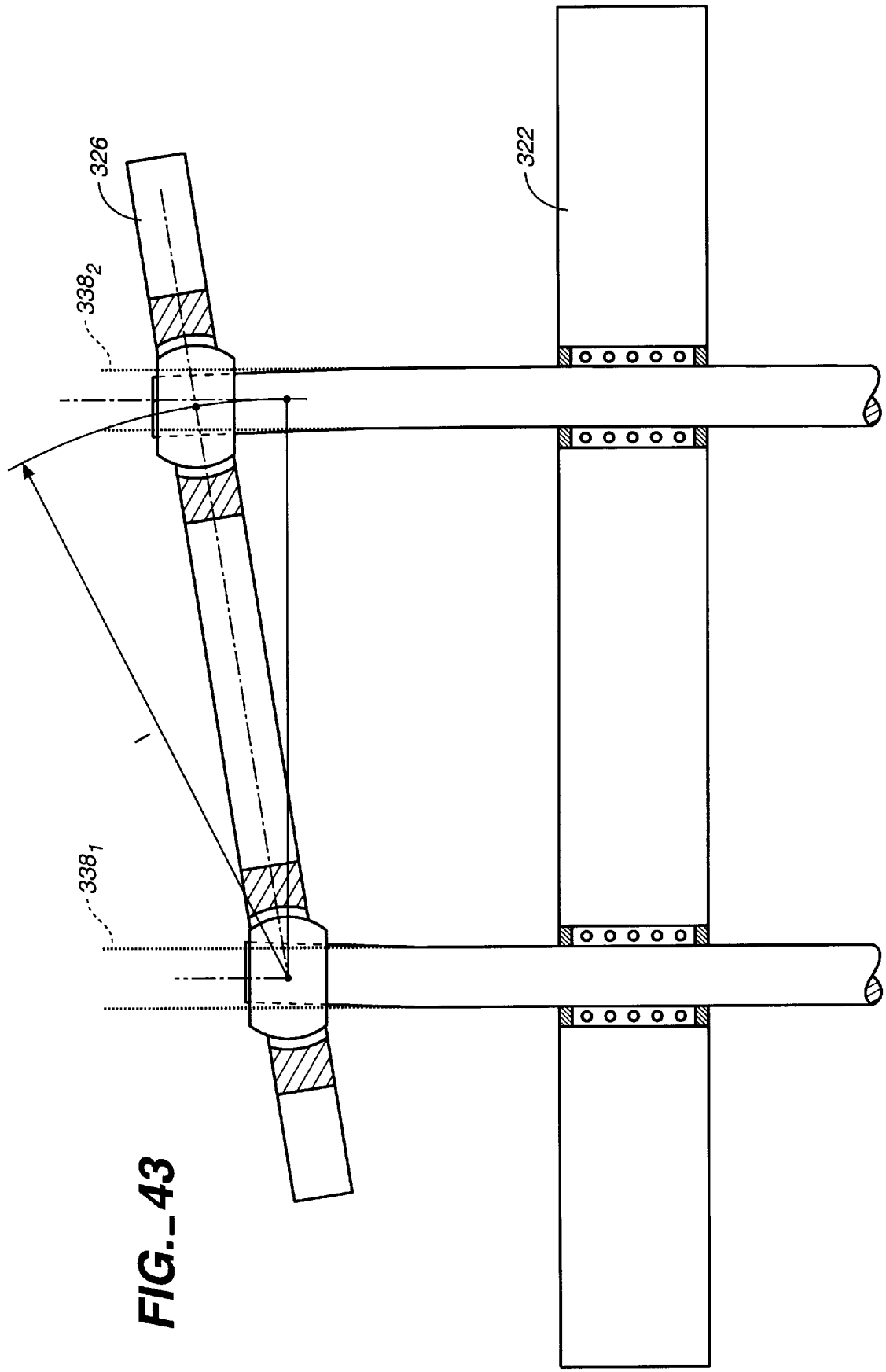
FIG._43

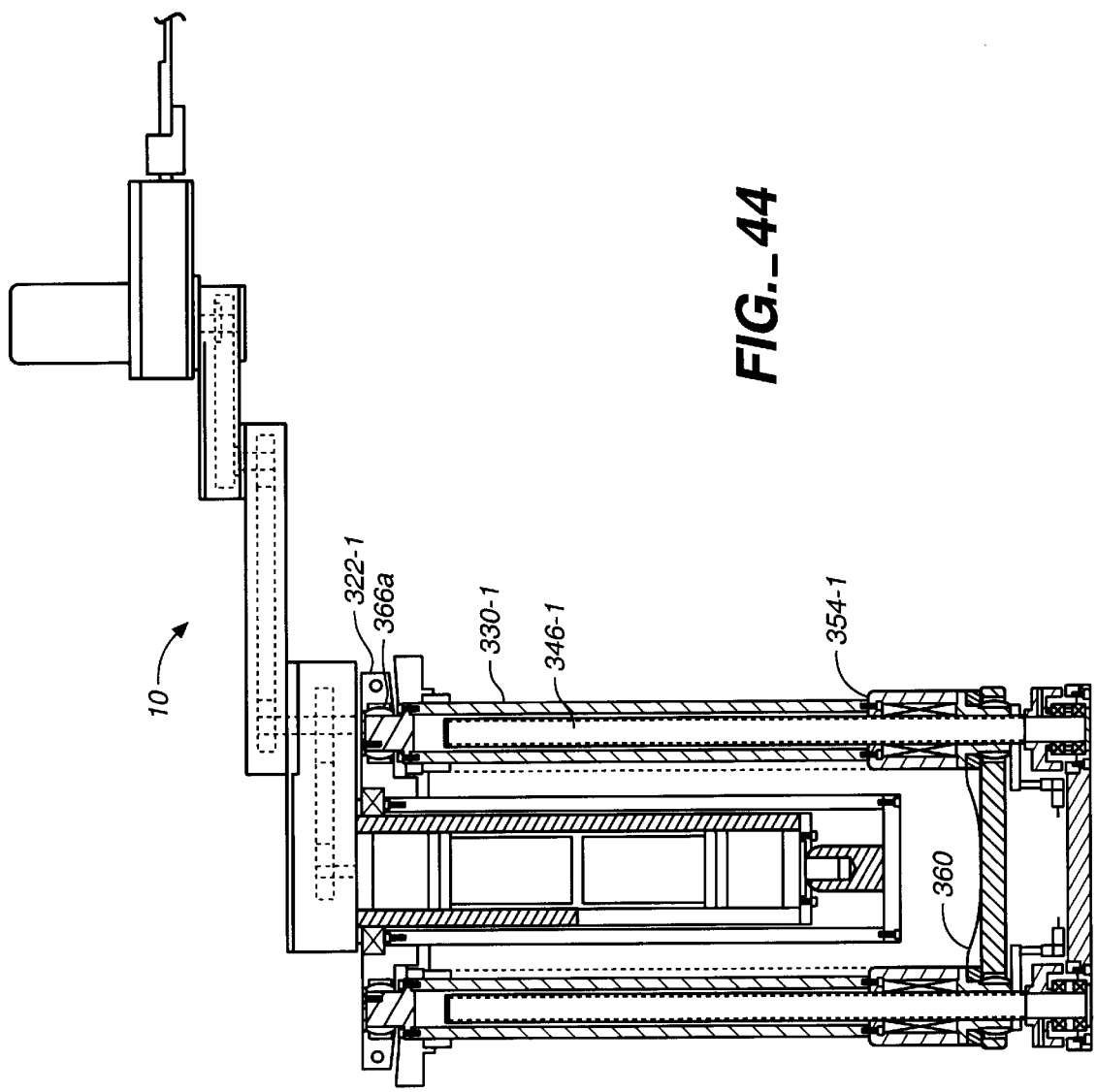
FIG._44

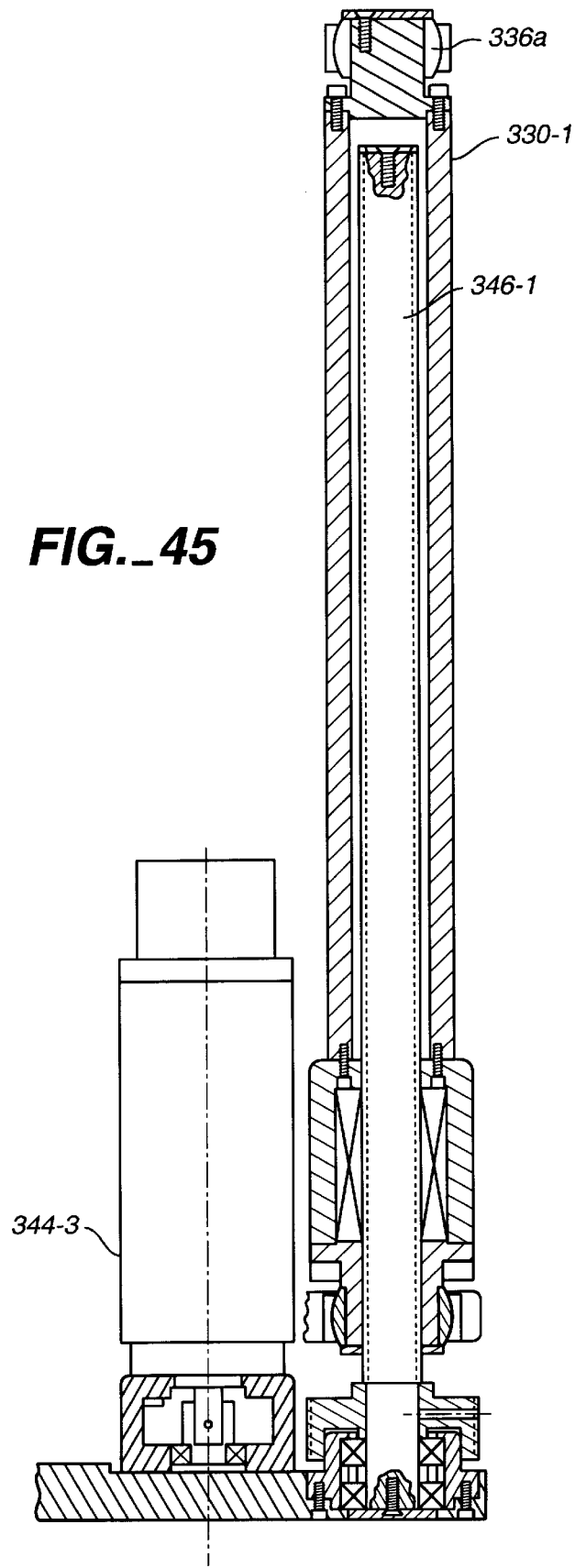
FIG._45

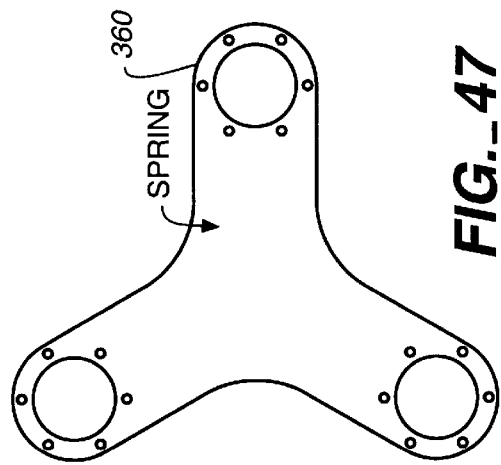
FIG._47
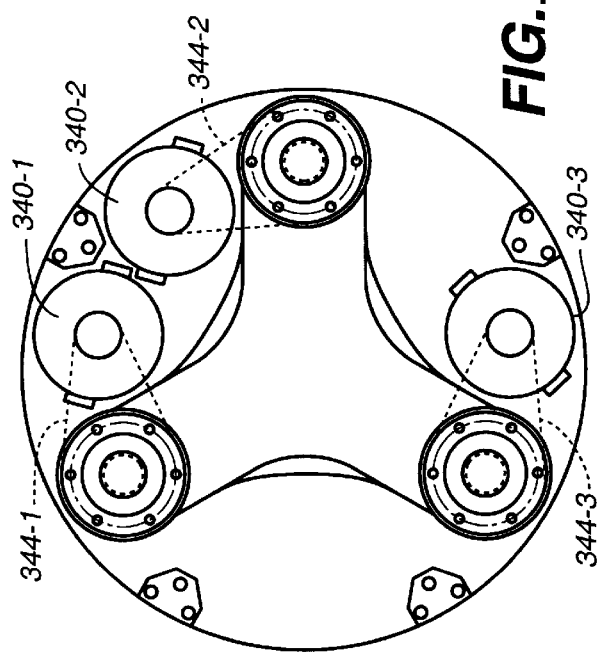
FIG._46
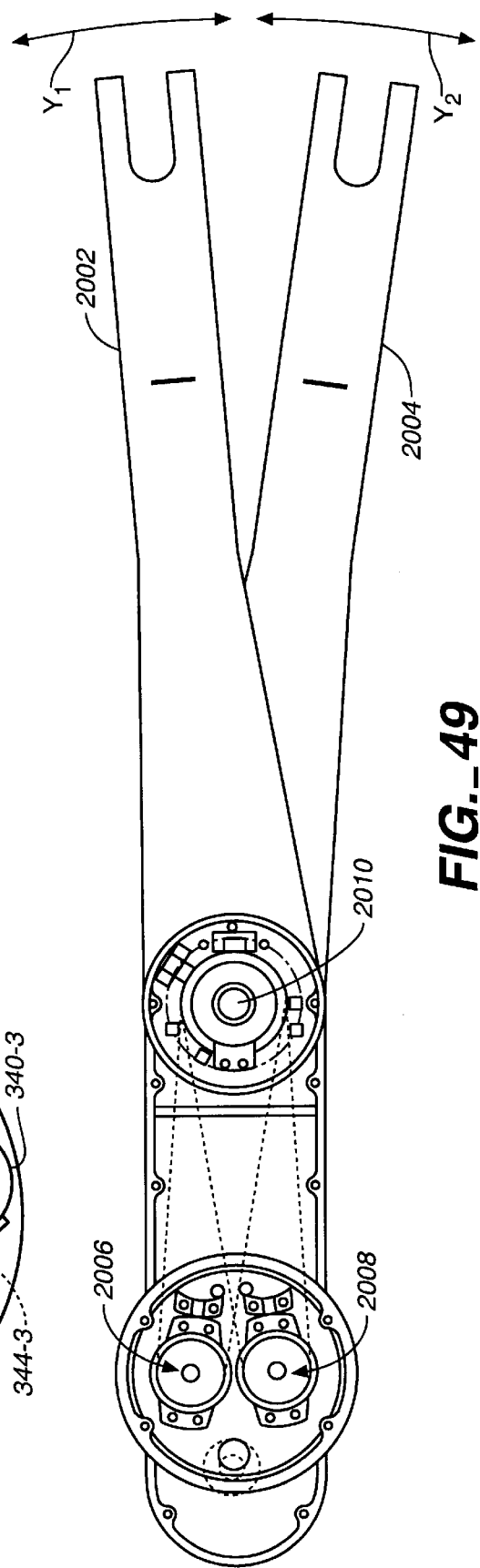
FIG._49

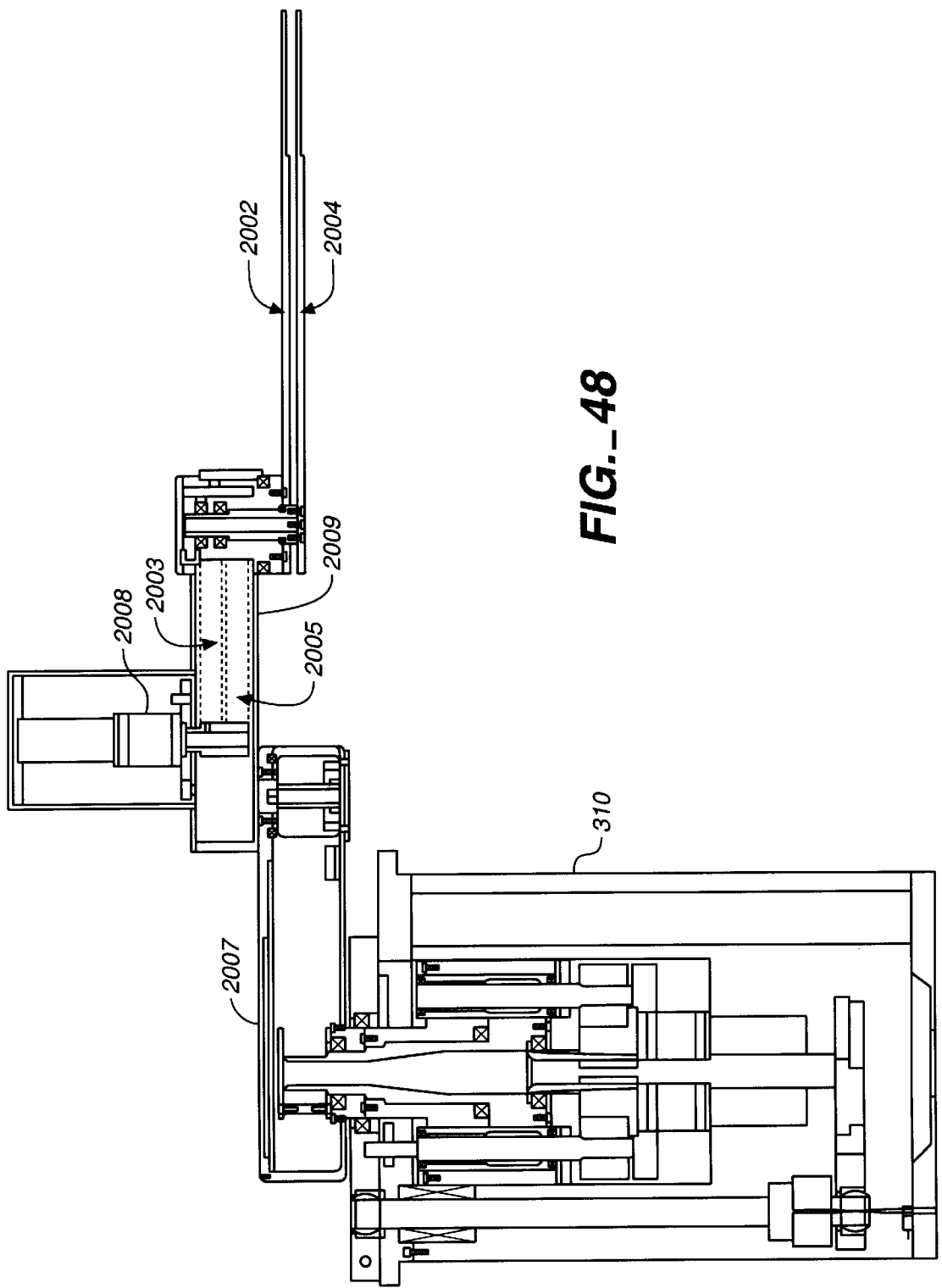
FIG._48

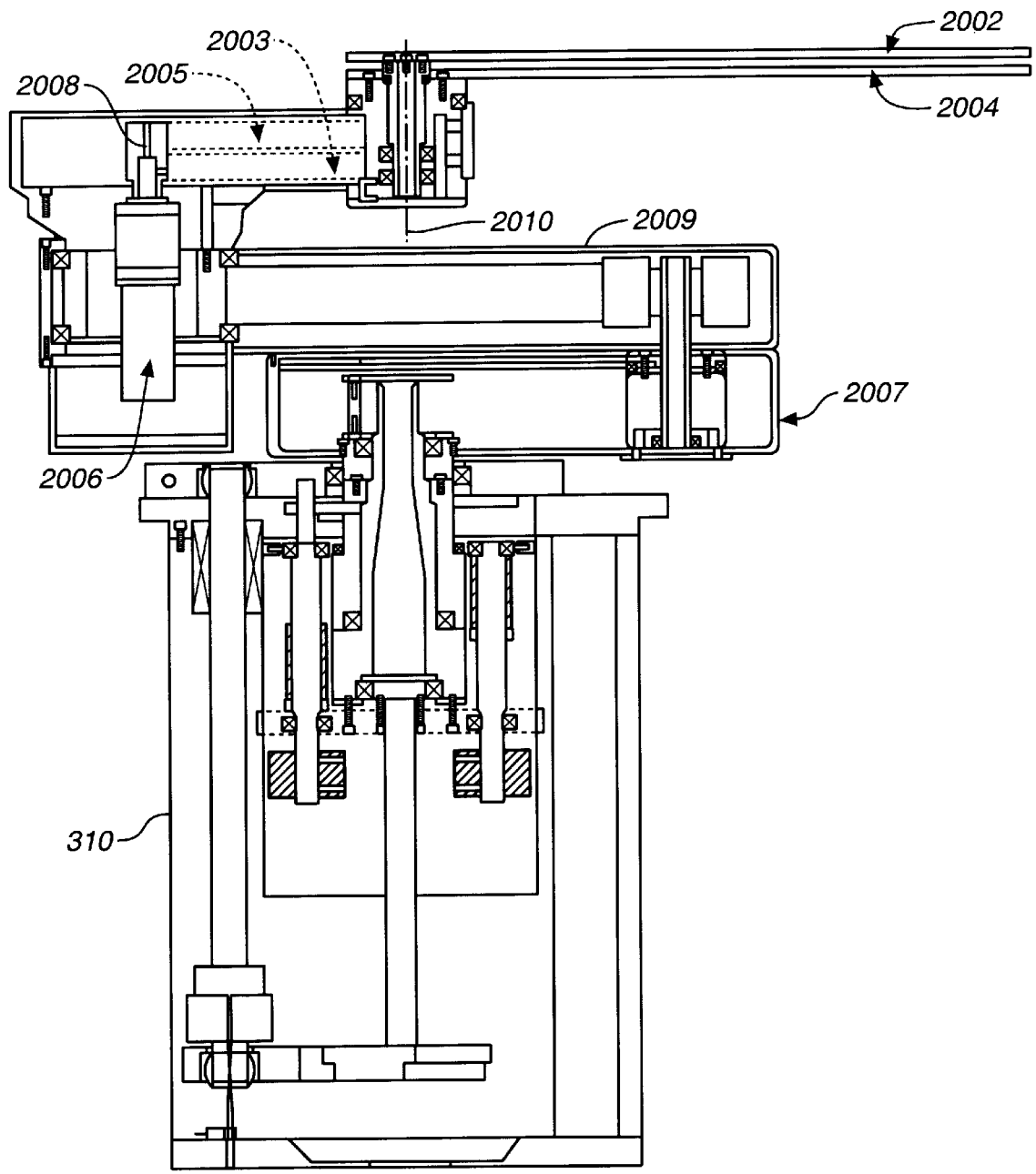
FIG._50

DUAL ROBOTIC ARM END EFFECTORS HAVING INDEPENDENT YAW MOTION

This application is a continuation-in-part of application Ser. No. 08/788,898, filed Jan. 23, 1997, which claims the benefit under Title 35, U.S.C. § 119(e) of provisional applications Nos. 60/013,862, filed Mar. 22, 1996, 60/021,546, filed Jul. 11, 1996, and 60/024,242, filed Aug. 20, 1996.

TECHNICAL FIELD

The present invention relates to a precision arm mechanism which will extend and retract in a straight line, including a non-radially extending straight line, and is also movable in a desired non-straight line path. In certain embodiments it can be tilted from its usually vertical axis to correct for misalignment of workpieces. It can pick up and deliver workpieces located at an angle from its plane of normal operation. It is suitable for positioning various objects such as semiconductor wafers, cassettes holding such wafers, panels, computer hard discs, and the like for processing and/or use.

BACKGROUND OF INVENTION

The use of robot arms for positioning and placing objects is well known. Generally, the arms have Z, R and θ motion in a conventional cylindrical coordinate system. The capability of providing straight line motion is very important in the processing of semiconductor wafers so as to allow them to be very accurately positioned at a work station where processing steps take place. The R or straight line radial movement of the end effector or mechanical hand at the end of the arm has been accomplished in a number of manners.

As one example, telescoping arms have been utilized for this purpose. In such a structure one slidable member fits within another thus allowing linear extension of the arm.

More commonly, two link arms with equal length links have been utilized for this purpose. The links are connected to each other so that the distal end of the first link is pivotally attached to the proximal end of the second link. The links utilize belt drives which are provided for coordinately rotating the second link to the first link to provide a rotation ratio, $i_{2,1}$ of 2/1, and to provide a rotation ratio, $i_{3,2}$, of 1/2 between the end effector and the distal link of the robotic arm. When $i_{2,1}$ is equal to 2/1 and $i_{3,2}$ is equal to 1/2, the result is that $i_{3,1}$, the rotation ratio of the end effector relative to the first link, is equal to 2/1×1/2 or unity and radial straight line motion results. In the case of 3 link arms, such as those shown in U.S. Pat. No. 5,064,340, the rotation ratio between the third and second links is 1/1 and other ratios are as just discussed above. In this situation $i_{2,1}$ is equal to 2/1, $i_{3,2}$ is equal to 1/1 and $i_{4,3}$ is equal to 1/2. This assures that $i_{4,1}$ is equal to unity and radial straight line motion results.

United Kingdom Patent Application GB 2193482A, published Feb. 10, 1988 discloses a wafer handling arm which includes two unequal length links with the distal end of one link being pivotally attached to the proximal end of the other link, with the hand being integral with the distal end of the distal link and which utilizes a belt drive which is fixed to a cam to attain nearly straight line motion.

It is also known to utilize an isosceles triangle type linkage wherein two equal length links are pivoted together and a mechanical hand is pivoted to the distal end of the distal link. Pulleys and belts are utilized in such a manner that the angle between the two links changes at twice the rate as do the angles that each of the links makes with a line connecting the points about which their other ends are pivoted. This linkage provides drive directly from a motor shaft to the proximal end portion of the proximal link. A belt about a stationary pulley coaxial with the motor shaft passes about a pulley at the point of pivoting of the two links to one another. Another pulley and belt arrangement provides pivoting of another pulley where the second link is pivotally connected to the mechanical hand. Radial straight line motion results.

In another apparatus a pair of isosceles triangle type linkages face one another and the mechanical hand is pivotally attached to the distal ends of both of the distal links. The proximal ends of each of the proximal links is driven in an opposite direction of rotation by a single rotating motor shaft, generally through use of appropriate gearing. What results is a "frogs leg" type of motion with each isosceles triangle type linkage serving as means for controlling the other such linkage in such a manner that the angles between the two links of each of the isosceles triangle linkages changes at twice the rate as do the angles that each of the links makes with a line connecting the points about which their other ends are pivoted. The result is radial straight line motion. The frogs leg linkages have the advantage of extra strength and are particularly useful under certain conditions, particularly in vacuum environments, since they tend to require less moving parts within the vacuum chamber whereby dust is less likely to develop.

In previously mentioned U.S. Pat. No. 5,064,340, which is incorporated herein in its entirety by reference, an arm structure is disclosed comprising first, second and third longitudinally extending links each having proximal and distal end portions. The second longitudinally extending link is twice the effective length of the first link. The proximal end portion of the second link is pivotally mounted to the distal end portion of the first link about a first pivot axis. The proximal end portion of the third link is rotatably mounted about a third pivot axis to the distal end portion of the second link. An end effector is pivotally mounted to the distal end portion of the third link for rotation about a fourth pivot axis. Means is provided for coordinately rotating the first link, the second link, the third link and the end effector at a rotation ratio of the first axis to the second axis to the third axis to the fourth axis of 1:2:2:1. Again, the torque of the end effector pivot equals that of the driver. Radial straight line motion is provided.

One shortcoming which is common to all of the above described radial positioning arms is that the arms must sit idly by while a workpiece is being worked upon. For example, a semiconductor wafer is picked up from a loading cassette by an end effector located at the end of the arm. The wafer is moved to a processing station and deposited. The arm moves away and sits idly by until processing at the station is completed. Once the process is completed the single end effector must move into the processing chamber, pick up the processed wafer and retract, rotate to the receiving cassette, place the processed wafer in the receiving cassette, rotate to the loading cassette, move in and pick up another wafer, retract, rotate back to the processing chamber, place the wafer and retract again to wait for the process to be finished. This is a total of eleven movements, and the time these movements take limits the throughput, i.e., the number of workpieces (e.g., wafers) which can be processed in a given time.

U.S. Pat. No. 5,007,784, which is incorporated herein in its entirety by reference, has addressed the above shortcoming by providing a robotic arm which comprises an end effector structure which has a central portion and two substantially oppositely extending hands each capable of picking up a workpiece. The central portion is centrally pivotally mounted to the distal end portion of a distalmost of the links. The links, end effector structure and static structure are constructed to allow the robotic arm to reverse across the pivot axis of the proximal end portion of the proximalmost of the links. Radial drive means drives the links in a manner such that the pivot axis of the central portion of the end effector structure moves only substantially linearly radially along a straight line passing through and perpendicular to the pivot axis of the proximal end portion of the proximalmost of the links and to the pivot axis of the central portion of the end effector structure. The end effector structure is maintained at a selected angle to the line. Rotational drive means is also present.

Another and more recent development allows the attainment of radial straight line motion using robotic arms whose links are not so closely defined in terms of relative lengths. Such a robotic arm is disclosed in copending application Ser. No. 08/432,682, filed May 2, 1995, which is incorporated herein by reference.

A former commercial device is similar to the device of U.S. Pat. No. 5,007,784. However, in the former commercial device the end effector structure has two hands which extend from the pivot axis of the end effector at substantially right angles to one another. The end effector can assume one of two different rotational positions about its pivot axis. The two positions are substantially the right angle apart and are such that either hand can be positioned so as to move in a straight line with the distal end of the distalmost of the links.

A very important limitation which exists with present day robotic arm mechanisms is that they can only follow a radial straight line (R) path or a circular (θ) path in the R, θ plane from one point another. Accordingly, if there is an object to be picked up and moved which is located in a cassette, e.g., a wafer cassette, or at a work station, the arm must first be extended radially into the cassette or work station where it picks up the object, generally by application of a vacuum, then withdrawn radially from the cassette or work station, then rotated to opposite another cassette or work station and then advanced radially into the other cassette or work station where it deposits the object. This provides an overall jetky stop/start motion which can lead to damage to the apparatus over many thousands of operations and which also vibrates the object being moved with possible deleterious effects on product yield. Also, if there is an obstacle which protrudes into that plane of operation of the arm as may occur in a semiconductor processing operation, an inefficient path must be followed to anything hidden behind or shadowed by that obstacle, namely, a straight line path must be followed to withdraw the arm radially inwardly beyond the obstacle and then radial motion must be imparted to move the end effector of the arm past the obstacle followed by radial outward motion to the desired work station. The ability to follow a curved path would be desirable in that it would allow coordinated R and θ motion and thereby faster operation of the robotic arm mechanism.

Another very important problem which arises in such robotic arm systems is related to loading in cassettes filled with wafers near a robotic arm. If more than one cassette is used which may be accessed with the arm it is necessary that each cassette be arranged with its longitudinal axis (the direction from which it is loaded and unloaded) passing through the center of rotation of the robot arm. This restriction exists because the arms can be extended in a straight line in only a radial direction. This does not allow for the use of a straight conveyor belt to bring in the cassettes whereby the process must be carried out by hand, an inherently inefficient way to operate. If it were possible to remove wafers from loaded cassettes which were traveling along a straight line path, namely, via a conveyor belt (in which instance their longitudinal axes would not all pass through the center of rotation of the robot arm), the speed of the overall operation could be significantly increased. This would directly lead to increased throughput and thereby to an increased profit/lower cost operation. What is done at present is to move the robot from between one cluster of radially aligned cassettes and work stations to another using a track system; a far less desirable way to operate.

A particular problem which occurs with flat display panels is that they are often present in cassettes with a certain degree of angular and linear misalignment. Such panels must be aligned properly at a work station. With conventional robotic arms this must be accomplished by placing the panel on a chuck, which has sensors, e.g., CCD sensors, which detect the misalignment, using the chuck to rotate the panel, and then picking it up and transporting it to the work station in proper alignment. This is so since with conventional robotic arms the arm cannot be rotated with respect to the panel (or wafer) coordinate frame which does not coincide (due to the position and angular misalignment) with the coordinate frame of the end effector. The conventional arms can move only along the longitudinal axis of the end effector, and to rotate it so it cannot compensate for the misalignment without intermediately being dropped onto a pin or the like. It would be highly desirable if the desired alignment could be attained without the intermediate use of such a chuck or pin. In a similar manner, it would be highly desirable if it was possible to align wafers about their geometric centers without utilizing such a chuck or pin.

Another problem which is common with both wafers and panels which are loaded from cassettes or picked up at work stations is that the Z axis of the robotic arm may not be completely parallel to the axis of the cassette, etc. due to alignment errors. The relative tilt may be in any direction and is usually only a few degrees. When this misalignment is present the arm cannot properly approach and pick up the wafers/panels with the end effector properly aligned whereby the exact positioning of the wafers/panels is not fully controllable. Previously filed U.S. patent application Ser. No. 08/661,292, filed Jun. 13, 1996 which is incorporated herein in its entirety, discloses a robotic arm having a universally tiltable Z-axis. The structure set forth in the application, however, does not have the ability to rotate at or near the wrist of the robotic arm and thus is not sufficient in and of itself to provide the necessary compensation for a misalignment of the nature described. It would be desirable if the misalignment could be fully corrected and the wafers/panels properly aligned without the intermediate use of a chuck or pin as discussed above.

With prior art robotic arms for processing semiconductor wafers and flat panels the cassettes and work stations must generally be aligned so as to be entered by the end effectors of the arms with the end effector moving radially in a straight line. It is not, for example, possible to enter the cassettes or workstations if their longitudinal axes are not parallel to the Z axis. Yet, since space is at a premium in a wafer or flat panel processing operation it would be highly desirable to be able to so arrange cassettes and/or workstations.

DISCLOSURE OF INVENTION

An improvement in a robotic arm structure having R, θ and Z motion constitutes one embodiment of the invention.

The arm structure includes at least two links with the θ motion being about a primary axis at the proximal end portion of the proximalmost link. The R motion proceeds radially from the primary axis whereby the distal end portion of the distalmost of the links can be moved in a radially extending straight line. An end effector has an end effector portion thereof pivotally mounted for rotation relative to the distal end portion of the distalmost link about an end effector axis which is parallel to the primary axis. A motor is provided which is mounted to a respective one of the distalmost link and the end effector. The motor is connected to drive relative rotation about the end effector axis between the distal end portion of the distalmost link and the end effector portion and to thereby provide a yaw (Y) motion. Electronic computer means and sensors serve for controlling the R, θ, Z and Y motions.

An improvement in a robotic arm structure having R, θ and Z motion constitutes another embodiment of the invention. The arm structure comprises n longitudinally extending links having respective proximal and distal end portions where n is 2 or is a larger integer. The proximal end portion of each of the links is pivotally mounted to rotate about a respective n th axes. An end effector is pivotally mounted to rotate about an n+1 st axis located at the distal end portion of the n th link. The pivotal axes of the links and of the end effector are all parallel. A radial drive rotatable shaft has a driven end portion and a driving end portion and extends along a first of the axes. Radial drive motor means serve for rotating the driven end portion of the radial drive shaft about the first of the axes. A rotary drive rotatable shaft has a driven end portion and a driving end portion and extends along the first axis. Rotary drive motor means serves for rotating the driven end portion of the rotary drive shaft about the first of the axes. The driving end portion of the rotary drive shaft is located adjacent the proximal end portion of the first link and is in rotational driving contact therewith. n−1 belt means are present with each being rotated by a respective one of n−1 corresponding pulleys. A first of the pulleys is rotated by the driving end portion of the radial drive shaft. Each succeeding belt means is arranged to rotate the next successive link about its respective axis. The improvement of the invention comprises an end effector motor which drives an end effector drive shaft located at the n+1 st axis and which serves to rotate the end effector about that axis. Radial, rotary and end effector motor drive sensor means each measure a quantity indicative of the rotational positions of the respective radial, rotary and end effector motor drive shafts and generate electronic signals representative of such rotational positions. Means communicate the electronic signals to electronic computing means. The electronic computer means computes the locus of the end effector from the rotational positions of the radial, rotary and end effector drive shafts. The computer means controls the drive motors so as to position the end effector to follow a desired path and to arrive at a desired locus.

In accordance with yet another embodiment of the invention a method is set forth for controlling an arm structure which comprises n longitudinally extending links each having respective proximal and distal end portions when n is 2 or a larger integer. The rotational positions of the radial, rotary and end effector drive shafts are measured. Electronic signals are generated and communicated to electronic computer means. The electronic computer means computes the locus of the end effector from the signals and controls the drive motors to move and position the end effector in any desired location within its reach.

Another embodiment of the invention comprises a wafer processing system which includes a conveyor belt which transports cassettes loaded with wafers or other objects along a substantially straight line path used in combination with a robotic arm of the nature described above.

Yet another embodiment of the invention comprises a plurality of robotic arms, each having one or more work stations within its reach, the robotic arms being positioned sufficiently close together such that after a wafer has been transported to the work station(s) within reach of a first of the arms and processed, it is then transported by the first arm to a transfer station which is within the reach of the second of the arms for processing at work stations within the reach of the second arm.

Another embodiment yet of the invention is a sensor array located in a position such that an object being transported by an arm as set forth above can be passed over the sensor array, a deviation in alignment of the object can be detected, if present, and the appropriate R, θ and Y corrections can be made so as to properly align the object.

In accordance with even a further embodiment of the invention a robotic arm mechanism is adapted to manipulate workpieces which provides full multidirectional planar (more than equivalent to R, θ) motion via provision of Y (yaw) motion. The mechanism comprises two pair of linkages, each linkage having a proximal link having proximal and distal end portions and a distal link having proximal and distal end portions. The distal end portions of the distal links of each of the linkages are pivotally mounted to one another at a wrist axis. The distal end portion of each proximal link is pivotally mounted to the proximal end portion of the corresponding distal link at a respective elbow axis. The proximal end portion of each proximal link is pivotally mounted at a respective shoulder axis to a relatively static support, the shoulder axes being in spaced apart relation to one another. An end effector is mounted at the distal end portion of the distal links for pivotal motion about the wrist axis. The pivotal axes are parallel to one another and extend in a first direction. The links and the end effector are spaced from one another along the direction of the axes such that the links can be moved orthogonally to the first direction in a volume extending along the first direction without obstruction from one another. A yaw motor drives relative rotation of the end effector about the distal axis. An elbow motor drives relative rotation between the proximal end portion of a respective one of the distal links and the distal end portion of the corresponding proximal link. A shoulder motor drives rotation of the proximal end portion of one of the proximal links relative to the static structure. Sensors and microprocessor control is provided to control motion of the mechanism.

In accordance with yet other embodiments of the invention correction is provided for misalignment of workpiece holding cassettes by utilizing an elevator which is tiltable from the vertical along with a motor which provides a yaw motion and/or an end effector longitudinal rotating motion.

In another embodiment yet, the invention provides a method of making finished workpieces, e.g., wafers, flat panels, computer memory disks, or the like, by manipulating them and processing them utilizing any of the above set forth methods and/or apparatus.

The present invention provides a robotic arm structure and control method useful for a number of things, particularly for picking up and transporting semiconductor wafers, panel displays and other generally flat objects for processing. The system provides continuous Y, yaw, motion of the end effector over at least nearly a 360° arc, for example, at least about 270°, whereby more efficient paths are selected by electronic computer control means and whereby vibration is significantly reduced, thus reducing potential down time. Both the continuous availability of all positions along the rotational path and the extent of yaw motion available are important to providing freedom for more efficient operation of the four-axis arm. It also provides design parameters which can be utilized by engineers which are considerably less restrictive than those with prior art robotic arms. An especially useful feature is the ability to move the end effector along a straight line path which is non-radial. This has a number of practical advantages, including, inter alia, the provision of the capability to feed cassettes loaded with workpieces on a straight conveyor belt. The arm structure and method are adapted to be used with dual (two handed) end effectors, triple (three handed) end effectors and the like and to allow a chuck for panel and/or wafer prealignment and work stations to be positioned in more versatile locations than is possible with prior art arm structures and control methods therefor.

The advantages of the invention include:

1) Improved mechanical characteristics of the robot, specifically, simplified arm mechanics (less transmission); increased stiffness and accuracy;

2) Improved motion capabilities of the robot, due to the introduction of a "yaw" axis at the end effector whereby the end effector is capable of performing general motion (translation and rotation) in a plane defined by the position of the Z axis (the end effector can move along an arbitrary trajectory with an arbitrary orientation);

3) General cassette orientation, the yaw axis allows for arbitrary oriented (non-radial) cassettes and for optimal arrangement of the wafer processing machinery, the additional degree of freedom allows for obstacle avoidance, provides more flexibility in the design and planning of the equipment of wafer processing machinery and reduces the extremely expensive area (real estate) need for the processing;

4) Handling of in-line arranged modules, without being translated the robot is capable of handling inline arranged cassettes as shown in FIG. 2; this new setup is intended to entirely replace the currently used small track systems in which the robot is translated by a track in order to comply with the restriction imposed by the radial cassette displacement; through in-line arranged modules it becomes easy to achieve more reliable multiple off-radial cassette handling with reduced capital investment;

5) Inter process wafer exchange, the in-line cassette handling concept allows several robots participating in different processes to interchange wafers performing put/get operations into/from stationary intermediate cassettes (FIG. 3(a));

6) Multiple off-radial cassette handling, the in-line cassette handling concept allows for handling of multiple sets of cassettes, proceeded by a conveyor belt; there are several sets of cassettes, arranged consecutively on a conveyor belt; the whole process is divided into different stages each set should pass through; the conveyor belt moves until a given set of cassettes enter the working envelope of the arm; the robot arm picks up a wafer from any of the cassettes within its working envelope and delivers it for processing in another cassette; after the stage finishes all the cassettes from the working envelope are transported by the conveyor belt to the next process stage (FIG. 3(b));

7) Wafer centering on the fly (FIG. 4); the arm according to the invention can be used in wafer centering (the orientation of the wafer is of no importance for the process) "on the fly"; the wafer is picked up, measured by using a non contact measurement device like a CCD sensor, put centered into a cassette or into a process station through a single motion (no extra placement of the wafer is required); both measurement and centering processes are performed while the arm is in motion; the advantages of such kind of handing are the following: the wafer is touched only by the end-effector; the accuracy of entering and final positioning of the wafer is improved; increased performance;

8) Flat panel alignment "on the fly" (FIG. 5), the arm according to the invention can also be used in flat panel handling for aligning square objects "on the fly"; the flat panel is picked up, measured, aligned "on the fly" and put into a cassette or process station through a single motion; the linear and angular offset calculation as well as their compensation are performed during the robot motion; the advantages are the same as in (6);

9) Continuous motion handling, the "yaw" axis makes it possible to plan and execute continuous path trajectories (FIG. 6) between two cassettes that results in smooth and fast wafer or flat panel handling; in turn, this makes the transported material (wafer, flat panel) and the processing equipment less stressed; the sequence "retract-rotate-extend" which is used to move a wafer form one cassette to another in the classical θ RZ scheme is replaced by a single motion along a smooth trajectory that does not require rotation of the arm; this substantially reduces the travel time and improves the overall performance of the machine;

10) Ability to efficiently utilize end effectors with more than two (generally three due to size limitations) hands; the continuous Y-motion capability allows an electronic controller, e.g., a microprocessor, to control a three hand end effector for very efficient operation, thereby increasing throughput;

11) When utilizing the frog type mechanism the apparatus is well adapted for use in a vacuum environment. Due to the number of belts and pulleys being reduced over that of non-frog type mechanisms the amount of dust created during belt movement is greatly reduced and dust is highly undesirable in vacuum environments. Furthermore, in non-frog type mechanisms the belts and pulleys which provide the R and θ motion crowd the interiors of the links. As a result, to provide yaw motion, as a practical matter, a motor must be positioned on the most distal link or on the end effector itself. In a vacuum environment space is at a minimum and there is not enough room to install a yaw motor in this manner in some instances;

12) Ability to compensate for misalignments of cassette axes relative to robotic arm axis; and 13) Ability to enter cassettes and/or workstations which have entrances which must be entered at an angle to the Z axis.

BRIEF DESCRIPTION OF THE DRAWINGS

The invention will be better understood by reference to the figures of the drawings wherein like numbers denote like parts throughout and wherein:

FIG. 1(a) illustrates, schematically, a prior art apparatus;

FIG. 1(b) illustrates, schematically, an apparatus in accordance with an embodiment of the invention;

FIG. 2 illustrates, schematically, use of an apparatus in accordance with an embodiment of the present invention and its operation with in-line arranged cassettes and work stations in accordance with the method of the present invention;

FIG. 3(a) illustrates, schematically, a multi robot system and its operation in accordance with an embodiment of the present invention;

FIG. 3(b) illustrates, schematically, a multiple off-radial cassette handling robot arm system and its operation in accordance with an embodiment of the present invention;

FIG. 4 illustrates, schematically, an embodiment of the present invention as used in combination with a sensor array for centering a semiconductor wafer or other circular object;

FIG. 5 illustrates, schematically, a similar apparatus and sensor array to that of FIG. 4 for aligning a flat panel or other angular object;

FIG. 6(a) illustrates, schematically, a trajectory path for a wafer utilizing a prior art robotic arm lacking yaw motion;

FIG. 6(b) illustrates, schematically, a trajectory path for a wafer utilizing a robotic arm in accordance with the invention which provides yaw motion;

FIG. 7 illustrates the various angles used in calculations during computer control of the arm;

FIG. 8 illustrates diagrammatically the flow of information to a computer motion controller;

FIG. 9 illustrates, in top view, a three hand end effector useful in embodiments of the invention holding three wafers shown in phantom;

FIG. 10 illustrates, in top view, a frog leg type linkage featuring a dual hand end effector in accordance with an embodiment of the invention;

FIG. 11 illustrates, in a side partially section view, the embodiment of FIG. 1;

FIG. 12 illustrates, in end view, the embodiment of FIGS. 10 and 11;

FIG. 13 illustrates, in partially section end view in larger size, another embodiment of the invention;

FIG. 14 illustrates, in partially section end view in larger size, yet another embodiment of the invention;

FIGS. 15a and 15b illustrate, in top view, steps in the operation of an embodiment of a frog leg type linkage in accordance with the invention;

FIG. 16 illustrates, in top view, the mathematics of a method of motion control in accordance with the invention;

FIGS. 17a and 17b illustrate a detail in the structure and operation of the invention;

FIG. 19 illustrates, in top view, use of a three hand end effector in an embodiment of the invention;

FIG. 20 illustrates, in side sectional partial view, incorporation of Z-motion in an embodiment in accordance with the present invention;

FIGS. 21a and 21b illustrate, in side sectional view and plan view respectively, a universally adjustable robotic arm in accordance with one or more embodiments of the invention, the arm illustrated providing both Y motion and E axis rotational motion about a E axis which extends along the length of the end effector;

FIG. 22 illustrates, in side sectional view, with an outwardly telescoped mode being shown in dashed lines, an elevator structure in accordance with an embodiment of the present invention;

FIGS. 23 illustrates, in enlarged side section view, a portion of the apparatus illustrated in FIG. 22 along with one of the motors used for tilting the elevator;

FIG. 24 illustrates, schematically, in both collapsed and extended form, an elevator as illustrated in FIG. 22 to which a robotic arm mechanism is mounted with the robotic arm mechanism having a sensor as part thereof;

FIG. 25 illustrates, in partial enlarged side sectional view, details of construction of a lower portion of an elevator structure useful in accordance with the embodiments of the present invention;

FIG. 26 illustrates, in a view similar to FIG. 25 but with individual parts separately shown in a side and in plan views, details in the elements illustrated in FIG. 25;

FIGS. 27 and 28 illustrate, in views similar, respectively to FIGS. 21a and 21b, an apparatus in accordance with an embodiment of the invention which includes both Y- and J-motion capability;

FIGS. 29a and 29b illustrate, in views similar, respectively to FIGS. 21a and 21b, an apparatus in accordance with an embodiment of the invention which includes a dual end effector with both Y- and J-motion capability for each of the wafer picking up portions (hands) of the end effector;

FIGS. 30a and 30b illustrate, in side partial section and plan view, an apparatus in accordance with an embodiment of the invention which includes both Y- and J-motion capability and the accessing of cassettes positioned in a plane parallel to the Z axis;

FIGS. 31a and 31b illustrate, in views similar, respectively to FIGS. 21a and 21b, an apparatus in accordance with an embodiment of the invention which includes a dual end effector with Y-, E- and J-motion capability for each of the hands;

FIG. 33 illustrates, schematically, compensation of a robotic arm in accordance with an embodiment of the invention for longitudinal misalignment;

FIGS. 34a and 34b illustrate, in plan views, longitudinal misalignment and compensation of a robotic arm in accordance with an embodiment of the invention for the longitudinal misalignment;

FIGS. 35a and 35b illustrate, in side partial sectional and plan views, respectively, multiple (two are shown) end effectors, each of which is a dual end effector, with separate yaw motors for each of the dual end effectors;

FIG. 36 illustrates the Y motor section of FIG. 35a in enlarged and more detailed view;

FIG. 37 illustrates the minimum end effector working envelope for a dual hand end effector;

FIG. 38 illustrates the minimum end effector working envelope for a two Y axis single hand end effector;

FIGS. 39a–39f illustrate one mode of operation in accordance with an embodiment of the invention;

FIG. 40 is a general representation of the elevator structure shown in FIGS. 22–26 wherein all plates of the table are in a symmetrical relationship;

FIG. 41 is a general representation of the deformation which occurs between the joints of the elevator structure shown in FIGS. 22–26 when the upper plate is provided at an angle;

FIG. 42 is a general representation of the elevator structure shown in FIGS. 22–26 representing a first embodiment wherein the bushings around the universal joints are elastic;

FIG. 43 is a representation of the elevator structure shown in FIGS. 22–26 wherein the rod members are elastic.

FIG. 44 is a side view of an alternate embodiment of the elevator structure suitable for use in accordance with the robot of the present invention.

FIG. 45 is a second side view of the robot shown in FIG. 44.

FIG. 46 is a top view of the elevator structure shown in FIG. 44.

FIG. 47 is a top view of the spring mechanism utilized in the elevator structure shown in FIGS. 44–46.

FIG. 48 is an elevational view of an alternate embodiment of multiple independent end effectors with separate yaw motors for each independent end effector.

FIG. 49 is a top plan view of the end effectors and separate yaw motors of FIG. 48.

FIG. 50 is another alternate embodiment of multiple independent end effectors with separate yaw motors for each independent end effector.

DETAILED DESCRIPTION OF THE INVENTION

Figure 18A:
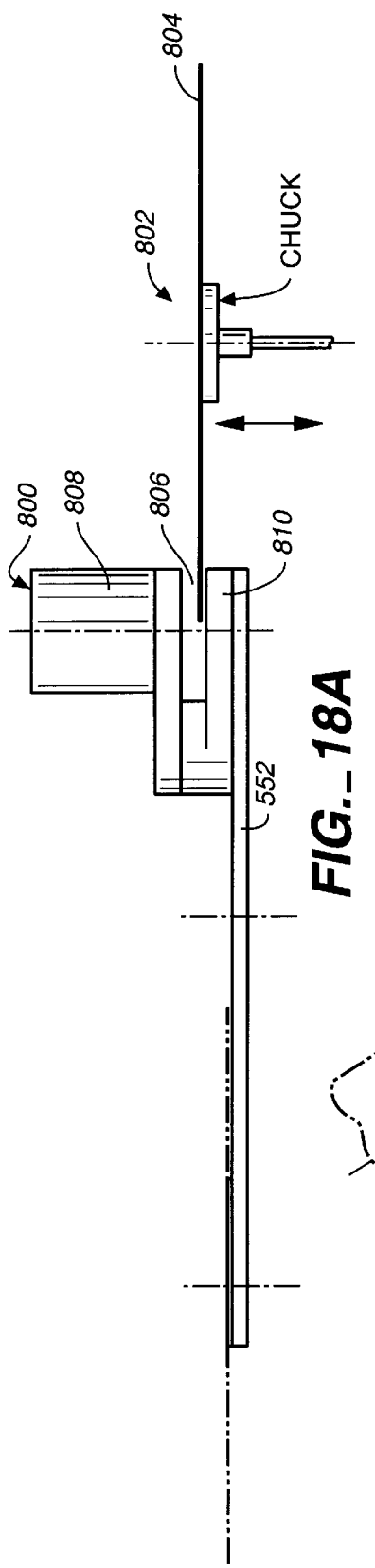
FIGS. 18a and 18b illustrate, in side and plan views, respectively, means for aligning wafers in accordance with an embodiment of the invention.

The present invention provides a unique yaw motion to the end effectors of robotic arms which allows the arms to be used more efficiently than can prior art arms which lack yaw motion. In certain embodiments both roll/or pitch motion is provided. The motion of the arm can be controlled via mechanisms which include measuring the rotational rate (and thereby positions) of the radial and rotary drive shafts and of the yaw drive shaft (and the roll and pitch drive shafts, where used) and utilizing a computer to control these quantities such that the end effector of the robotic arm follows a desired path. The arm retains the capability of straight line motion and, indeed, extends this ability to straight line motion in other than the radial direction as well as to an arbitrary trajectory. There are a number of unique features to the invention.

For a better understanding of the invention it should be noted that the terms "belt", "belt means", "pulley" and "pulley means" are, at times, referred to as gearing. It should further be understood that the terms "belt" and "belt means" are used broadly to include toothed and untoothed constructions, chains, fabric belts, woven belts and the like. They may be constructed of any suitable material, natural or synthetic, organic, inorganic, polymeric, composite or metallic. Likewise the terms "pulley" and "pulley means" are used broadly to include toothed and untoothed constructions, constructions which positively engage with respective belts or which engage only frictionally with such belts. They too may be constructed of any suitable material, natural or synthetic, organic, inorganic, polymeric, composite or metallic. It should also be mentioned that the terms "vertical" and "horizontal" are occasionally used herein to simplify discussions of certain embodiments of the invention. It should be recognized that these terms are used for ease of explanation and that what is meant is simply two mutually perpendicular axes. With this in mind the following detailed discussion of the invention will be set forth.

An understanding of the basic formulas governing such motion as is contemplated and as falls within the ambit of the present invention will be informative and will aid in understanding the invention. These and their use are shown diagrammatically in FIGS. 7 and 16. The basic notation used is that:

X—end effector position vector: $X=[R\ \theta\ Z\phi]^T$ or $X=[X\ Y\ Z\ \phi]^T$ where R, $\theta$ and Z are the cylindrical coordinates of the end effector pole, while X, Y, Z are its Cartesian coordinates where $\phi$ is the angle between the longitudinal axis of the end effector and the abscise axis of the world coordinate frame;

$X_d$—the desired position of the end effector;

$e=X_d-X$ the trajectory tracking error dx/dt—end effector linear velocity vector: $dx/dt=[dR/dt\ d\theta/dt\ dZ/dt]^T$ or $dx/dt=[dx/dt\ dY/dt\ dz/dt]^T$ where d/dt denotes the first time derivative of the respective quantities;

$\|X\|$—the Euclidian norm of X;

Q—joint coordinate vector: $Q=[Q1\ Q2\ Q3\ Q4]^T$ where Q1–Q3 are the angles between the links as shown in FIG. 1 and Q4 coincides with the Z coordinate. Respectively the first time derivative is dQ/dt; and $\Theta$=motor coordinates vector: $\Theta=[\Theta_1\Theta_2\Theta_3\Theta_4]^T$, where $\Theta_1-\Theta_4$ describe motor positions.

To move the end effector pole along a continuous trajectory (straight line, arc, etc.) in the Cartesian space with a prescribed end effector orientation one should synchronize motor velocities. The last depend on the trajectory executed, orientation change and motion parameters (linear and angular velocity and acceleration) desired. The first step towards the solution of this task is to plan the end effector velocity (linear and angular) at each sampling time. Usually the user specifies the norm of the maximum linear and angular velocity, acceleration and jerk (the first time derivative of the acceleration) of the end effector during the motion. The control system is responsible for generating a velocity profile that meets these requirements. At each sampling time the velocity profile generator, taking into account the current position of the end effector, calculates its linear and angular velocity vectors. They last are transformed into joint and motor velocities, solving the Inverse Kinetics Problem at velocity level. In order to calculate the joint and motor velocities the current motor positions should be available (motor positions are given by the encoders and transformed to joint positions through the solution of the Direct Kinematics Problem at position level). The motor velocities are loaded into the motion controller and the sequence above is repeated at each sampling time until the end of the trajectory is reached. FIG. 8 sets forth a scheme of control embodying these principals.

Referring to FIG. 1(a), a prior art robotic arm assembly 10 is illustrated which comprises a robot base, links L1, L2 and L3 plus an end effector 18.

A radial drive motor Servo Motor 1 drives a radial drive shaft 20. The radial drive motor Servo Motor 1, motivates a gear train 28 which, in turn, drives the radial drive shaft 20.

In FIGS. 1(a) and (b) there are 3 longitudinally extending links. Each link has a proximal end portion and a distal end portion. A more detailed description of the robotic arm of FIG. 1(a) can be found in U.S. Pat. No. 5,064,340. Each of the links has its proximal end portion pivotally mounted to rotate about a respective n th axis. Thus, the first link L1 has its proximal end portion pivotally mounted about a first (primary) axis 21, the second link L2 has its proximal end portion pivotally mounted to rotate about a second axis 23, etc. The end effector 18 is pivotally mounted to rotate about an n+1 st axis, in the embodiment of FIGS. 1(a) and (b), about a fourth (end effector) axis 25 which is located at the distal end portion of the preceding link (in the embodiment illustrated at the distal end portion of the third link L3). As will be noted the axes of the links and of the end effector are all parallel to one another.

Note that the robotic arm of U.S. Pat. No. 5,064,340 is only one of numerous robotic arms with which the embodiments of the invention can advantageously be utilized. For example, and without limitation, the robotic arm of U.S. patent application Ser. No. 08/432,682 can also be used as can other arms described herein and elsewhere.

Belt means (shown as dashed lines) are each rotated by respective ones of n corresponding pulleys. A first of the pulleys is rotated by the driving end portion of the radial drive shaft 20. In FIG. 1(a), each succeeding belt means except for the n th is arranged to rotate the next successive link about its respective axis. The n th belt means is arranged to rotate the end effector 18 about the n+1 st axis 25. FIG. 1(b) lacks the n th belt means and end effector 18 is instead rotated in accordance with the present invention by Servo Motor 3.

The operation of the radial drive components are substantially the same as those described in U.S. Pat. No. 5,064,340. It should be noted that the effective length of each link is defined as the distance between a first pivot axis where the proximal end of that link is pivotally mounted and a second pivot axis where the proximal end portion of the next link is pivotally mounted. The radial drive rotatable shaft 20 rotates relative to a robot base. The radial drive rotatable shaft 20 motivates a pulley-drive wheel which rotates therewith. The drive wheel is coaxial with the first axis 21. The first link L1 is pivotally mounted to the robot base at a bearing structure. A post is mounted to the distal end portion of the first link L1 along a second pivot axis 23. The post has the second effectively cylindrical surface on it with the second effectively cylindrical surface being cylindrical about the second pivot axis 23. The second link L2 is pivotally mounted relative to the post by bearings 22, whereby the second link L2 is rotatable at its proximal end portion about the second pivot axis 23. The second link L2 has a second pulley surface aligned opposite the first pulley surface and it has a third pulley surface aligned opposite a fourth pulley surface located about a third axis 27. In FIG. 1(a) an additional belt/pulley arrangement serves to rotate the end effector 18 which is rotatably mounted via bearings about a post mounted to the distal end portion of the second link L2. Belts serve to impart the needed rotation about the various axes in FIG. 1(a). If desired, gearing can be provided in the first link L1 between the first axis 21 and the second axis 23. Such is shown in previously mentioned U.S. Pat. No. 5,064,340.

In accordance with the present invention, radial drive sensor means 90, in practice an incremental photo encoder, is provided for measuring a quantity indicative of the rotational position about the axis 21 of the radial drive shaft 20 and for generating an electronic signal representative of the rotational position of the radial drive shaft 20. For convenience and accuracy the quantity actually measured which is indicative of the rotational position of the radial drive shaft 20 is the rotational position of an extension 26 of the shaft 20, i.e., the rotational position of the radial drive motor, i.e., Servo Motor 1. Since the two quantities are proportional to one another the resulting electronic signal is indicative of the desired quantity, namely, the rotational position of the radial drive shaft 20. The photo encoder can be in the nature of a light source and a light sensor aligned to receive light from the light source when the light path is not blocked off (See FIGS. 17a and 17b and the text describing this technology).

Means represented by line 92 is present for communicating the electronic signal representative of the rotational position of the radial drive shaft 20 to electronic computing means 96. Similarly, rotary drive sensor means 98 is provided for measuring a quantity indicative of the rotational position of the rotary drive shaft 78 and for generating an electronic signal representative of the rotational position of the rotary drive shaft 78 about the first axis 21. In practice, the quantity is measured at the intermediate shaft 64. Means, represented by line 100, is provided for communicating the electronic signal representative of the rotational position of the rotary drive shaft 78 to the electronic computing means 96.

The electronic computer means 96 includes locus computing means 102 for computing the locus of the end effector 18 from the sensed rotational positions of the radial drive shaft 20 and the rotary drive shaft 78 using the geometric relations dictated by the specific lengths of the various links and the diameters of the various pulleys. The electronic computing means 96 further includes drive controlling means 104 for controlling the radial drive motor, Servo Motor 1, and the rotary drive motor, Servo Motor 2 such that the number of revolutions of the rotary drive shaft 20, $n_R$, divided by the number of revolutions of the radial drive shaft 78, $n_\theta$, is equal to $-K$ so as to position the end effector 18 to follow a radial straight line path and to arrive at a desired locus. The $-K$ value does not satisfy this relationship for a non-radial straight line path. The control signal is represented by lines 106, 108 to the radial drive motor, Servo Motor 1, and to the rotary drive motor, Servo Motor 2, respectively.

FIG. 1(b) illustrates a basic embodiment of the present invention. The end effector 18 is rotated by operation of Servo Motor 3 about the axis 25 which can be referred to and thought of as the Y or yaw axis. In the particular embodiment illustrated, Servo Motor 3 is mounted to the distal end portion of the link L3 and its shaft directly rotates the end effector 18. However, it should be noted that Servo Motor 3 can be mounted at any desired position so long as it is arranged so as to provide the desired yaw motion. For example, and without limitation, the Servo Motor 3 can be mounted within any one of the links, e.g., near the Servo Motors 1 and 2 as shown in FIG. 50 and described in more detail below. If the Servo Motor 3 is not mounted at the axis 25 appropriate belt and pulley arrangements, like those described for delivering the rotary and radial motions, are provided so that rotational drive about the yaw axis results.

FIG. 2 illustrates an application of the apparatus of FIG. 1(a). It will be noted that the work stations, W, and the wafer cassettes, C, are not located an equal radial distance from the axis 21 of the robotic arm. Using the yaw capability it is possible to so align the end effector 18 that it can be inserted in each work station and in the cassettes, as well, in a straight line even though the work stations and cassettes are not radially aligned relative to the axis 21. In such a manner the robotic system described can entirely replace expensive small track systems in which the robot is carried (translated) by a track in order to handle inline arranged cassettes.

FIG. 3(a) illustrates use of two arms 10, 10' sequentially. An arm (not shown) to the left of the arm 10 picks up a wafer from any of the three left most cassettes and delivers it for processing within its working envelope. Following processing it delivers the processed wafer to the shared (shaded) cassette at the right extreme of its working envelope. It should be noted that the shared cassette is defined as the cassette in the particular sharing location and each successive cassette will serve as the shared cassette as it passes through the sharing location. Arm 10 picks up a wafer which has been processed in this manner from any of the cassettes in its working envelope, delivers it for processing and, following processing delivers it to the shaded cassette at the right extreme of its working envelope. The arm 10' then carries out similar operations. As many arms as are needed can be placed in sequence in this manner.

FIG. 3(b) illustrates multiple off-radial cassette handling. Several sets of cassettes, C, arranged consecutively on a conveyor belt, B, proceed in the direction indicated on the conveyor belt. The whole process is divided into different stages each set of cassettes should pass through. The conveyor belt moves until a given set of cassettes enter the working envelope (delineated by a dashed rectangle) of the arm. The robot arm picks up a wafer from any of the cassettes within its working envelope and delivers it after processing to another cassette. After the stage finishes all the cassettes from the working envelope are transported by the conveyor belt to the next process stage.

FIG. 4 illustrates use of a robotic arm having yaw motion for centering a semiconductor wafer (which may be misaligned in a cassette C) "on the fly" (as it traverses its path to a work station W). Normally such wafers must be moved onto a chuck to center and rotate them so they are aligned properly for delivery to a work station. In accordance with an embodiment of the invention an edge position measuring device, for example, an optical sensor such as a CCD sensor, can be positioned conveniently where the wafer is directed within the ambit of the sensor and any deviation of the center of the wafer from its required position is detected. The sensor array (in this instance a single sensor constitutes the array) then signals to electronic computer control circuitry which directs the yaw motor (Servo Motor 3) to correct for the misalignment. The wafer is then delivered to work station W in the proper alignment for processing.

The wafer operation of the embodiment of FIG. 4 can be summarized as follows:

Position A: a non-centered wafer is in the source cassette. The end effector coordinate frame coincides with the source cassette coordinate frame. The end effector moves with respect to its own coordinate frame (translates along the ordinate axis) until the wafer is pulled out of the cassette;

Position B: the wafer moves inside the measuring area. The displacement of the center of the wafer with respect to the end effector coordinate frame is calculated based on the sensor (CDD) readings. The axes of the wafer coordinate frame are parallel to the corresponding axes of the end effector coordinate frame;

Wafer transporting and centering phase: the wafer is translated and rotated in order to arrive at position D properly positioned (the wafer coordinate frame should be parallel to the destination cassette coordinate frame with ordinate axes coincident. The end effector should move in terms of the wafer coordinate frame (translation along the ordinate axis) until arrival at position E.

Position E: the wafer is centered. Its coordinate frame coincides with the destination cassette coordinate frame.

FIG. 5 is very similar to FIG. 4 but demonstrates object alignment "on the fly" for a display panel P which is rectangular in shape. The panel is shown in positions A–D to show its progress "on the fly". The sensor array, in this instance includes three sensors, two to define an edge and the third to define a perpendicular edge thereby completely defining the position of the panel.

The panel centering operation of the embodiment of FIG. 5 can be summarized as follows:

Position A: a flat panel is in the source cassette with angular and linear misalignment. The end effector coordinate frame coincides with the source cassette coordinate frame. The end effector moves with respect to its own coordinate frame (translates along the ordinate axis) until the panel is pulled out of the cassette;

Position B: the flat panel moves inside the measuring area. The linear and angular offsets between the end effector coordinate frame and the flat panel coordinate frame are calculated based on the sensor (CDD) readings. The axes of the wafer coordinate frame are parallel to the corresponding axes of the end effector coordinate frame;

Flat panel transporting and aligning phase: the panel is translated and rotated in order to arrive at position C properly positioned and oriented the panel coordinate frame should be parallel to the destination cassette coordinate frame with ordinate axes coincident. The end effector should move in terms of the flat panel coordinate frame (translation along the flat panel ordinate axis) until arrival at position D.

Position D: the flat panel is aligned. Its coordinate frame coincides with the destination cassette coordinate frame.

FIG. 6(a) shows operation of a prior art robotic arm which does not include a yaw motor. A wafer is picked up at position A, the arm retracts along the R direction along the line segment A–B (and stops, creating vibration). The arm then rotates about the axis 21 along the arc B–C (and stops, creating more vibration). Finally, the arm extends along the R direction along the line segment C–D and deposits the wafer at the position D. The graph to the right of FIG. 6(a) illustrates the stop/start motion.

FIG. 6(b) illustrates the same resulting movement, from position A to position D, in a smooth and controlled manner and without any intermediate stops which would cause considerable vibration, particularly in view of the high speeds at which such operations are carried out in the semiconductor industry. The path is along the continuous trajectory A–D.

FIG. 9 illustrates a three hand end effector 118, which has fixed hands extending at 120° from the end effector axis 25 shown in FIG. 1(b). The electronic computer means 96 controls the yaw motor (Servo Motor 3, as illustrated) utilizing the locus computing means 102 for most efficient operation thereby increasing throughput. The provision of controlled yaw motion removes the necessity of having a two or three hand end effector which has an axis which must be movable across the Z-axis (thereby allowing more efficient motion) and the necessity to utilize in and out linear motion across the Z-axis.

For flat panel display handling and the like an additional degree of freedom can be provided via means, e.g., an additional (5th) motor, for rotating the end effector about a roll axis, designated for convenience as an E axis, which is the longitudinal axis of the end effector 18. This allows such panels to be rotated about the roll axis into a vertical plane.

It should be noted that a distalmost axis motor 302 for rotating the end effector 18 about the roll axis 304 of the end effector 18, as illustrated in FIGS. 21a and 21b, can be used in place of the end effector motor (such as Servo Motor 3) in certain instances, in particular for correcting for misalignment of cassettes or workstations from being parallel with the primary axis 21 when tilting is provided of an elevator 310 which transports the arm assembly 10 along the primary axis 21. Basically, the elevator 310 tips enough to align the axis 21 with the more or less vertical axis of the cassette/ workstation holding wafers/panels and the motor 302 serves to tilt the end effector 18 so that it approaches the wafers/ panels in completely proper angular alignment to pick them up and deliver them for processing. Other corrections which are needed are made as explained in more detail below.

In practice, the embodiment of FIG. 21 operates as is set forth in following. Piezo crystals 311 are provided generally equally spaced at 120° about the axis of the elevator structure 310. Each piezo crystal has its own general coordinate that is measured by a respective feedback sensor 313 and is properly controlled so as to result in a given orientation of the plane of the arm links. These serve to sense the tilt of the robot base (lower plate) 328. The Y motor and/or the E motor are adjusted as explained below with the positions of each motor being sensed and transmitted to the computer controller which then controls the motors to attain a desired orientation and position.

In the embodiment illustrated the end effector 18 includes a proximal section 317 which is pivotally attached to the distalmost link and a distal section 319. The roll motor is located on either the proximal section 317 or the distal section 319 of the end effector 18 As illustrated the motor 302 is rigidly attached relative to the proximal section 317 and the motor shaft 315 is rigidly attached to the distal section 319. Accordingly, as the shaft 315 is rotated by the roll motor 302 the distal section 319 is rotated about the roll axis 304 relative to the proximal section 317. As with the Y motor, the precise arrangement illustrated for the E motor need not be used. The E motor can be otherwise positioned and, if necessary, a belt and pulley arrangement may be provided to motivate the desired roll motion. Generally, however, installing the roll motor as illustrated is preferred.

Appropriate sensors, of the nature discussed elsewhere herein, serve to measure the relative positions of the proximal and distal sections. The information is transmitted to the computer controller which sends control signals to the motors to control the relative positions of the proximal and distal sections. This provides roll motion. Y motion is provided as described elsewhere herein by operation of the Y motor. All motions are controlled by the computer utilizing sensors which sense the positions of the shafts of the various motors and transmit this information to the computer.

FIG. 22 illustrates a generally universally tiltingly adjustable telescoping elevator structure 310 useful in accordance with certain embodiments of the present invention. The elevator is shown both in its retracted form (in solid lines) and in its expanded form (in dashed lines).

The elevator structure 310 is made up of two distinct portions, namely, a rigid frame 312 which includes a base 314 having an upwardly facing generally planar surface 316, a rigid vertical structure 318 having a structure upper end portion 320, the rigid structure 318 extending upwardly generally orthogonally from the planar surface 316 to the structure upper end portion 320 and a flange 322 attached to the structure upper end portion 320, the flange 322 being generally parallel to the planar surface 316.

The second part of the elevator 310 is a movable elevatable structure 324 which is telescopically mounted to the rigid frame 312. It moves up and down through an opening 325 in the flange 322. The movable elevatable structure 324 includes an upper plate 326, a lower plate 328 which is positioned at a spaced distance from and generally parallel to the upper plate 326 and at least three non-coplanar linearly extending generally parallel members 330. Each of the members 330 has a respective upper end portion 332 and a respective lower end portion 334. Each of the members 330 extends from the upper plate 326 to the lower plate 328. The members 330 are each generally (but not exactly during tilting) orthogonal relative to the plates 326 and 328. Generally, the non-coplanar members are substantially equally spaced about the peripheries of the upper plate 326 and the lower plate 328.

A plurality of upper universal joints 336 are supported by the upper plate 326. The term "universal joint" as used herein includes joints with either two or three degrees of freedom as well as any other kinematically equivalent joint that can be used to restrict the motion of the plate or other member to which it is connected. The number of upper universal joints 336 is equal to the number of linearly extending members 330. Each of the upper universal joints 336 is arranged to universally mount the respective upper end portion 332 of a respective one of the linearly extending members 330 to the upper plate 326.

Likewise, there are a plurality of lower universal joints 338 which are supported by the lower plate 328. The number of lower universal joints 338 is equal to the number of linearly extending members 330. Each of the lower universal joints 338 is arranged to universally mount the respective lower end portion 334 of a respective one of the linearly extending members 30 to the lower plate 328.

Motor means 340, as seen in FIG. 23, is rigidly supported, generally by the base 314. It serves for motivating each of the linearly extending members 330 independently of each other of the linearly extending members 330 toward and away from the base 314. The preferred motor means comprises three separate motors, one of which, 342, is shown in FIG. 23. Each motor operates via a respective belt and pulley arrangement 344 to rotate a respective lead screw 346 which is mounted for rotation relative to the base 314 and to the flange 322. A bracket 352 is attached to the linearly extending member 330 and has an extending arm 354 which defines a bore 356 which includes a thread follower structure 357, for example, a ball screw bearing (preferred) or mating threads, which engages with the lead screw 346. Thereby, rotation of the lead screw 346 under the impetus of the motor 342 causes the bracket 352 to move in a direction determined by the direction of rotation of the motor 342 which in turn leads to linear motion of the linearly extending member 330 (and to tilting of the upper plate 326 and of the lower plate 328 if all motors are not operating identically). A single motor along with a more complex pulley/belt arrangement and appropriate gearing and/or clutching can alternatively be utilized.

The telescoping elevator structure 310 in accordance with the present invention is generally useful in combination with an article positioning apparatus 360 as described elsewhere herein which can be suitably mounted to the elevatable structure 324, generally to the upper plate 326 or to the lower plate 328 as illustrated in FIG. 24. As shown it is mounted to the upper plate 326. The particular apparatus illustrated in FIG. 24 includes an end effector 362 pivotally connected to a forearm 364 which is in turn pivotally connected to a proximal arm 366, which is pivotally connected about an axis 369 to a post 368 which can be conventionally motivated to move vertically to provide Z- axis motion. The end effector 362 would conventionally include vacuum pickup means which are useful for picking up semiconductor wafers and the like. All are conventionally controlled by control means, namely by the computing means 96.

It should be understood that there must be some elasticity inherent in the formation of the table. In one embodiment, the universal joints discussed above are somewhat elastic with the rods and the table being rigid. The reason for such elasticity is the change in the linear distance of the joint center-to-center relationship when the table is at an angle. FIG. 40 shows the tilt mechanism in a symmetrical (all plates parallel) relationship. In this configuration, the distance (I) from the center of the respective joints $338_1, 338_2$ to each other is equal if the symmetrical relationship is maintained. However, as shown in FIG. 41, if the upper platform 326 has a first end $326_1$, higher than the second end $326_2$, the distance (I) between the respective centers of the universal joints $338_1, 338_2$ will be greater by a distance d1 than in the symmetrical case. This requires that the universal joints be elastic enough to allow for the variation of the distance d1 in the movement of the table. FIG. 42 shows a first proposed scheme wherein the bushings have an elastic element positioned therein to allow for the variation d1. FIG. 43 shows a second proposed scheme wherein the rods themselves can elastically deform. It should be apparent to one of ordinary skill that elasticity may occur in both the rods and the joints due to the finite stiffness of the materials used in construction.

FIGS. 44–47 show an alternative embodiment to the elevator table shown in FIGS. 22–26. In this embodiment, the elevator screws 346-1 are positioned within the arm members 330-1 to allow for a more compact arrangement for the elevator structure, making it suitable for applications wherein the physical space for the robot is limited. A spring member 360 is positioned at the base of the frame 312 to ensure that the parallel arm members 330-1 do not rotate. Three motor means 340-1, 340-2, 340-3 are coupled to three belt and pulley arrangements 344-1, 344-2, 344-3, respectively, to rotate the screws to raise and lower the platform 322-1 in accordance with the above description.

A suitable position measuring sensor system 370 (FIG. 24), can include a) signal transmitting means for transmitting a first signal (e.g., a photo or a sonic signal) longitudinally forward from the distal end of the end effector 362 parallel to the workpieces, b) signal detector means (e.g., a photo or a sonic signal detector) for providing a signal indicative of impinging incident energy, and c) energy gathering and transmitting means for gathering energy caused by reflection of the first signal from a workpiece and transmitting such energy to the signal detector means. Status signal transmitting means are provided for transmitting a signal to the control means indicative of the presence or absence of energy caused by reflection of the first signal from a respective one of the workpieces.

The position measuring sensor system 370 can be provided on the end effector 362 for detecting whether or not any wafer, panel, cassette or workstation to be picked up is properly aligned or is misaligned and somehow canted, In the latter instance the elevator structure 310 can be utilized to tilt the entire article positioning apparatus 360 so that the vacuum pickup on the end effector 362 is aligned to properly pick up the wafer. The end effector 362 is appropriately tilted about the n th axis 25 or about the longitudinal axis 304 of the end effector 362 utilizing, respectively, the Servo Motor 3 or the motor 302.

Basically, the tilt of the elevator structure 310 is adjusted utilizing the Servo motor 3 and the roll motor 302 so that the wafer/panel/etc. is in proper position for delivery to a wafer/panel processing station in a semiconductor/panel processing operation. As will be noted by reference to FIG. 24, the article positioning apparatus 360 is shown in two positions, one corresponding to full retraction of both the rod 368 and the elevator 310 and the other corresponding to at least partial extension of the elevator 310 and the article positioning apparatus 360.

The article positioning apparatus 360 has a bottom portion 363 which is supported by the upper plate 326 in the embodiment illustrated. The article positioning apparatus 360 extends upwardly through the generally central opening 325 in the flange 322 to above the upper plate 326. In the particular embodiment illustrated in FIGS. 22–24 there are three lead screw/bracket/linearly extending member combinations (one is shown) equally spaced around the flange 322 which, in this instance, is circular in shape. Rigidity to the structure is provided by the rigid vertical structure 318 which in the particular embodiment illustrated comprises three tubes which are rigid and which are attached from the base 314 to the flange 322.

As seen in FIGS. 25 and 26, a pneumatic pressure cylinder 386 is attached to a first membrane 384. A flange 392 is rigidly attached to a second membrane 382 with bolts 379. After activation of the pressure cylinder 386 a cylinder rod 389 applies a force upon the flange 392. The flange 392 transmits this force to the second membrane 382. As a result, the second membrane 382, which is rigidly attached with bolts 391 to the bottom of the elevator 310, bows upwardly. At the same time, the first membrane 384 has a tendency to bow downwardly.

Another mechanism is provided to control the deformation of the membranes 382 and 384. A flange 385 is spaced apart from and under the first membrane 384. A structure 388 is attached with its upper end portion 393 attached to the flange 392. The structure 388 passed through the first membrane 384 in non-contacting relation and has its bottom portion attached to the flange 385. An adjustment mechanism 387 allows the flange 385 to be positioned closer to or further from the first membrane 384. Accordingly, a gap 381 as defined between the flange 385 and the first membrane 384, determines the travel of the cylinder rod 389 and thereby the extent of the deformation of the first and second membranes 384, 382.

FIGS. 27 and 28 illustrate embodiments of the invention in which yet another motion about a pitch axis of the end effector, designated as J which is perpendicular to the E axis and to the Y axis, is provided. A pitch motor is provided which acts between the proximal and distal sections of the end effector 18 to provide relative rotation about a J axis. This motion is useful in allowing flat panels to be rotated from the horizontal to the vertical. It is also useful to allow cassettes to be readily transferred from, for example, horizontal cassettes or workstations to vertical cassettes or workstations or simply into and/or out of other than horizontally aligned cassettes See cassettes 1, 2 and 3). If both Y and J motion is provided it is not necessary that the cassettes be arranged radially.

Note that Y, J and E motion can be provided with a single end effector for maximum versatility. If both J and E motion are provided it becomes necessary to have proximal, central and distal sections of the end effector so as to allow both J and E motion to be attained. The J motor is controlled in the same manner as are all other motors via appropriate sensors, transmission of signals to the computer controller and transmission of control signals from the computer controller to the J motor.

Referring again to FIGS. 21a and 21b, it will be apparent that the robotic arm illustrated provides 7 degrees of freedom and is capable of performing a general controlled motion in three dimensional space. The combination of the Y and E axes can be considered as a two degree of freedom wrist attached to a "planar" two dimensional arm movable with two degrees of freedom, R and θ. The entire arm is spherically attached to a platform that moves vertically (Z direction). The rotation (tilt) of the arm around the spherical bearing is controlled by the three piezo crystals. Each piezo crystal has its own generalized coordinate system that is measured by a respective feedback sensor as discussed elsewhere. It is properly controlled so as to result in a given orientation of the plane of the links.

FIGS. 29a and 29b illustrate an embodiment of a robot having a yaw motor plus a double end effector 718 with each of the end effector distal portions 718a, 718b being rotatable about a respective pitch axis 720a, 720b utilizing its own pitch motor 722a, 722b and its appropriate sensor 724a, 724b which is in communication with and controlled by the computer controller 92. This serves to minimize the time needed to handle workstations or cassettes when repositioning workpieces. The workpiece is picked up by the first end effector portion via orienting its pitch axis and is replaced at the workstation by a workpiece which is already available on the second end effector portion.

FIGS. 30a and 30b illustrate the use of a robotic arm having a J axis to pick up workpieces from both vertically and horizontally aligned cassettes, C.

FIGS. 31a and 31b illustrate a robotic arm with a dual end effector with each wrist region having Y, J and E motions. The result is universally adjustable wrists. The use of a tilting elevator is not needed with this construction since the robot is capable, through use of the available θ, R, Z, Y, E and J motions, of compensating for any misalignment of the cassette/workstation axis relative to the Z axis. In the working envelope the arm can reach any arbitrarily situated cassette and can approach the cassette for proper entrance to pick up or deposit workpieces.

It is important to make certain corrections in the positioning of the end effector 18 when the elevator is tilted to align it to pick up workpieces which are canted in a cassette or from cassettes which are themselves canted relative to the Z axis. The corrections are needed since the tilting is of the elevator platform on which the robotic arm 10 is mounted and the end effector is in a plane removed from that of the elevator platform. These corrections will be understood by reference to FIGS. 32–34b.

Figure 32:
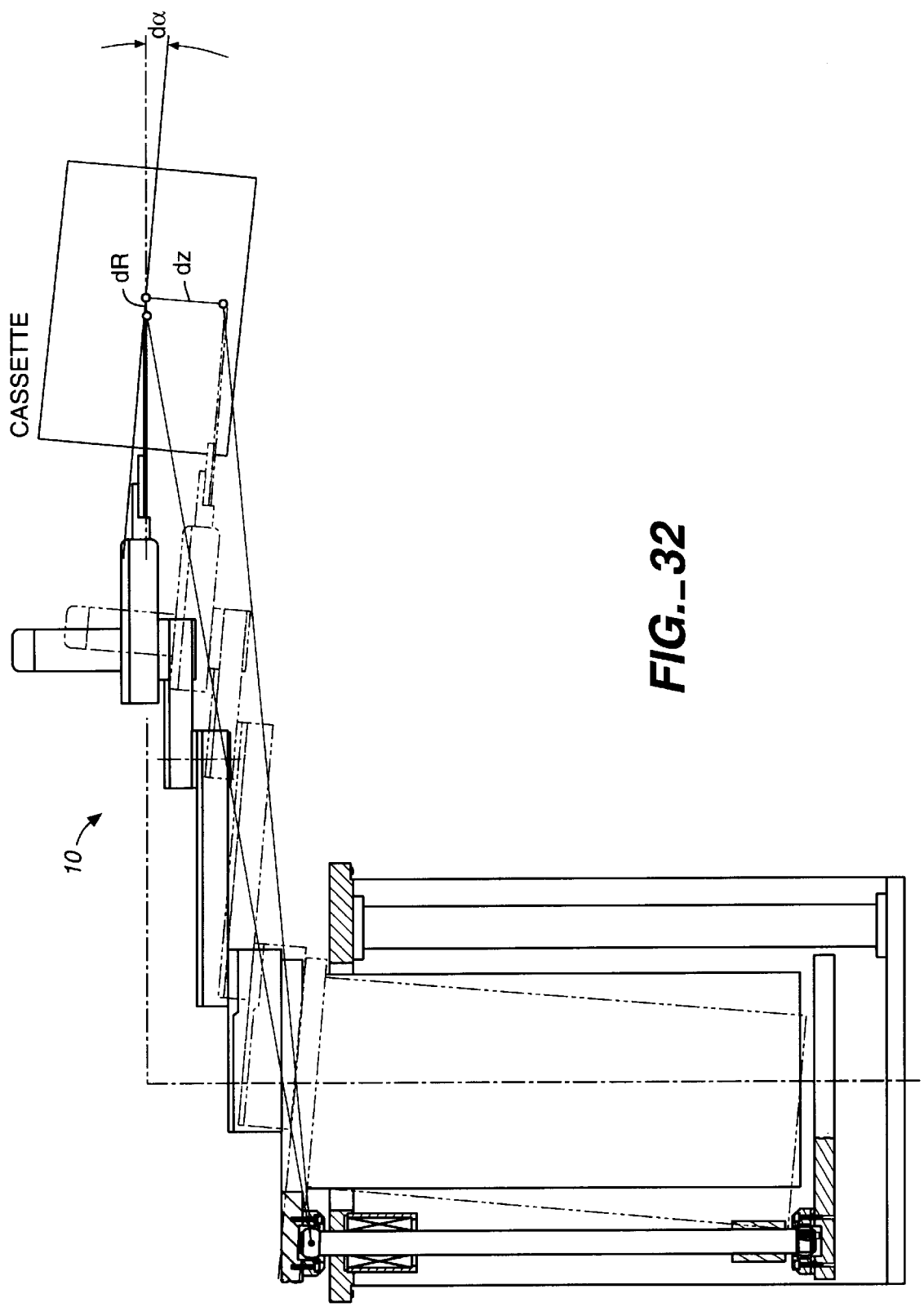
FIG. 32 illustrates, in side sectional view, compensation of a robotic arm in accordance with an embodiment of the invention for latitudinal misalignment.

FIG. 32 shows a robotic arm 10 and tiltable elevator with the arm portion being shown in two different positions. When the elevator platform is tilted from the horizontal to correct for a latitudinal misalignment of a cassette there are errors introduced in the R and Z directions, labeled dR and dZ respectively, due to the angular correction, labeled dα. The computer controller simply makes the required R and Z corrections from the known geometry and the known value of dα.

FIG. 33 shows the correction needed in the case of compensation for longitudinal cassette misalignments. Again, the arm is shown in two positions. Due to the separation of the planes of the end effector and the elevator platform on which the robotic arm is supported, the change, dα, in the angle of the platform leads to errors in the yaw, R and θ directions of the end effector. Again, the computer controller merely calculates the needed corrections and makes them taking into account the known geometry and the known value of dα. FIGS. 34a and 34b illustrate the errors with FIG. 34a showing the situation before correction where the right-hand arm is offset a distance dr due to the shift ds of the Z axis of the robotic arm. FIG. 34b shows the dθ, dY and dR (R2-R1) corrections which shift the end effector from the right-hand arm of FIG. 34a to the necessary position and orientation.

While a particular tiltable elevator structure has been described above it will be apparent to one of ordinary skill in the art that other computer controlled tiltable elevators can be substituted for it and that the improvement in this particular area lies in the combination and coordination of the tiltable elevator with the additional degree of computer controlled rotational motion about one or more of the wrist axes.

In accordance with the present invention, and making use of an apparatus generally as set forth above, a method is provided for picking up an ostensibly horizontally (For convenience the workpiece is spoken of as being in a horizontal alignment. Note that the initial orientation is not so limited). Lying generally planar workpiece which is misaligned from the horizontal (or from another loading orientation) and which is one of a plurality of stacked spaced apart workpieces. Basically the end effector 362 is moved to the vicinity of the workpieces. The sensor 370 on the end effector 362 is utilized to measure the alignment of each workpiece prior to its being picked up. When any of the workpieces are misaligned, the degree of misalignment is measured and communicated to computer control means 96. The computer control means 96 is utilized to control the motor means 340 and the Servo Motor 3 and/or the motor 302 and the article positioning apparatus to align the end effector 362 to pick up the misaligned workpiece. The motor means 340 is then controlled again to position the workpiece in the desired orientation.

The present invention also provides a method for controlling an arm structure 10 which comprises n longitudinally extending links each having respective proximal and distal end portions when n is 2 or a larger integer. In accordance with the method the rotational positions of the radial drive shaft, the rotary drive shaft and the end effector drive shaft are all measured. Electronic signals representative of such rotational positions are generated. The electronic signals representative of the rotational positions of the various drive shafts are communicated to electronic computer means and treated in the manner indicated diagrammatically in FIG. 8. The electronic computer means computes the locus of the end effector 10 from the electronic signals representative of the rotational positions of the drive shafts. It also controls the drive motors to move and position the end effector in any desired location within its reach.

FIGS. 35a and 35b illustrate an embodiment of the invention which includes a plurality of independent Y axis end effectors (two end effectors 1002, 1004 are shown but more are practical and readily implemented), each of which is a dual end effector in the sense of having two hand portions each, 1002a, 1002b and 1004a, 1004b, respectively. As will be noted from the drawings the Y axes of the two end effectors 1002, 1004 are coaxial. Separate yaw motors 1006, 1008 drive each end effector 1002, 1004 about the common Y axis 1010. The drive details are seen best in FIG. 36. FIG. 35b shows the end effectors 1002, 1004 at right angles from one another for clarity. However, an advantage of this embodiment of the invention is that the independent end effectors can be rotated independently (designated Y1 and Y2) so that one is below the other as seen in FIG. 35a. Also, while a double handed end effector is shown for both end effectors 1002, 1004, it will be apparent that one or both can be single handed (such as shown in FIGS. 48–50 and described below), triple handed, etc. As with the other embodiments discussed herein and generally in the same manner, the positions of the respective Y motors can be determined by sensors and the information can be transmitted to the computer controller 92 which can control and correlate the end effectors operation with the operation of the R, Y, θ motors and the elevator motors to provide extreme versatility of operation.

Referring to FIG. 36 it will be noted that motor 1008 turns, via an intermeshing gear arrangement 1012, a hollow cylindrical shaft 1014 which is supported, via bearings 1016, by a post 1018 supported and extending upwardly from the distal end portion of the distalmost link of the robotic arm 10. A bottommost portion 1020 of the shaft 1014 is drivingly connected to a central portion 1004c of the end effector 1004. A coaxial hollow cylindrical shaft 1022 is supported, via bearings 1024, by the shaft 1014. A bottommost portion 1026 of the shaft 1022 is drivingly connected to a central portion 1002c of the end effector 1002. The motor 1006, via intermeshing gear drive train 1028, drives rotation of the shaft 1022.

FIGS. 48 and 49 illustrate two single-handed end effectors, 2002 and 2004, driven by independent non-coaxial yaw motors, 2006 and 2008, having corresponding belts, 2003 and 2005. The separate yaw motors, 2006 and 2008, drive each end effector, 2002 and 2004, independently about a common Y axis, 2010. This embodiment has the advantage that the yaw motors are mounted on arm 2009 just past the distal end of arm 2007 (rather than at the distalmost end of the distalmost arm 2009) in order to put the weight closer to the telescopic, tiltable elevator structure 310. This embodiment also has the advantage that the end effectors can be rotated independently (designated Y1 and Y2) so that one is below the other.

FIG. 50 illustrates an embodiment of the two independent single-handed end effectors 2002 and 2004 as just described but with the independent yaw motors 2006 and 2008 mounted within arm 2009 to provide a lower profile, more balanced system with the weight distributed more evenly.

One advantage of the invention using two or more coaxial Y axis rotatable single end effectors is the reduction which occurs in the minimum working envelope of the robotic arm. FIG. 37 shows the minimum working envelope of a robot with a single yaw motor and an end effector having a pair of fixed opposed hands. The circle indicates the minimum working envelope needed to have two hands with this construction. FIG. 38 shows the minimum working envelope, again indicated by a circle, for a pair of single end effectors (one hand each) but with a double independent yaw drive wherein each end effector is independently controlled by its own motor. The reduced minimum working envelope results because of the ability to stack one of the end effectors above the other.

The combination of two yaw drives and dual end effectors allows one and the same cassette or process station to be reached by both hand portions of the end effectors without rotation about the θ axis. The replacement of the end effectors having double hands with two single end effectors each driven by a separate independent yaw motor allows very fast wafer exchange in a process station without increasing the minimum working envelope (The minimum working envelope is the same as that for a Y axis rotatable robot with a single end effector due to the ability to position one end effector over the other). Such exchanges are a bottleneck in many wafer processing processes.

FIGS. 39a–39f illustrate an example of an embodiment as just described. In FIG. 39a, a processed wafer is present in a workstation and the arm is holding another wafer ready for processing. The arm extends in a straight line from the FIG. 39a position to the FIG. 39b position and then withdraws in a straight line to the FIG. 39c position. During these operations both yaw motors are motivating movement about the two Y coaxial axes to guarantee the straight line path and to further assure that the end effector carries the not yet processed wafer within the working envelope (the space between the straight horizontal lines in the Figures). FIG. 39d illustrates the rotation of the processed wafer to the right and the beginning of straight line entry of the not yet processed wafer into the workstation. FIGS. 39e and 39f show completion of loading of the not yet processed wafer into the workstation.

FIGS. 10–12 show one embodiment of the frogs leg type linkage in accordance with an embodiment of the invention. A robotic arm mechanism 410 includes a relatively static structure 412 by which a frog leg type linkage 414 is supported via a pair of different height tubular members 416,418.

The frog leg type linkage 414 includes a pair of proximal links 420,422 having respective proximal end portions 424, 426 and respective distal end portions 428,430. The proximal end portions 424,426 are respectfully pivotally mounted at the tubular members 416,418 for rotation about respective proximal axes 432,434 at what will be referred to as the shoulders of the mechanism 410. A pair of distal links 436,438 have proximal end portions 440,442 respectively pivotally mounted to the distal end portions 428,430 of the proximal links 420,422 for rotation about respective axes 444,446 at what will be referred to as the elbows of the mechanism 410. The distal links 436,438 have respective distal end portions 448,450 pivotally mounted for rotation relative to each other, and to an end effector 452, about a distal axis 454 at what will be referred to as the wrist of the mechanism 410. While different length links can be used it is highly desirable that the proximal links 420,422 be of the same length as one another and that the distal links 436,438 be of the same length as one another. It is not necessary to have all of the links equal in length to one another.

In the embodiment of FIGS. 10–12 three motors are present for providing the desired motion. A shoulder motor 456 is seen in FIG. 11. It provides motion at the shoulders as shown by the arrow in FIG. 1. An elbow motor 458 is seen in FIG. 10. As the elbow motor extends or contracts along the length of the proximal link 420 it causes rotation about the elbows. A yaw motor 460, shown in FIGS. 11 and 12, causes yaw motion about the wrist. An electronic processor 96 is connected to receive signals as represented by signal receiving line 92 indicative of the degree of rotation of the shoulder motor 456 and of the wrist motor 460 and of the degree of extension of the elbow motor 458 as provided by sensors attached to measure these quantities. The electronic processor also, via control lines indicated at 100,106,108, serves to transmit signals which control operation of the motors 456,458,460 50 as to position the end effector 452 in any desired orientation. It is clear that since the links of the linkage 414 are constrained by their connection to move together only a single shoulder motor and a single elbow motor are necessary to provide any desired motion. E and/or J motion can be provided as desired or necessary as can a tilting elevator.

FIG. 13 illustrates another frog legs structure in accordance with an embodiment of the invention. A robotic arm mechanism 510 is shown with the motor 560 differently positioned and where wrist motion is provided motivated by rotary motion of a shaft 568 of the motor 560. Appropriate belt and pulley means are provided to drive the wrist as the shaft 568 rotates. The shaft 568 rotates a pulley 570 which, via a belt 572 and pulley 574, rotates a shaft 576 which rotates in bearings 578. The shaft 576 rotates a pulley 580 which, via a belt 582 and pulley 584, rotates a shaft 586 which rotates in bearings 588 and which is connected at its upper region 590 to drive rotation of the dual end effector 552.

The elbow motor 558, as can be seen by reference to FIG. 13, has a rotating shaft 592 which drives a pulley 594. A belt 596 transmits the power to a pulley 598 which rotates a shaft 600 in bearings 602. The shaft 600 has an upper region 604 which is connected to the proximal end portion 540 of the distal link 536 and thereby drives relative rotation about the elbow between the proximal link 520 and the corresponding distal link 536.

In both embodiments illustrated the elbow motor is connected to drive an opposite linkage, i.e., a different pair of proximal and distal links, than is the shoulder motor. This is for ease of construction.

In the embodiment of FIG. 13 the belt and pulley arrangements for providing elbow and wrist motion are in opposite linkages since they could otherwise interfere with one another.

FIG. 14 is very similar to FIG. 13. The only exception is with respect to the direction the shaft 586 extends from the pulley 584 and the corresponding changes in position of the associated link and the shaft 600.

While such frog legs structures as are described above have the motors within a static structure it should be noted that for non-vacuum environments, or for vacuum environments when space is not a problem, the wrist and elbow motors can be mounted respectively adjacent or at the wrist and elbow as with the non-frog legs embodiments.

FIGS. 15a and 15b illustrate the reach of the arm mechanism 510, 610 in schematic top views. In FIG. 15a, a plurality of workpiece containing cassettes 605 (2 are llustrated)and/or of workstations 606 are shown. It will be noted that they, the workstations 606 as well as the cassettes 605, are not located radially from the center of the robotic arm mechanism 510, 610 so that an arm which could only move in the R and θ directions could not cause its end effector to enter them perpendicularly as does the end effector 552 of the arm mechanism 510, 610 present invention. As will be noted, the arm mechanism 510, 610 can be aligned and advanced or retracted to pass orthogonally into or out of any of the cassettes/workpieces 605, 606. Using the yaw capability it is possible to so align the end effector 552 that it can be inserted in each workstation 606 and in the cassettes 605, as well, in a straight line even though the work stations 606 and cassettes 605 are not radially aligned relative to the shoulders. In such a manner the robotic system described can entirely replace expensive small track systems in which the robot is carried (translated) by a track in order to handle in-line arranged cassettes. These motions are attainable due to the presence of the wrist motor. Use of an end effector 552 which has two or more hands such as the two hands 552a, 552b illustrated, is particularly efficient and provides very quick operation with low down time. Use of additional hands increases the advantage, within reason. A three hand end effector allows still more efficiency of operation. Of course the workpieces take up space and the cassettes have limited size openings so the number of hands should not be increased so much as to create interference with operation.

It should be noted that the links are offset vertically from one another (see FIGS. 13 and 14) to allow the linkage 514 to pass over each other and over the static structure 512 so as to allow the motions illustrated in FIG. 15.

In accordance with the present invention, shoulder motor sensor means 620 (shown in FIG. 13), in practice an incremental photo encoder, is provided for measuring a quantity indicative of the rotational position about the axis 544 of the shoulder motor drive shaft 622 and for generating an electronic signal representative of the rotational position of the shoulder motor drive shaft 622. In practice such motor sensors are packaged within an extension 621 of the motor housing and are available commercially. The resulting electronic signal is indicative of the desired quantity, namely, the rotational position of the shoulder motor drive shaft 622. The photo encoder can be in the nature of a light source and a light sensor aligned to receive light from the light source when the light path is not blocked off. The light beam from the light source is directed parallel to the rotating shaft which has a generally circular disc mounted on it between the light source and the light sensor and extending into the light beam. The disc has alternating transparent and opaque areas and the number of pulses generated at the light sensor during rotation of the motor is indicative of the speed of the motor and thereby of the rotational position of the shaft. FIGS. 17a and 17b illustrate the structure.

Means represented by line 92 (FIG. 12) is present for communicating the electronic signal representative of the rotational position of the shoulder motor drive shaft to electronic computing means 96. Similarly, elbow motor drive sensor means 624 is provided for measuring a quantity indicative of the extension (FIGS. 10–12) of a follower 626 threadably mounted to and extending with rotation of the elbow motor drive shaft in FIG. 10 or of the rotational position of the elbow motor drive shaft 592 (FIG. 13) and for generating an electronic signal representative of the quantity measured. The follower 626 is attached to the proximal end portion 540 of the distal link 536 whereby the angle between the links changes as the follower 626 is moved due to rotation of the elbow motor drive shaft. Alternatively, and more usually, a sensor set up as shown in FIGS. 17a and 17b will be used to measure the rotation of the shaft 592 and from that information and the degree of pitch of the threading on the shaft 592 the extension can be calculated and from that and known geometric relations the angle between the proximal and distal links can be calculated and adjusted as desired. Means, represented by line 92, is provided for communicating the electronic signal representative of the position of the follower 626 or of the elbow motor drive shaft 592 to the electronic computing means 562.

The sensor means of the invention are illustrated in FIGS. 17a and 17b. An extension 700 of the respective motor shaft 568,592,622 within the housing of the respective motor 560,558,556 has a disk 702 which rotates with the extension 700. A respective sensor 620,624,627, labeled 704 in FIG. 17a, bounces a beam off the bottom of the disk 702 and detects when reflection occurs. The disk 702 has a plurality of reflective portions separated by a plurality of non-reflective or open portions (see FIG. 17b). The beam is reflected only by the reflective portions. Since the positioning and separation of the reflective and non-reflective portions are known the resulting signal is proportional to the speed of rotation of the respective shaft.

The electronic computer means 562, the operation of which is illustrated schematically in FIG. 8, includes locus computing means for computing the locus of the end effector 554 from the sensed positions of the drive shafts, and/or of the follower 626, using the geometric relations dictated by the specific lengths of the various links and the diameters of the various pulleys. The electronic computing means 562 further includes drive controlling means for controlling the shoulder drive motor 556 and the elbow drive motor 558 such that the locus 554 of the end effector moves along the desired trajectory which can be any arbitrary planar curve including, if desired, a straight line.

Figure 18B:
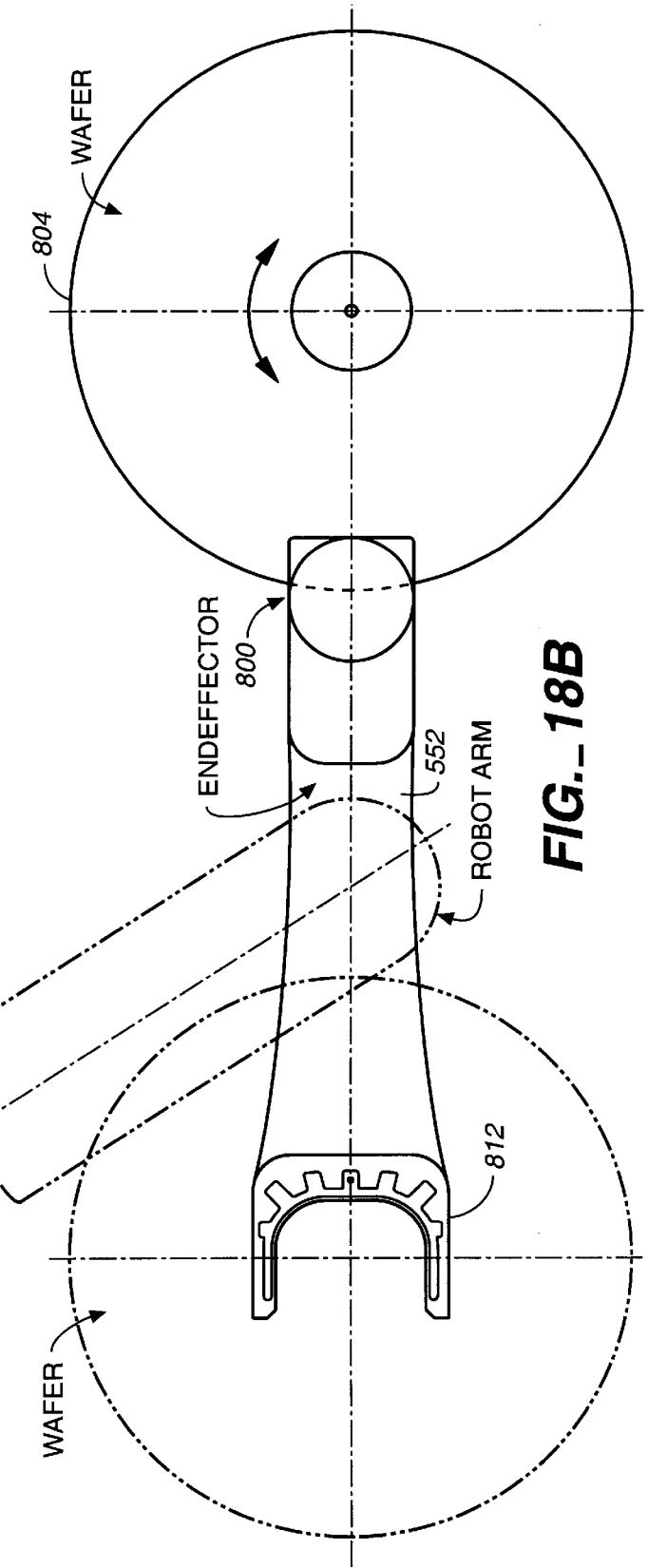

FIGS. 18a and 18b illustrate use of a sensor 800 placed on the end effector 552 in conjunction with a workpiece alignment chuck 802. The chuck 802 is used to rotate wafers placed on it so as to allow detection and positioning of any flats which may be present and also to allow centering of the wafer geometric center with the axis of rotation of the chuck 802. In these Figures a wafer 804 is illustrated as being on the chuck 802. The sensor has an opening 806 which can accept the periphery of the wafer. A detecting beam can pass from a top portion 808 of the sensor to a bottom portion 810 and be detected there or the beam can be reflected back towards the sensor in the top portion 808 and detected there. In this manner the edge of the wafer can be detected as the chuck 802 holding the wafer 804 rotates wherefrom information with respect to location and orientation of any flats can be extracted and the position of the geometric center of the wafer 804 can be determined. The opposite end 812 of the end effector 552 can then pick up the wafer in a desired orientation and deliver it to a work station.

FIG. 19 illustrates an end effector 910 having three fixed hands which can readily replace the end effector 552 having two fixed hands illustrated in other Figures.

FIG. 20 illustrates a mechanism as shown in FIG. 13 to which a Z-axis motor 950 has been added along with a lead screw 952 which the Z-motor 500 drives and a lead screw follower bracket 954 which serves to lift a frame 956 on which the motors 556 and 560 are carried, thereby providing Z-movement.

The present invention thus provides a method for controlling the arm mechanisms 510 and 610. In accordance with the method for controlling the arm mechanism 510, the linear position of the elbow motor drive shaft and the rotational positions of the shoulder motor drive shaft and the wrist drive shaft are all measured. Electronic signals representative of such positions are generated. The electronic signals representative of the positions of the radial, rotary and end effector drive shafts are communicated to electronic computer means in the manner indicated diagrammatically in FIG. 12. The electronic computer means computes the locus of the end effector 552 from the electronic signals representative of the positions of the drive shafts. It also controls the drive motors to move and position the end effector in any desired location within its reach. In accordance with the method for controlling the arm mechanism 610, the rotational positions of the elbow motor drive shaft, the shoulder motor drive shaft and the wrist drive shaft are all measured. Electronic signals representative of such rotational positions are generated. Thereafter, the procedure is as with the arm mechanism 510.

The invention further provides a method of processing workpieces such as semiconductor wafers and flat panel displays. In the method a plurality of generally parallel wafers/panels are positioned in one or more cassettes with the cassettes not necessarily having axes which are precisely parallel to the primary axis of a robotic arm. The arm includes a motor for selectively independently rotating an end effector about a Yaw axis and/or a roll axis and/or a pitch axis. The arm includes means for monitoring the R, θ and Z positions of the arm and the Y and/or E and/or J positions of the wrist of the arm as well as computer control means for controlling such positions. Generally, sensor means are also provided for measuring the alignments of each workpiece as it is to be picked up by the arm. The wafers are picked up in turn with the computer control means controlling the arm so that each workpiece is picked up and delivered progressively to each workstation in proper alignment for processing at that workstation. The result is an improved yield of acceptable completed workpieces produced with an enhanced throughput.

Industrial Applicability

The present invention provides a robotic arm structure 10,510,610 useful for a number of things, particularly for positioning semiconductor wafers for processing and for positioning display panels for processing. The system provides far more flexibility for the design engineer and greatly reduces vibrations during operation of the arm structure. Increased throughput of acceptable workpieces results.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of claims which may be supported herein.

That which is claimed is:

1. A robotic arm structure providing θ- and R-motion which includes at least two links, each having a proximal end portion and a distal end portion, with the θ motion being about a primary axis at the proximal end portion of a proximalmost of the links, the R motion proceeding radially from the primary axis, comprising:

a first end effector pivotally mounted for rotation relative to the distal end portion of a distalmost link about an end effector axis which is parallel to the primary axis;

a first motor connected to rotate the first end effector about the end effector axis so as to provide an independent yaw (Y) motion for the first end effector;

a second end effector pivotally mounted for rotation relative to the distal end portion of the distalmost link about the end effector axis; and a second motor connected to rotate the second end effector about the end effector axis so as to provide an independent yaw (Y) motion for the second end effector independent from the yaw motion of the first end effector.

2. The robotic arm structure of claim 1 wherein the first motor and second motor are mounted on the distal end portion of the distalmost link.

3. The robotic arm structure of claim 1 wherein the first motor and second motor are mounted adjacent the proximal end portion of the distalmost link.

4. The robotic arm structure of claim 1 wherein the first motor and second motor are mounted within an intermediate link.

5. The robotic arm structure of claim 1, further comprising:

an elevator structure moveable along a Z axis, the robotic arm structure being supported by the elevator.

6. A robotic arm structure providing θ- and R-motion which includes at least two links, each having a proximal end portion and a distal end portion, with the θ motion being about a primary axis at the proximal end portion of a proximalmost of the links, the R motion proceeding radially from the primary axis, comprising:

a first end effector pivotally mounted for rotation relative to the distal end portion of a distalmost link about an end effector axis which is parallel to the primary axis;

a first motor connected to rotate the first end effector about the end effector axis so as to provide an independent yaw (Y) motion for the first end effector;

a second end effector pivotally mounted for rotation relative to the distal end portion of the distalmost link about the end effector axis;

a second motor connected to rotate the second end effector about the end effector axis so as to provide an independent yaw (Y) motion for the second end effector independent from the yaw motion of the first end effector;

an elevator structure movable along a Z axis, the robotic arm structure being supported by the elevator structure; and means for controllably tilting the elevator structure with respect to the Z axis.

7. The robotic arm structure of claim 1, further comprising:

means for controllably tilting the robotic arm structure with respect to a Z axis.

8. The robotic arm structure of claim 1, wherein the arm structure is adapted to operate automatically and independently of real-time operator input.

9. A robotic arm structure providing θ- and R-motion which includes at least two links, each having a proximal end portion and a distal end portion, with the θ motion being about a primary axis at the proximal end portion of a proximalmost of the links, the R motion proceeding radially from the primary axis, comprising:

a first end effector pivotally mounted for rotation relative to the distal end portion of a distalmost link about an end effector axis which is parallel to the primary axis;

a first motor connected to rotate the first end effector about the end effector axis so as to provide an independent yaw (Y) motion for the first end effector;

a second end effector pivotally mounted for rotation relative to the distal end portion of the distalmost link about the end effector axis;

a second motor connected to the second end effector about the end effector axis so as to provide an independent yaw (Y) motion for the second end effector independent from the yaw motion of the first end effector, wherein the robotic arm structure is adapted to operate in a semiconductor processing environment.

10. The robotic arm structure of claim 9, wherein the arm structure is adapted to operate automatically and independently of real-time operator input.

11. The robotic arm structure of claim 9 wherein the first motor and second motor are mounted on the distal end portion of the distalmost link.

12. The robotic arm structure of claim 9 wherein the first motor and second motor are mounted adjacent the proximal end portion of the distalmost link.

13. The robotic arm structure of claim 9 wherein the first motor and second motor are mounted within an intermediate link.

14. The robotic arm structure of claim 9, further comprising:

an elevator structure moveable along a Z axis, the robotic arm structure being supported by the elevator.

15. The robotic arm structure of claim 14, further comprising:

means for controllably tilting the elevator structure with respect to the Z axis.

16. The robotic arm structure of claim 9, further comprising:

means for controllably tilting the robotic arm structure with respect to a Z axis.

\* \* \* \* \*

(12) EX PARTE REEXAMINATION CERTIFICATE (6561st)
United States Patent
Genov et al.

(10) Number: US 6,121,743 C1
(45) Certificate Issued: *Dec. 9, 2008

(54) DUAL ROBOTIC ARM END EFFECTORS HAVING INDEPENDENT YAW MOTION

(75) Inventors: Genco Genov, deceased, late of San Jose, CA (US); by Mila Genov, legal representative, San Jose, CA (US); Alexander Todorov, Sunnyvale, CA (US); Lubo Kostov, Sunnyvale, CA (US); Peter Petkov, Sunnyvale, CA (US); Valentin Totev, Sunnyvale, CA (US); Eugene Bonev, Santa Clara, CA (US); Zlatko Sotirov, Sunnyvale, CA (US)

(73) Assignee: Genmark Automation, Inc., Sunnyvale, CA (US)

Reexamination Request:
No. 90/008,138, Jul. 27, 2006

Reexamination Certificate for:
Patent No.: 6,121,743
Issued: Sep. 19, 2000
Appl. No.: 09/129,110
Filed: Aug. 4, 1998

(*) Notice: This patent is subject to a terminal disclaimer.

Related U.S. Application Data

(63) Continuation-in-part of application No. 08/788,898, filed on Jan. 23, 1997, now Pat. No. 5,789,890.
(60) Provisional application No. 60/024,242, filed on Aug. 20, 1996, provisional application No. 60/021,546, filed on Jul. 11, 1996, and provisional application No. 60/013,862, filed on Mar. 22, 1996.

(51) Int. Cl.
*B25J 9/16* (2006.01)

(52) U.S. Cl. .................. 318/568.11; 318/568.21; 414/743; 414/937; 700/245; 901/27; 901/32

(58) Field of Classification Search .............. None
See application file for complete search history.

(56) References Cited

U.S. PATENT DOCUMENTS

| 4,787,813 A | 11/1988 | Stevens et al. |
| 4,897,015 A | 1/1990 | Abbe et al. |
| 5,007,784 A | 4/1991 | Genov et al. |
| 5,064,340 A | 11/1991 | Genov et al. |
| 5,080,415 A | 1/1992 | Bjornson |
| 5,733,096 A | 3/1998 | Van Doren et al. |

FOREIGN PATENT DOCUMENTS

| JP | 4295704 | 10/1992 |
| JP | 4298059 | 10/1992 |
| JP | 7240366 | 9/1995 |
| JP | 7299775 | 11/1995 |
| JP | 8046015 | 2/1996 |

OTHER PUBLICATIONS

Craig L. Stevens, *The Design of a Clean Room Robot for Wafer Handling*, MS–87–185, Societ of Manufacturing Engineers (1987).
*The Apple Mac of The Robot Industry*, The Industrial Robot (1990).
*Personal Robots Set to Put Glamour Back into Robotics*, The Industrial Robot (1987).

*Primary Examiner*—Charles Craver

(57) ABSTRACT

An improvement is set forth in a robotic arm structure which includes at least two links. θ motion is provided about a primary axis at the proximal end portion of the proximalmost of the links. R motion proceeds radially from the primary axis whereby the distal end portion of the distalmost of the links can be moved in a radially extending straight line. At least two independent end effectors are pivotally mounted for rotation relative to the distal end portion of the distalmost link about an end effector axis which is parallel of the primary axis. The structure is improved by adding independent yaw motors for rotating the end effectors independently.

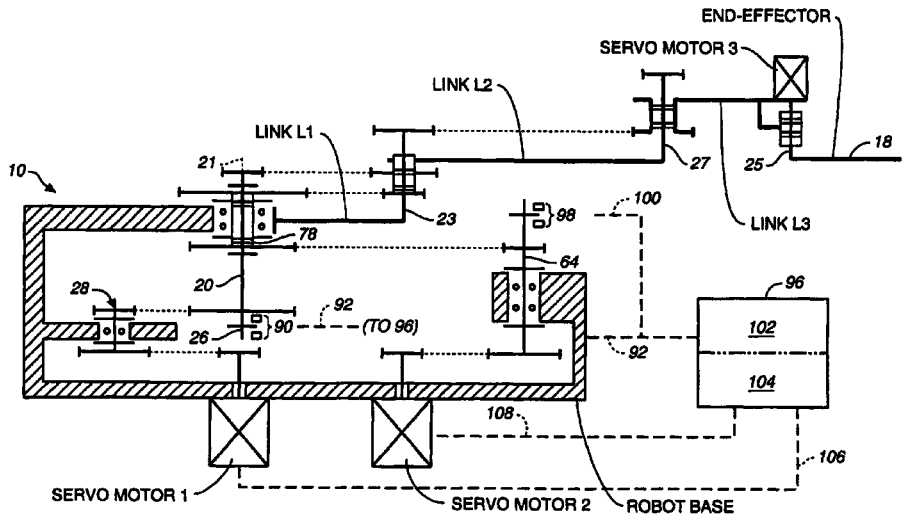

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 2, 5, 9–11 and 14 is confirmed.

Claims 3, 4, 6–8, 12, 13, 15 and 16 were not reexamined.

* * * * *